US008762289B2

(12) United States Patent
Jones et al.

(10) Patent No.: US 8,762,289 B2
(45) Date of Patent: Jun. 24, 2014

(54) METHOD, APPARATUS, AND COMPUTER READABLE STORAGE FOR TRAINING HUMAN SEARCHERS

(75) Inventors: Scott A. Jones, Carmel, IN (US); Thomas E. Cooper, Carmel, IN (US)

(73) Assignee: ChaCha Search, Inc, Carmel, IN (US)

( * ) Notice: Subject to any disclaimer, the term of this patent is extended or adjusted under 35 U.S.C. 154(b) by 0 days.

(21) Appl. No.: 11/780,241

(22) Filed: Jul. 19, 2007

(65) Prior Publication Data
US 2008/0021721 A1 Jan. 24, 2008

Related U.S. Application Data

(60) Provisional application No. 60/807,765, filed on Jul. 19, 2006, provisional application No. 60/821,335, filed on Aug. 3, 2006, provisional application No. 60/824,407, filed on Sep. 1, 2006.

(51) Int. Cl.
G06Q 99/00 (2006.01)
G06Q 50/20 (2012.01)

(52) U.S. Cl.
CPC ................................. G06Q 50/2057 (2013.01)
USPC ....................................................... 705/328

(58) Field of Classification Search
USPC ............... 705/1; 434/157, 219, 224, 350, 362
See application file for complete search history.

(56) References Cited

U.S. PATENT DOCUMENTS

| | | | |
|---|---|---|---|
| 5,535,256 A * | 7/1996 | Maloney et al. ............... | 379/309 |
| 5,559,940 A | 9/1996 | Hutson | |
| 5,732,259 A | 3/1998 | Konno | |
| 5,737,734 A * | 4/1998 | Schultz ............................. | 707/5 |
| 5,875,231 A | 2/1999 | Farfan et al. | |
| 5,915,010 A | 6/1999 | McCalmont | |
| 6,128,380 A * | 10/2000 | Shaffer et al. ............ | 379/265.01 |
| 6,341,212 B1 * | 1/2002 | Shende et al. ................ | 434/350 |
| 6,507,841 B2 | 1/2003 | Riverieulx de Varax | |
| 6,578,010 B1 | 6/2003 | Teacherson | |
| 6,628,777 B1 * | 9/2003 | McIllwaine et al. ...... | 379/265.01 |
| 6,675,159 B1 | 1/2004 | Lin et al. | |
| 6,892,049 B2 * | 5/2005 | Phalp et al. .................. | 434/350 |
| 6,895,406 B2 | 5/2005 | Fables et al. | |
| 6,901,394 B2 | 5/2005 | Chauhan et al. | |
| 2002/0167539 A1 | 11/2002 | Brown et al. | |
| 2003/0140037 A1 | 7/2003 | Deh-Lee | |

(Continued)

FOREIGN PATENT DOCUMENTS

EP 0 982 915 3/2000
WO WO2007052285 A2 5/2007

OTHER PUBLICATIONS

International Search Report issued Jan. 28, 2008 in PCT/US07/75369.

(Continued)

Primary Examiner — Traci Casler
(74) Attorney, Agent, or Firm — Staas & Halsey

(57) ABSTRACT

A method for enhancing search skills of human searchers in an information search system. The invention allows human searchers to be trained when they are not particularly busy fielding search queries from information seekers. The training can allow the searcher to increase their performance rating, thereby allowing greater effectiveness in fielding search queries for information seekers. The method can include determining whether a searcher is eligible to receive or provide training; and training an idle searcher with training queries, and/or search results.

25 Claims, 45 Drawing Sheets

(56) References Cited

U.S. PATENT DOCUMENTS

| | | | |
|---|---|---|---|
| 2003/0145001 | A1 | 7/2003 | Craig et al. |
| 2003/0174818 | A1 | 9/2003 | Hazenfield |
| 2003/0198325 | A1 | 10/2003 | Bayne |
| 2004/0009461 | A1* | 1/2004 | Snyder et al. .............. 434/350 |
| 2004/0023644 | A1 | 2/2004 | Montemer |
| 2004/0024752 | A1 | 2/2004 | Manber et al. |
| 2004/0049541 | A1 | 3/2004 | Swahn |
| 2004/0203634 | A1 | 10/2004 | Wang et al. |
| 2005/0086290 | A1 | 4/2005 | Joyce et al. |
| 2005/0105712 | A1 | 5/2005 | Williams et al. |
| 2005/0131866 | A1 | 6/2005 | Badros |
| 2005/0136949 | A1 | 6/2005 | Barnes |
| 2005/0210042 | A1 | 9/2005 | Goedken, Jr. |
| 2005/0289124 | A1 | 12/2005 | Kaiser et al. |
| 2006/0010105 | A1 | 1/2006 | Sarukkai et al. |
| 2007/0005344 | A1 | 1/2007 | Sandor et al. |

OTHER PUBLICATIONS

International Search Report issued Feb. 12, 2008 in PCT/US07/60467.
International Search Report issued Feb. 27, 2008 in PCT/US07/60459.
International Search Report issued Feb. 15, 2008 in PCT/US07/60468.
International Search Report issued Feb. 7, 2008 in PCT/US07/60472.
Carmel et al., "Searching XML Documents via XML Fragments," 2003, ACM, pp. 151-158.
Karat et al., "Patterns of Entry and Correction in Large Vocabulary Continuous Speech Recognition Systems," 1999, ACM, pp. 568-575.
Google Tutor, "Googling from your Mobile Phone-no Web Browser Needed!," 2005, Google Tour.
Varshney et al., "Voice Over IP," 2002, Communications of the ACM, vol. 45, No. 1, pp. 89-96.
Knoblock, Craig A., "Searching the World Wide Web," 1997, IEEE Expert, pp. 8-14.
Sullivan, Danny, "Google Launches Personalized Home Page," Search Engine Watch, May 2005.
First Chinese Office Action, PCT/US2007/073919 (Chinese App No. 200780035471.4), issued Apr. 14, 2010.
International Search Report, PCT/US2007/073919 Date of Mailing Sep. 24, 2008.
International Search Report mailed on Sep. 10, 2008, in PCT/US07/73907 (U.S. Appl. No. 11/780,241).
International Preliminary Report on Patentability mailed on Jan. 20, 2009 in (U.S. Appl. No. 11/780,241).
U.S. Appl. No. 11/336,928, filed Jan. 23, 2006, Scott A. Jones, Chacha Search, Inc.
U.S. Appl. No. 11/780,297, filed Jul. 19, 2007, Scott A. Jones et al., Chacha Search, Inc.
U.S. Appl. No. 11/819,719, filed Jun. 28, 2007, Scott A. Jones et al., Chacha Search, Inc.
U.S. Appl. No. 11/835,080, filed Aug. 7, 2007, Scott A. Jones et al., Chacha Search, Inc.
U.S. Appl. No. 11/835,016, filed Aug. 7, 2007, Scott A. Jones et al., Chacha Search, Inc.
U.S. Appl. No. 11/780,329, filed Jul. 19, 2007, Scott A. Jones et al., Chacha Search, Inc.
U.S. Appl. No. 11/834,911, filed Aug. 7, 2007, Scott A. Jones, Chacha Search, Inc.
"SEARCHENGINERADIO", retrieved from Internet URL: http://seoradio.com on Sep. 25, 2007.

* cited by examiner

KEYPHRASES AVAILABLE FOR SIGN-UP

| KEYPHRASE/WEIGHT | # SEARCHERS LOGGED IN | # SEARCHERS SIGNED UP | QUERIES ON THIS KEYWORD PER HOUR | RATIO OF QUERIES/HOUR TO LOGGED IN SEARCHERS |
|---|---|---|---|---|
| BASEBALL/42 | 5 | 49 | 75 | 15 |
| SERIES/70 | 8 | 61 | 11 | 1 |
| WORLD/5 | 12 | 92 | 112 | 9 |
| WORLD SERIES/100 | 3 | 17 | 3 | 1 |
| MIN. PER KEYWORD | 0 | 0 | 0 | 0 |
| AVG. PER KEYWORD | 8 | 17 | 80 | 10 |
| MAX. PER KEYWORD | 33 | 50 | 398 | 46 |

SEARCHER RECORD

- 2410 SEARCHER UID
- 2420 SEARCHER NAME = PAUL100
- 2430 SEARCHER OVERALL PROFICIENCY
- 2440 SEARCHER CATEGORY PROFICIENCY
- 2450 SEARCHER SUBCATEGORY PROFICIENCY
- 2460 SEARCHER OVERALL RATING
- 2470 SEARCHER CATEGORY RATING
- 2480 SEARCHER SUBCATEGORY RATING
- 2490
  - SEARCHER KEYWORD FIELD (1)
  - SEARCHER KEYWORD FIELD (2)
  - ⋮
  - SEARCHER KEYWORD FIELD(S) (n)

FIG. 15A

| | SECONDARY ACTIVITY PRIORITY LEVEL | SECONDARY ACTIVITY % | SECONDARY ACTIVITY TARGET % |
|---|---|---|---|
| SECONDARY ACTIVITY A | "FIRST" | "50" | "35" |
| SECONDARY ACTIVITY B | "FIRST" | "25" | "35" |
| SECONDARY ACTIVITY C | "SECOND" | "20" | "15" |
| SECONDARY ACTIVITY D | "THIRD" | "5" | "15" |

FIG. 32

METHOD, APPARATUS, AND COMPUTER READABLE STORAGE FOR TRAINING HUMAN SEARCHERS

CROSS-REFERENCE TO RELATED APPLICATIONS

This application is related to and claims the benefit of priority to Provisional Application U.S. Ser. No. 60/807,765, entitled METHOD, SYSTEM, AND COMPUTER READABLE STORAGE TRAINING HUMAN SEARCHERS, by Scott A. Jones, filed Jul. 19, 2006, Provisional Application U.S. Ser. No. 60/821,335, entitled, METHOD, SYSTEM, AND COMPUTER READABLE MEDIUM USEFUL IN MANAGING A COMPUTER-BASED SYSTEM FOR SERVICING USER-INITIATED TASKS, by Scott A. Jones, filed Aug. 3, 2006, and Provisional Application U.S. Ser. No. 60/824,407, entitled, METHOD, SYSTEM, AND COMPUTER READABLE MEDIUM USEFUL IN MANAGING A COMPUTER-BASED SYSTEM FOR SERVICING USER-INITIATED TASKS, by Scott A. Jones, filed Sep. 1, 2006, in the U.S. Patent and Trademark Office, the contents of both of which are incorporated herein by reference.

BACKGROUND

In a computer-based system for servicing user initiated tasks, it is important to maintain a balance between the number of users initiating tasks and the number of workers available to handle user initiated tasks, so that efficiency and/or utility of the system are maintained.

If the balance between users and workers fails to be maintained, several problems can occur in such a system. For example, if there are too many workers in the system, they will not be busy enough and will not earn worthwhile income. In addition, the workers can become bored and uninterested in their work. In contrast, for example, if there are too few workers in the system, user initiated tasks will not be handled in a timely manner, or will be handled by workers not skilled in the particular task area. Poor service and dissatisfied users will be the result.

In addition to other potential problems, handling user initiated tasks often does not allow the workers to become aware of methods and strategies that could be utilized to improve performance on such tasks. Although a worker's performance may increase through trial and error via handling many user initiated tasks, such a process may not allow a worker to increase his or her skills as quickly as desired. Further, handling user initiated tasks does not necessarily expose a worker to techniques that might allow the worker to realize how "the best" service is provided.

In light of the foregoing, a system, method, and computer program product for managing secondary activities of workers in, for example, a computer-based system for servicing user initiated tasks would be appreciated. In addition a system, method, and computer-readable medium in which workers in, for example, a computer-based system for servicing user initiated tasks can be trained to improve their performance would be appreciated.

In a paid searching system including paid human searchers or guides, if there are not enough guides, the length of time for an information seeker to obtain search results will be unacceptable, as the information seeker may become frustrated. If there are too many guides, the system will not be cost-effective in terms of the work performed by the guides and their compensation for such work (and/or the human workers may become bored and/or distracted). Although proper balance between the two resources, that is, the guides (providers) and the information seekers (users or requesters) is important to the overall effectiveness of the system, nevertheless, the guides will inevitably experience "down time."

Down time or time during which a guide is not fielding information search queries from information seekers can result in guides becoming bored. Further, as the guide is not busy answering queries, the guide is not improving his or her information search queries during the period of idleness. Therefore, providing accurate responses to information search queries, one of the most important goals of such a system, may be compromised.

Conventional training methods for improving information search skills are typically based on media such as audio and/or video files which may explain methods for more effectively using a search system. In other circumstances a searcher, such as a reference librarian or a patent examiner or patent searcher may be trained to search a particular resource or set of resources. However, there is no known method for a searcher to receive query-based search training which is directed to an area of interest which may be generalized. For example, for search resources such as Flickr™, Blinkx™, etc. there is no user's manual and/or query-based training which may allow a searcher to improve search skills based on prior and/or current experience of other human searchers. As such a training method and system which can enhance information search skills of a person when seeking information on a topic which may be of limited or special interest are not available. As a consequence, a person seeking information relevant to a specialized area of knowledge may be unable to find a competent researcher to assist in the search.

In light of the problems identified above, what is needed is a method, system, and computer-readable medium in which guides can be trained in search skills during idle or available time.

SUMMARY

The present invention is directed to a method and system for enhancing search skills of human searchers in an information search system. The method can include presenting to a human searcher at least one information search query for which search results were previously provided to a requester and monitoring performance of the human searcher in providing search results to the information search query. The disclosed system and method allow human searchers to be trained when they are not particularly busy fielding search queries from an information seeker. The training can allow the searchers to increase their performance rating, thereby allowing greater effectiveness in fielding search queries for information seekers.

Training methods are disclosed which enable a searcher to obtain training in any area of interest based upon information associated with the searcher. A searcher may improve his or her ability to obtain information, to select relevant advertisements, and to provide training to searchers. A training method is provided in which a human searcher (guide) may interact with the search system without the participation of another searcher in order to improve his or her skills based upon information stored in the search system. A stored query, advertisement(s), or search result(s) may be used for training a human searcher. In this way, a complete query(ies) submitted by a user(s) can be associated with a search result(s) or an advertisement(s). For example, multiple queries such as "what is the capital of Indiana" and "is Indianapolis the capital city" might be matched to a specific search result(s) providing a precise answer.

A collaborative training method is disclosed wherein two or more searchers may interact using a suitable communication system. In particular, an instant message or chat session may be established to allow a searcher(s) being trained to interact with a searcher(s) providing training. The information obtained during a collaborative training session may be recorded in order to provide improved training of a searcher who elects to be trained without direct interaction with a searcher(s).

A system and method are disclosed to select search trainers and search trainees based upon competence data recorded in the system. Competence may be evaluated in order to optimize the training experience and balance query based training activities with other activities which may be requested.

BRIEF DESCRIPTION OF THE DRAWINGS

Aspects and advantages of the disclosure will become apparent and more readily appreciated from the following description of the embodiments, taken in conjunction with the accompanying drawings, of which:

FIGS. 10A-10E illustrate an exemplary searcher GUI during a search session.
FIGS. 15A-15B depict databases.
FIG. 32 is an illustration of various exemplary priority levels for secondary activities (directed tasks).

DETAILED DESCRIPTION

Figure 1:
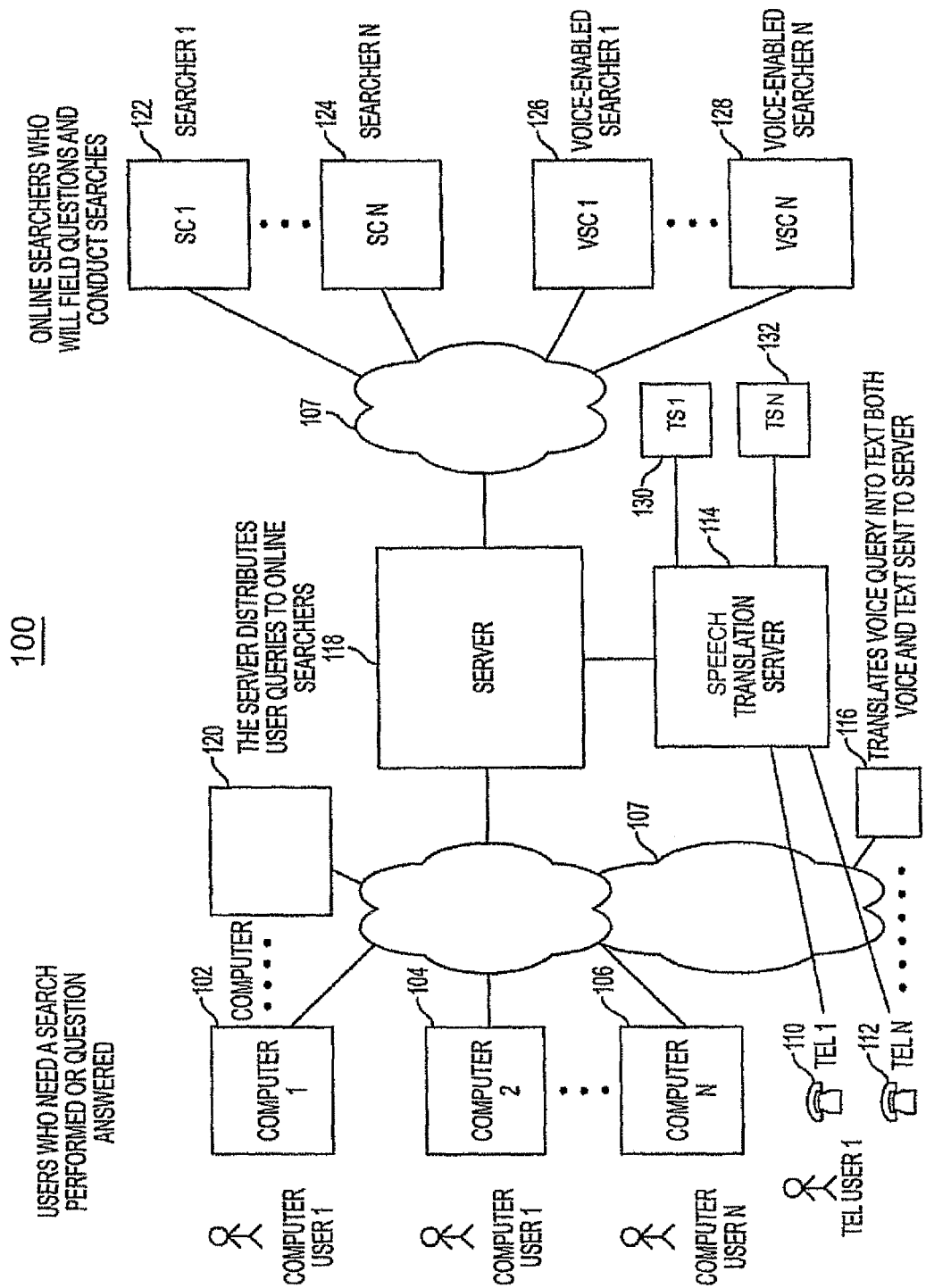
FIG. 1 depicts a system architecture embodiment.

Reference will now be made in detail to the embodiments of the present disclosure, examples of which are illustrated in the accompanying drawings, wherein like reference numerals refer to like elements throughout.

The embodiments of the present disclosure include a system 100 (FIG. 1) that allows queries by users, requesters, or information seekers (InfoSeekers™), such as an employee, a housewife and/or a child, to be searched by human searchers, providers, guides, or workers, who may be professional paid searchers (PaidSearchers™) as well as amateur and/or volunteer searchers, etc. For example, the query (which, throughout this description, may entail a fully-formed question/sentence or a keyword or a list of keywords or a search phrase as previously discussed) might request, for example, the closing time of a particular restaurant, the winner of the 1960 World Series, or information regarding a medical illness (or any other type of query). As depicted in FIG. 1, the queries can originate from user computer systems 102, 104, 106 and are received over a communication system 107 or from telephone handsets 110, 112. The user computer systems can be typical desktop or laptop systems, a handheld computer such as a personal digital assistant (PDA), a basic cellular telephone, a text-enabled or video-enabled cellular telephone, a specialized query terminal, or any other source that allows a user to enter a query via text, image or speech entry. (Note: the words "speech" and "voice" are used interchangeably in this discussion). The telephone handsets can be typical touch-tone telephones, cellular telephones, two-way radios or any other communication device that allows the user to talk or otherwise communicate over a distance. The communication system 107 (FIG. 1) can include packet switched facilities, such as the Internet, circuit switched facilities, such as the public switched telephone network and DSL/ADSL, radio based facilities, such as a wireless network, etc.

In one embodiment, the oral speech queries by telephone handsets 110, 112 are stored in the system database and converted into digital text queries by a speech translation server 114. (Alternatively, a user's computer system 102, 104, 106 or telephone handset 110, 112 may perform this processing). The speech translation server 114 handles the task of translating the speech into text, possibly by interaction with other systems, or it may perform the task locally. It may perform speech-to-text conversion by using either speech transcription using human transcribers and/or using conventional speech-to-text processing, also known as automatic speech recognition (ASR). The speech queries can originate from a user's telephone and can be handled initially via automated attendant speech prompt type processing (or alternatively, via an interactive speech response or IVR system) to obtain the user's query.

The speech translation server 114 keeps track of the port from which a call originates and assigns a user identifier to the user of the telephone handset 110, 112 on this port for a particular session. The speech translation server 114 can prompt the user to speak the query. The speech queries can also originate from another source 116 called a "speech query service requestor" (SQSR) rather than directly from the user, such as a private or public information provider. For example, a speech query can be initially processed by a public library telephone system and switched to the speech translation server 114. The speech query may physically arrive at the system via a variety of input means, including time-division multiplexed lines, voice over IP (VoIP) packets from an Internet connection, and other sources. The speech query may arrive as a stream, packet or series of packets.

Similarly, a commercial site, such as a grocery store ordering system where a user can order food and inquire about recipes for a special after-dinner dessert can initially process a speech query and pass it along to the speech translation server 114.

The SQSR 116 may communicate with the speech translation server 114 via a variety of mechanisms including an IP-based socket address or via a Microsoft® .NET service, making the translation services of the speech translation server 114 widely available via the Internet to any application that wishes to use them.

The packet(s) may then be processed locally at the speech translation server 114 to convert from digitized speech into text or, alternatively, it may be processed by a remote system. If the digitized speech is being transcribed by human transcribers, this can be accomplished by sending the digitized speech to one or more transcriber systems (TS) 130, 132 (FIG. 1) where human transcribers can hear the speech, for example via headphones or speakers, and transcribe the information by typing the text into their system, so that the text is then sent back to the speech translation server 114 (or alternatively, directly to the server 118 or to the SQSR 116), all within a matter of seconds (in at least one embodiment preferably less than 10 seconds after a user has finished speaking the query). To speed up processing, a speech query can be broken up into a stream of packets and passed to a transcriber, without interruption, as it is being spoken by a user, thereby allowing for reduced latency in the system. In at least one embodiment, there are many more transcribers available in the system than there are instantaneous queries so that delays are not induced into the system. In the case of an overflow of queries, a form of flow control may be utilized by telling some callers that they must hold on the line for an available transcriber (which might be described to the caller as holding for an operator or agent). Preferably, the speech translation server 114 maintains a database of all transcribers that are currently logged-in and available to perform the service of transcription using a transcription software application on the transcriber systems 130, 132. Alternatively this function of tracking the availability of transcribers might be located on a remote system and/or might be implemented using a distributed mechanism among transcriber systems 130, 132 (for example, using peer-to-peer mechanisms).

The speech translation server 114 may feed continuous sequential speech phrases from various and different sources (e.g., users) to any given transcriber system 130, 132. Hence, a transcriber may be sequentially transcribing, in rapid succession, speech messages from various speakers and creating separate text packets that are associated with each speech message.

Once a query is in digital text form, it is provided to the server 118. The text entry features of cellular telephones can also be used to enter a query in digital text form allowing users to submit queries textually from telephones.

Queries from a graphical user interface (GUI) of the user computer systems 102, 104, 106 can originate directly from a user, or similar to speech queries, indirectly through a "text query service requestor" (TQSR) 120, which may be any software application or device connected via the Internet, for example. As in the speech query example, a user may be on a grocery store web site ordering food for delivery and may inquire about a recipe for a special dessert. This recipe query could then be forwarded to the server 118. Any web site, software application, consumer electronics device, or other device may become a TQSR or SQSR for performing a search. For example, a set top box offered by a satellite TV or Cable TV provider could offer the ability to enter a query string and act as a TQSR or SQSR. Any software application running on a PC, such as Microsoft® Office Word or Excel®, may also serve as a TQSR or SQSR.

An appropriate interface, such as a graphical user interface (GUI) for the computer system 102 or speech prompt system in the speech translation server 114 can extract a query from a user and transmit the query to the server 118. Queries originating from image-capable sources (e.g., video-enabled cellular phone, PC with a document scanner, etc.) may contain image(s) as part of the query.

Upon the receipt of a query, such as from user computer 102 in this example, the server 118 can provide information (e.g., advertisements) to a user for the user to see and/or hear while the search is being processed. This information can be related to the query (or to the keyword(s) of the query) and may include visual and audio information as appropriate for the user's device and for the source of the query, such as a grocery store ad in the recipe example. This information can include not only advertisements, but also information such as video, audio, music, games, web links, etc. that may interact with and/or display for the user while the search is being performed. The information provided may serve as a source of revenue, for example through advertising. If a user views an ad, or clicks on a link, or purchases a product (sometimes referred to as "conversion") related to an advertisement while awaiting results of a search, the database can be updated to reflect additional ad revenue with a credit of points and/or compensation, if appropriate, to the searcher. A digital text, graphics, audio, or video advertisement may be displayed (or played) on a user computer 102 or on a user telephone 110. A particular advertisement selected may be based on a weight associated with the advertisement based on single or combined factors such as advertiser contract commitments, bidding price of advertisers, popularity with users, keyword mapping to advertisements, statistical usage (e.g., least recently presented), user demographics, geographic data, searcher choice of advertisements, etc.

The server 118 (FIG. 1) processes arriving queries by determining which searcher(s) are available to search for the information being requested, based upon factors such as a searcher being logged-in, searcher(s) who are associated with a keyword, or category, or the ranking of a searcher based on previous performance.

The server 118 may also determine if a particular query has been queried previously and can send a response to a user with previously obtained search results without necessarily invoking a human searcher.

When no previous query results satisfying, or that may satisfy the query, are available, the server 118 sends the query to one or more of the available searchers over the communication system 107. If a query is a speech query, in addition to sending the text version of the query and the keyword(s), a speech recording of the query and any other associated data of the request may be transmitted. The human searchers can be located at computer-based searcher tool systems 122, 124 and/or speech-enabled computer-based searcher tool systems 126, 128 or any other suitable device for receiving requests.

A server selected searcher (or searchers) can review the query, including the keyword(s) and any speech recording or other data and decide whether to accept the search task. If a searcher accepts the search task, this acceptance may be communicated back to the user who originated the query through the server 118. This may happen automatically or manually. Because some searches may require additional information or clarification, a searcher can send a request for additional information to a user. This may be sent through server 118 or via direct link to a user via the communication system 107. The user may reply with a clarification, additional information and/or a revised query. The searcher(s) then uses the searcher tool systems 122, 124, 126, 128 to perform a search of publicly or privately available information to produce search results. For example, a searcher may use conventional tools, such as a browser, to access public databases via searches over the World Wide Web or private databases that may be accessible only to the searcher, such as a database of information previously gathered by the searcher, results stored on the server 118 from other searchers, databases that require payment for access or information available to the searcher in non-electronic form, such as a book on the searcher's bookshelf, test results from a personal experiment, etc. The searcher may also submit the search query, or some version of it to an automated search tool such as the Google® or Ask Jeeves® systems.

The search results, such as an answer, comments by a searcher, web pages, web links, and other query related information, etc. are gathered by the searcher during a search. The result(s) of the search, such as web pages and links which a user can review or use to obtain the information desired, an answer to a question and web pages or links to web pages that support the answer, etc., is transmitted back to the user through the server 118 (FIG. 1) or directly to the user via the communication system 107. The information returned is typically what a searcher believes will satisfy a request of the user. The information can include anything that could satisfy a user request, including a document, a video, a song, a configuration file, pictures, links, etc.

The result(s) may be presented to a user in real-time, associated with the amount of time it takes to select a searcher and do the search. In one embodiment, one or more available searchers are preferably identified within 15 seconds and a searcher preferably begins the work of performing the search within 15 seconds. Searcher selection and initiation of work time limits may be longer or shorter than the above described limits in other embodiments. Depending on the search, the accumulation of relevant results may generally take from a few seconds to a few minutes. The server or search tool may interact with a user automatically preferably every six seconds via a chat session (or via a VoIP connection) in order to identify to the user that progress is being made. This might be as simple as a dot typed on a user's screen or a more detailed automated text message. In one embodiment, when on a telephone, a user may hear and/or watch an advertisement, but during silent periods, user interaction may occur via speech such as having a searcher or an automated speech system say, "Please continue to hold while your search is being performed". A searcher may interact with a user, either of his or her own accord or the searcher tool may remind a searcher to give status to the user. The searcher may also send partial results to the user so that the user may begin to preview results. The server 118 may store the query phrase and the search results for matching with future queries.

When a user is at a telephone handset 110, there are several ways in which results may be returned to the user from the searcher. Result(s) may be conveyed over a real-time VoIP or circuit-switched connection between the user and a searcher. Along with these speech results, other results may be sent to the telephone via a text-messaging system such as SMS. These other results may be in the form of text, graphics, URLs, audio, and/or video. The results may be an audio message recorded by a searcher and played to a user. Alternatively, a searcher's message may refer a user to sources where the user may obtain an answer. The results of a search may alternatively be digital text that has been converted into audio and played to a user. The results can be an audio message concerning where the digital results, or some other type of results, can be found that are accessible to a user. Text results may be played to a user using speech synthesis or speech reading, as is done with audiobooks. The text may be read aloud in real-time by the same (or different) resources (e.g., the transcribers described above) that are being used to transcribe speech to text. It is possible to utilize the network of searcher tool systems 122, 124, 126, 128 (FIG. 1) to perform either transcription of speech to text or the reverse process of converting text to speech. A database may keep track of which searcher resources are capable of providing either of these services, potentially with compensation for said services. In alternative embodiments, in circumstances where needed and/or desired, the results can be provided by postal service or other courier.

The user at computer system 102 or telephone handset 110 reviews the search results and then does or does not "accept" the results. An acceptance can be in the form of the user moving on to some other pursuit (e.g., logging off of the search site or leaving the system idle), the user actually providing an acceptance by activating ("clicking-on") an acceptance button on a user GUI, the user responding to a request for a user response, such as a pop-up or voice prompt, transmitted to the user computer system 102 or telephone handset 110 by the server 118, the user entering a revised, different or follow-on query, or some other action that indicates the user is satisfied or otherwise found the result(s) useful. The user can register dissatisfaction with the query results by requesting that another searcher perform the search again (typically with the exact same search terms or query), for example, by activating a "try again with same search terms" button or a rejection button on a user GUI, by responding to a request from the server 118, by responding to a voice prompt, or by some other action from the user that indicates dissatisfaction or the desire to "get a second opinion". If the user requests that the search be performed again or expresses dissatisfaction, the server 118 may provide the user's query to a new searcher (or searchers).

When a search result is accepted or rejected, a searcher table can be updated to reflect the success rate of the searcher. The number of successful searches (accepted, or not rejected, by a user) for each searcher and the ratio of successful versus total searches for each searcher may be used at an appropriate time to compensate the searcher. Compensation may be dependent upon other factors such as transferring a query to another searcher, sending advertisements to users, spending additional time on a search, transcribing voice to text, dictating text to voice, and/or working with particular categories, keywords, etc.

Figure 2:
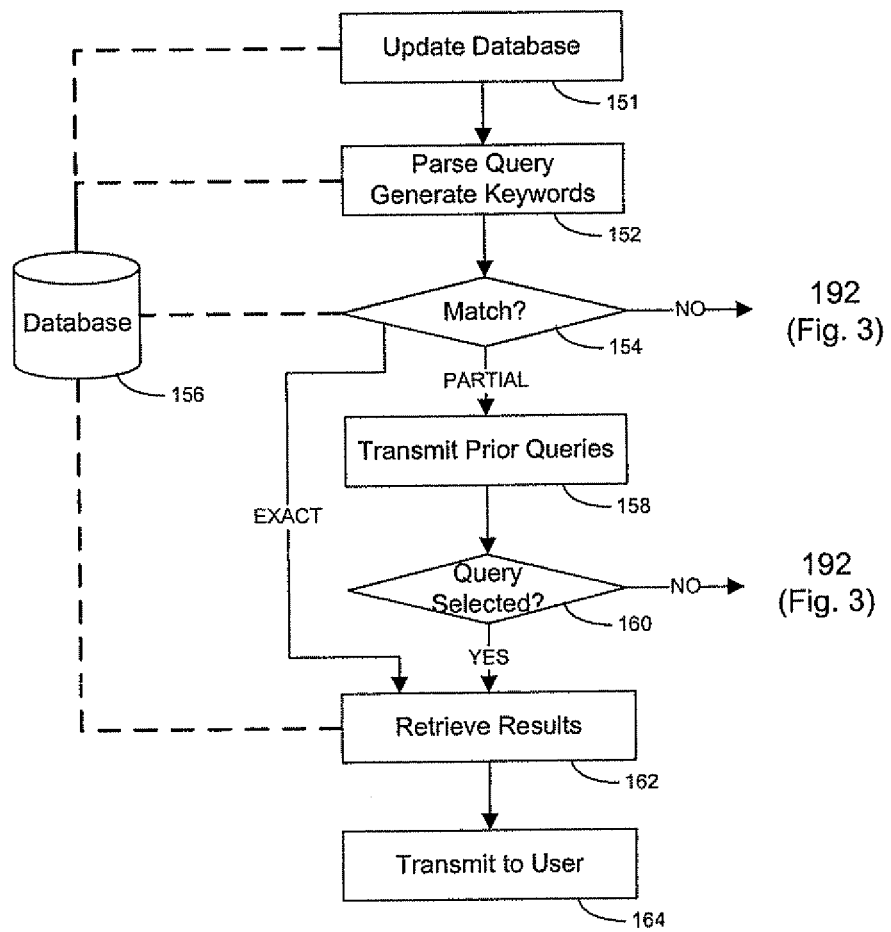
FIG. 2 is a flowchart for reviewing prior queries.

When a query, which can be a natural language query (e.g., a fully-stated question) or a set of keywords, is received by the server 118, the process 150 (FIG. 2) running on server 118 (FIG. 1) updates 151 (FIG. 2) the database 156 with the query, and source IP address. It is also possible to store other "passive" information about a user, such as address, name, GPS or other geographic information, etc. for clarifying the query or dialogues with a searcher when needed or desired. The server 118 (FIG. 1) parses the query and generates 152 (FIG. 2) a set of keyword(s) that may be looked up in the keyword table 184 (FIG. 8) of database 156 (FIG. 2). For later correlation with a user, a query and the keywords, may also be linked in the database 156. In the keyword table 184 (FIG. 8) of database 156 (FIG. 2), a weighting can be attached to any keyword that determines how influential it is in determining a group of searchers to select. At the time that a query is received, the server may also send information, such as an advertisement, to a user computer system 102 (FIG. 1) for display thereon. The advertisement(s) may be linked to one or more of the keywords of the query. The advertisement(s) may alternatively be chosen randomly from an advertisement table 188 (FIG. 8) of database 156 (FIG. 2). The information sent to a user may also indicate that the system is "finding a searcher". It may also be possible to delay the sending of an advertisement until an appropriate searcher (or searchers) is chosen. The searcher (or searchers) may have an option to choose the advertisement(s) that is sent to the user, which might be based upon the query and/or keyword(s) and/or the searcher's assessment of which advertisement(s) to send. The advertisement choice may be accomplished by a searcher predefining which advertisement(s) should be displayed and/or played for a user that is sent to a searcher associated with a particular keyword.

The parse operation of process 150 (FIG. 2) can also check a query to see if it is a follow-on query to a previously submitted query by a particular user during a particular session, for the purpose of having the same searcher(s) handle a follow-on query from the user. This may be determined by checking whether the user has previously received search results in this session and comparing keywords of the previous query to the current query, or by examining a follow-on query flag set by the user's browser or search application if the user chooses to elevate the status of a particular searcher (e.g., by clicking a button that says, "if possible, give me this searcher again if I search in this topic area"). Cookies may be used to store keyword and searcher information on a user's computer or device given that the server may not know the identity of the user. If so, the database 156 (FIG. 2) may be updated to link the query to the searcher that handled the prior query or, alternatively to set the rank of this searcher to the highest value temporarily for a user and for a given keyword. If users become comfortable identifying themselves when searching, then the server 118 (FIG. 1) may perform the function of linking a user and a searcher if the user and/or searcher make such a request for connection. As an incentive to a user to provide identifying information such as name, user ID, e-mail address, etc., the option of getting repeat service from a searcher(s) may be offered as an option to a user.

The query is then matched 154 (FIG. 2) to the previous queries stored in database 156. The database 156, among other things, may store previous queries (or a subset of previous queries, such as ones still considered relevant, wherein said relevance might pertain to time, location, or subject matter, etc.), the corresponding keyword(s) from the previous queries and the accepted "relevant" results associated with corresponding keyword(s) and query(ies). The matching 154 may compare the keywords of the current query with the keyword(s) of previous queries for an exact, partial or fuzzy (highly similar) match. This may result in several previous queries matching the current query. If a match does not occur, the process 190 associated with finding or selecting a searcher (or searchers) to perform a search continues (see FIG. 3).

If an exact match occurs 154 (FIG. 2) the system proceeds to retrieve 162 and transmit 164 the corresponding search result(s) to the user and possibly deliver a new advertisement (s), or alternately, deliver advertisement(s) concurrently to delivering the search result(s) to a user.

If a fuzzy or partial match 154 is found between the current query and a previous query, a number of the closest matching previous query phrases, such as the top three, may be transmitted 158 to and displayed and/or spoken for a user. The system may also send a new advertisement(s) to a user and/or await a reply from the user as to whether any of these query phrases are an acceptable response to the current query. If the user's selection 160 (conveyed, for example, by clicking on a GUI button or cellular phone key to indicate the user wishes to proceed with the original phrasing of the query) indicates that none of the "matching" queries is an acceptable response to the original query, then the process 190 (FIG. 3) associated with finding or selecting a searcher (or searchers) to perform a search continues 192.

If a user selects 160 (FIG. 2) one of the fuzzy or partial match queries as a reply to the query, the system retrieves 162 the results from the database 156 and transmits 164 the results to the user. The system may be configured to present an advertisement(s) or other information along with the results. If the result(s) are accepted by the current user (i.e., considered relevant again), the searcher who produced the result(s) in response to the original query may be given additional compensation which is stored in the searcher table 182 (FIG. 8) of database 156 (FIG. 2). The query results may be kept in the database 156 if users find the results relevant. In at least one embodiment, if a certain threshold (configurable at the system level) of users consider the results not relevant or not satisfactory, then the results may no longer be offered to future users (and the results might be deleted from the database).

Figure 3:
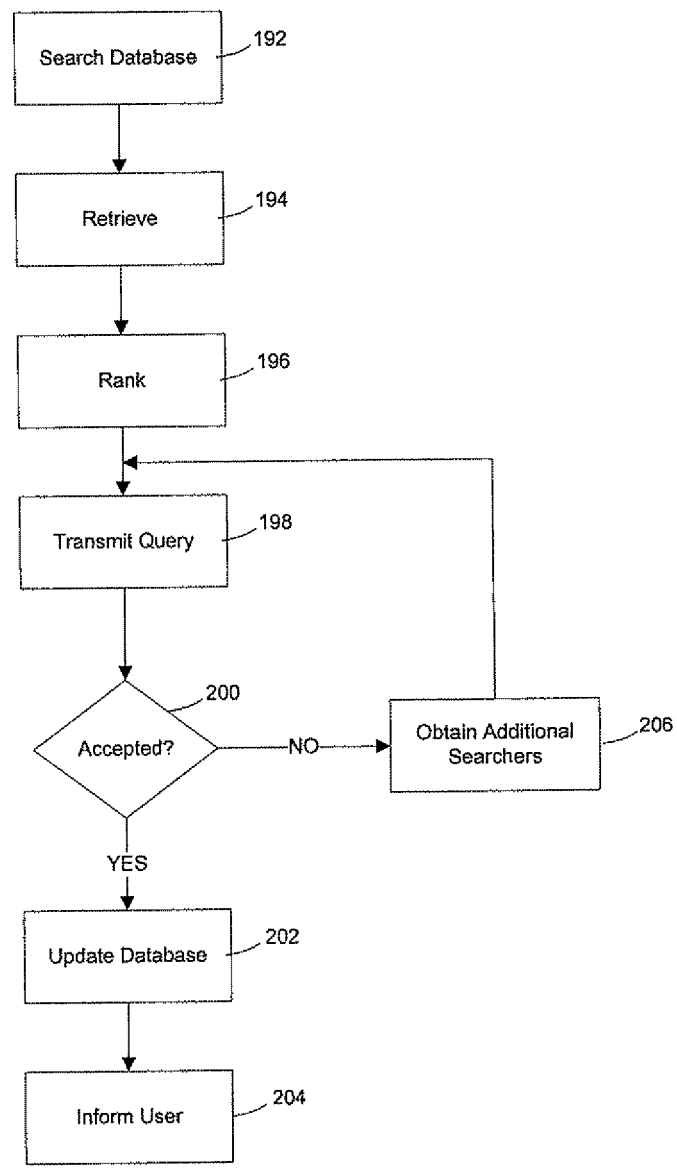
FIG. 3 is a flowchart for finding or selecting a searcher.

If no match 154 (FIG. 2) is found between the current query and a previous query, or if the query does not result in the use of previous search results, the process 190 of FIG. 3 begins and the keyword(s) of the current query are used to search 192 the database 156 (FIG. 2) for keyword(s) and/or phrase(s) that match the query. At this time, the keyword(s) may also be sent to a conventional search engine, such as Google®, to have a search performed, the results of which may be passed to the searcher(s) accepting the search. To select a searcher, keyword(s), corresponding database entries, such as searcher identifiers, searcher success rate, availability, etc. are retrieved 194 (FIG. 3). The keywords found in the database 156 (FIG. 2) may be ranked according to the importance they may carry in a search query, or according to any other suitable ranking method.

Figure 3A:
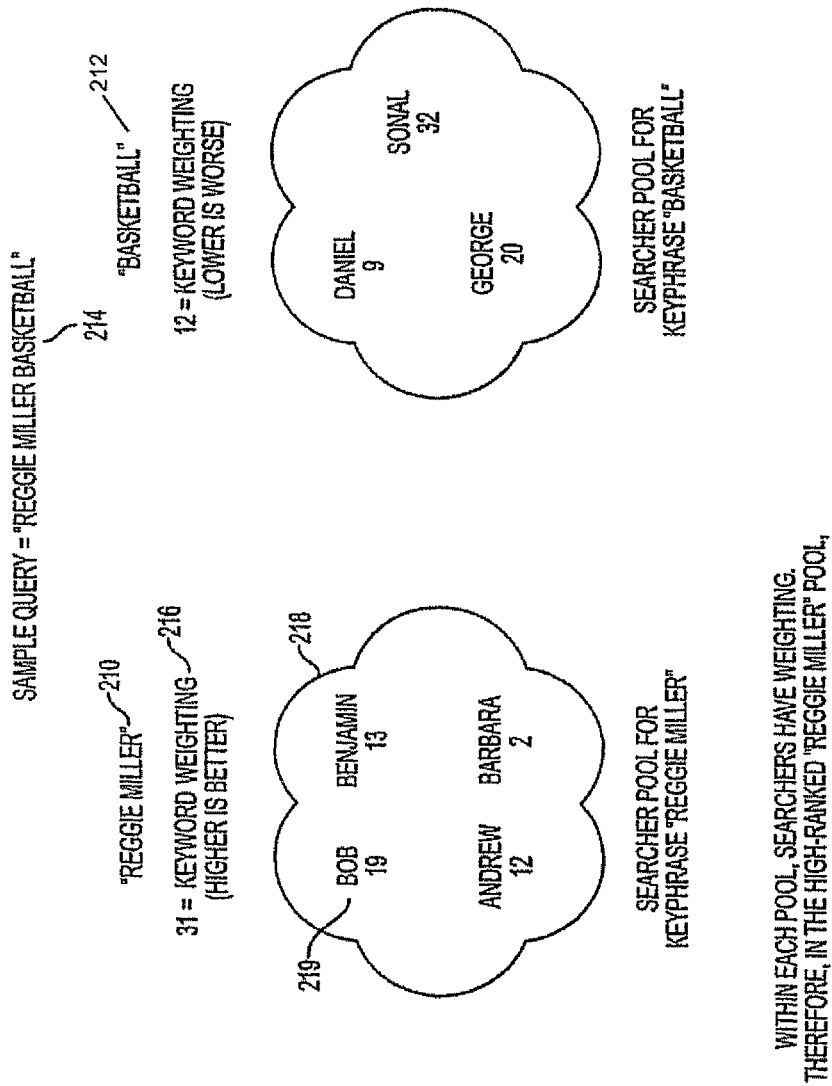
FIG. 3A is a diagram illustrating how a searcher may be selected.

In at least one embodiment, the keyword(s) found while searching the database 156 may be ranked according to the importance they may carry in a search query phrase. In this ranking a keyword such as "Reggie Miller" 210 (FIG. 3A) might be ranked higher than a keyword such as "basketball" 212 because "Reggie Miller" is more specific. Therefore, generally, if a searcher(s) is associated with a more specific keyword, then it is an object of this disclosure to have the more targeted searcher(s) respond to a user's request. Hence, in a query such as "Reggie Miller basketball" 214, a searcher would be selected based on the higher ranking keyword 216 of the query, which is a searcher associated with the keyword "Reggie Miller", and therefore should have more targeted domain-specific knowledge about Reggie Miller than a searcher who signed-up for the keyword "basketball". (An automated mechanism for ranking keywords is described below). Within the searcher pool 218 for a keyword, the searcher with the highest rank 219 would be chosen by the server 118 (FIG. 1) to receive the query. Words such as "a", "an", "the", "is", "what", "why", "how" might be given a low keyword importance rating.

If there are multiple searchers in the pool representing the highest-ranking keyword 216 (FIG. 3A) for the query, then the highest ranked searcher 219 of the searcher pool 218 may be selected first. A list of available searchers is sorted or ranked 196 (FIG. 3) according to one or more of the number of keywords of the query that match corresponding keywords of a searcher, keyword rank, searcher rank, the success rating of the searchers, etc.

If a searcher is signed-up for multiple keywords in a query, (e.g., a searcher might be signed-up for both "baseball" and "world series"), then that searcher may take priority over searchers who are signed-up for fewer matching keywords in the search query phrase (e.g., a searcher who is signed-up for either "baseball" or "world series" but not both).

If the query is a follow-on query (and a user has indicated a desire to have a previous searcher help with future searches related to a particular keyword(s) or category), the "legacy searcher" may be ranked the highest in the list. For the top ranked searcher, the query, including keywords, etc, is transmitted 198 (FIG. 3) to his or her searcher tool system, for example computer system 122 (FIG. 1). An alternative implementation could send the query to multiple searchers, for example, at systems 122, 124, 126, 128 simultaneously to determine which available searcher will respond to the query most quickly. In such alternative implementation, similar to a game show, the first person to hit the "I'll handle the search" or accept button "wins" the search. Alternatively, multiple searchers may search a query and the aggregate result(s) could be returned to the user (possibly with multiple chat sessions between the user and searcher(s) to enable clarification, etc.). If one or more keywords of the query are not found in the database 156 (FIG. 2), the database may be updated to include the keywords and the keywords may be linked to the query. Searchers may sign up for new keywords in the future.

If no searcher is identified for a query, the server 118 (FIG. 1) may forward the query to "generalist searchers" who may attempt to answer queries in any category. Alternatively, the server may deliver the query to a search engine(s) and/or meta-search engine(s) in an attempt to provide the user with a base level of functionality that is not worse than the best available search engine(s). The result(s) may be passed back to the user. A query may be passed to a system of experts who answer questions on a website such as Google® Answers or Yahoo!® Answers, and a user may be given a pointer to a location of the query which may be answered in the future. These systems may not give real-time feedback, but the user may check back in the future.

If the system has stored a new keyword(s), searchers may choose to sign-up for the keyword(s). The keyword table 184 (FIG. 8) of database 156 (FIG. 2) may be inspected by a searcher(s) to determine the ranking, traffic, and/or searcher (s) related to a keyword(s), which may further inform (and possibly motivate) a searcher(s) to be associated with various keyword(s).

If the search is accepted 200 (FIG. 3) by one (or more) searcher(s), the database may be updated 202 to link the searcher to the query, keyword(s), etc., and may indicate the searcher handling a query, etc. In the case where the query is sent to multiple searchers, it is possible to configure the system to inform any of the contacted searchers, except the first to accept the query, that the query has been accepted by another searcher and indicate that they may choose to discontinue their searching. The database may be updated so that the searchers can be made "available" to accept other users' queries. It is also possible for the system to allow the searchers who have accepted the query to continue the search. If at least one searcher has accepted the search, a message may be sent 204 to a user to indicate that the search is "in progress". The message may be accompanied by other information, such as an advertisement. Advertisement(s) can be selected by the server 118 (FIG. 1) and/or selected by a searcher based on the query (and/or keywords) accepted. If an advertisement suggested by a searcher is sent to a user, the database 156 (FIG. 2) may be updated to indicate that the searcher is to be compensated for the advertisement being sent to the user.

In the case where searches are notified sequentially and the currently-selected searcher does not accept the search (by pressing a button to "reject", by not responding within a configurable, preferably short period of time, such as 6-18 seconds, etc.), the next highest ranked searcher is obtained 206 (FIG. 3) from the list and the query is transmitted 198 to that searcher. Since it may take more time than a user is expecting to find a searcher in this situation, the server 118 (FIG. 1) may send additional information to the user, such as a game, a video and/or other advertisement(s) such as an interactive advertisement. The user is or may be updated periodically of the search progress.

If a searcher does not feel qualified to conduct a search sent to him or her, then it is generally better for the searcher to do a "transfer to another searcher" to expeditiously get a user better results from another searcher. This preferably creates a better user experience. The searcher may be compensated in some way for choosing to transfer a request to another searcher. In some cases, the compensation for the original searcher may be contingent upon the success of the next searcher. However, if the search is transferred more than a preset number of times (e.g., three times), then, in one embodiment, the server 118 may return the "default" answer of at least one of the top search engines for this query string. This ensures that the user is receiving no worse results than those of other top search engines. A user, a provider, or the system may be able to select which search engine is used as the "default". This information may be stored on the user's local system (e.g., as a cookie) or if the user is "logged-in" to the server, then user profile information may be kept there. A gift certificate or prize may be awarded in this case in order to encourage the user to continue using the human-assisted search engine even though a searcher was not readily available for a particular search. The query may also be passed to a question/answer website such as Google® Answers or Yahoo!® Answers for an eventual answer to the query from an "expert" from those websites. The user may be given a link to the query at the other website.

If the end of the list of potential searchers is reached, the system may obtain 206 (FIG. 3) additional searchers that have become available since the query was received and notify the searcher(s) of the query or may send the query to an available searcher registered for general searches. Alternatively, the system may use a variety of mechanisms such as using thesaurus-like relationships between words to send a query to a searcher that is signed-up for a keyword pool that is deemed closest to the keyword(s) of the query. The system may be configured to set the threshold for the degree of closeness of the user-entered keyword versus the search pool associated with a similar keyword. And as noted above, the results from a search engine can also be provided.

Figure 4:
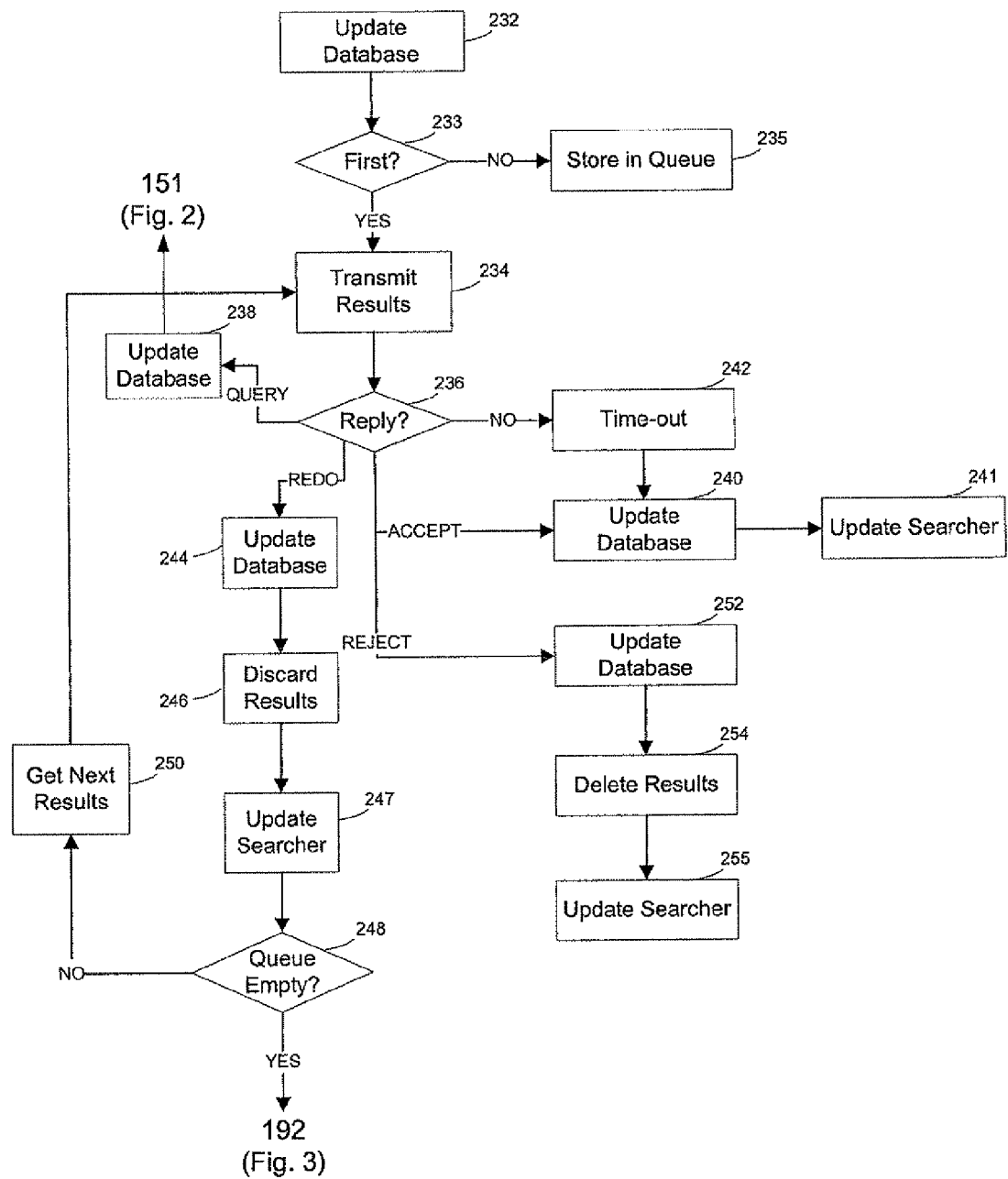
FIG. 4 is a flowchart for search result processing.

When search results are received from a searcher, the database 156 (FIG. 2) is updated 232 (FIG. 4) to store the resources linked to the keywords, the query, the searcher, the time required to complete the search, etc. and the results. If the system has been configured to allow multiple simultaneous searches based on a query, and if there is a first 233 set of search results, the results are transmitted 234 to the user (which is the case when the query is sent to only one searcher). For a telephone-based user this may involve converting the results into audio information or transmitting the information to the user via a text message (or mail), or both. The transmitted text, video, audio, file, or mail may also include an advertisement(s) linked to the keywords or selected by a searcher. If a result is not a first set of search results, it is the second set of search results; the search results may be temporarily stored 235, for example, in a push down type results queue and the replying searcher may be notified that the results are in a results waiting queue.

If any result is transmitted 234, the system then waits for a reply 236. If the reply is that the user wishes to perform an entirely new query, the database 156 (FIG. 2) is updated 238 (FIG. 4) to reflect the search results and the processes 150 and 190 of FIGS. 2 and 3 respectively, are executed for the new query. The update 238 (FIG. 4) updates the query, keyword (s), result(s), user(s), searcher(s) entry(ies), etc.

If the reply is an explicit acceptance, such as a user clicking the accept button of the user GUI or the user logs out of the search system, the system updates 240 (FIG. 4) the database, may delete the contents of the queue, etc. The user may be sent a message(s) and/or advertisement(s) linked to the search results. The human searcher may be notified of the user's acceptance of the results.

If the period for a reply times-out 242 (FIG. 4), indicating that the user has moved on, the system updates 240 the database 156 (FIG. 2) to reflect a successful search. The database entry for the human searcher is updated 241 (FIG. 4) about the successful search. That is, the database 156 (FIG. 2) is updated to reflect a successful search having been accomplished by the human searcher (allowing the human searcher to be compensated), linking the stored successful search results with the searcher and the query, keywords, etc. The human searcher may be notified that the user has accepted the results by default.

If the reply 236 (FIG. 4) indicates that the user is requesting that the search be redone with the same query, the database is updated 244 to reflect an unsuccessful search, the search results may be discarded 246 (or made unavailable in future searches although the results may be kept for auditing purposes) and the database entry for the searcher is updated 247 to reflect that the search was unsatisfactory for the user. The searcher may be notified that the results were not acceptable. If the queue is empty 248, a new searcher may be selected to perform a search for the query using process 190 (see FIG. 3). This redo reply can also result in the system sending a user message indicating the system is repeating the search, and information to entertain and/or engage the user, such as a video clip(s) of a popular comedy or an advertisement(s) that includes a discount coupon. The database update 244 (FIG. 4) updates the total number of searches by this searcher without updating the number of successful searches, deletes (or marks them as not to be used) the search results of this search, etc. If the search results queue is not empty 248, the next entry is taken 250 from the queue and transmitted 234 to the user.

If the reply is rejected, the database is updated 252 to reflect an unsuccessful search, the results are discarded or deleted 254 and the database entry for the searcher is updated 255 about the rejected search. That is, the total number of searches for this human searcher is updated without updating the successful search total; any comments provided by the user may be linked to the searcher, etc. The human searcher may also be notified. The system may send the user a message apologizing for the failure and some sort of inducement to use the system again, such as a free popular video, song, game, discount coupon, etc. A set of results can be sent to the user from at least one of the top-ranked search engines using the user's original query. A user may be able to specify what "default search engine" to be used in such cases.

Figure 5:
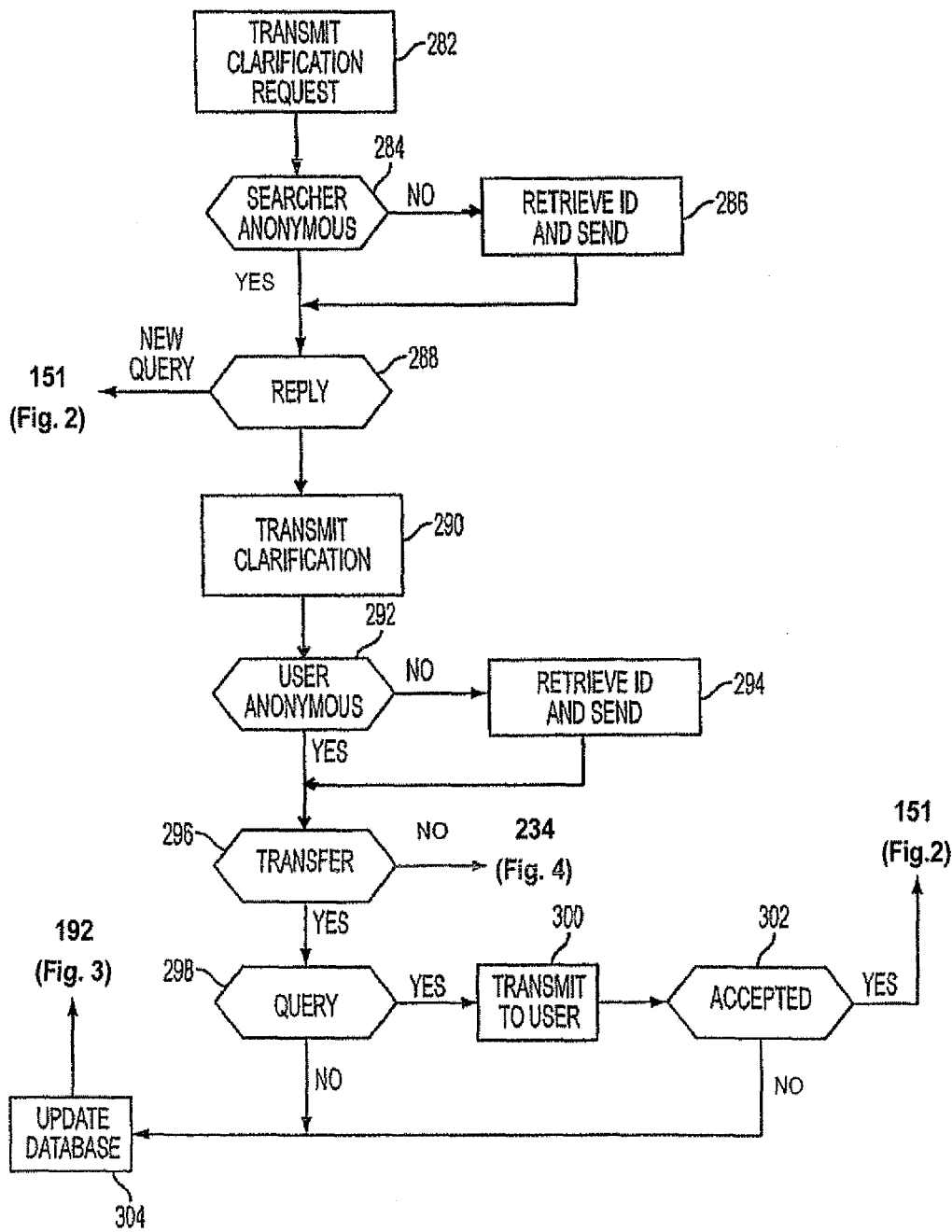
FIG. 5 is a flowchart for query clarification operations.

When a clarification request is received by the server 118 (FIG. 1), the process 280 (FIG. 5) begins when, the clarification request is transmitted 282 to the user, such as to computer system 102 (FIG. 1). The clarification request may be sent to other searchers who have accepted the query. A clarification request can be in the form of a digital message, such as an instant message (IM), an audio message, using a voice over IP (VoIP) connection, etc., and/or a speech message packet that can be played by a user computer or telephone. The system also checks the request and the database 156 (FIG. 2) to determine 284 (FIG. 5) if a searcher has indicated a desire to remain anonymous. If the system determines 284 that a searcher has not indicated a desire to remain anonymous, the searcher identity (e-mail address namer etc.) is retrieved 286 from the database 156 (FIG. 2) and transmitted 286 (FIG. 5) to the user.

The system then awaits a reply 288 from the user. If the reply is a newly constructed query, the system may be updated invoking the searcher selection process 150 and 190 (See FIGS. 2 and 3). The system monitors to see if a reformulated query submitted by a user may cause the server 118 (FIG. 1) to send the query to the same searcher.

The user reply 288 (FIG. 5) can be a message that provides additional explanation to a searcher. This clarification message is transmitted 290 to the searcher. If multiple searchers have accepted the query, the system may provide the clarification to all searchers. The system may provide the entire chat interaction to all participants (i.e., the user and one or more searchers). The system then checks 292 the original query and the database 156 (FIG. 2) to see if the user desires to remain anonymous and, if not, the user's ID info is retrieved from the database 156 and sent 294 (FIG. 5) to selected searcher(s). The system then awaits the results of a search or another clarification request. The system may allow the user and searcher to communicate independently for further clarification when they do not remain anonymous or all requests can be routed through the server 118 (FIG. 1) either anonymously or fully identified or partially identified.

A searcher, once clarification is obtained may recognize that a query is out of the searcher's search expertise and the searcher may choose to transfer 296 (FIG. 5) the clarified query should be transferred to another searcher. As part of the transfer, the searcher can clarify the query for the next searcher (and for the user). The system, when such a transfer request is received 296, checks 298 to see if the transfer includes a searcher suggested query. If so, it is transmitted 300 to the user and displayed as a revised query in the query frame or as a revised query in the clarification request/answer frames of the user GUI. The query is used to update the database, which includes removing the link between the query and the searcher. Alternatively, the user may be allowed to approve 302 the modified query before a new search is invoked with the modified query. The searcher is permitted to transfer a query without incurring an update to the searcher's statistics that indicate the searcher did not produce successful search results. That is, a searcher is not penalized for recognizing that they cannot handle the query. The searcher has an incentive to pass along a query when he or she does not feel qualified to perform a given search. If the user does not accept the revised query or the searcher did not produce one, the database is updated 304 to mark the query as a transferred query, the link to the searcher is removed and the list of searchers is accessed 206 to find another searcher or set of searchers using the previously described process. In this event, the searcher is also not penalized. When the search is transferred, all of the "instant message" or "chat" interaction of the first searcher is transferred to the subsequent searcher so that there is history and context that does not need to be repeated between the user and searcher.

Figure 10A:
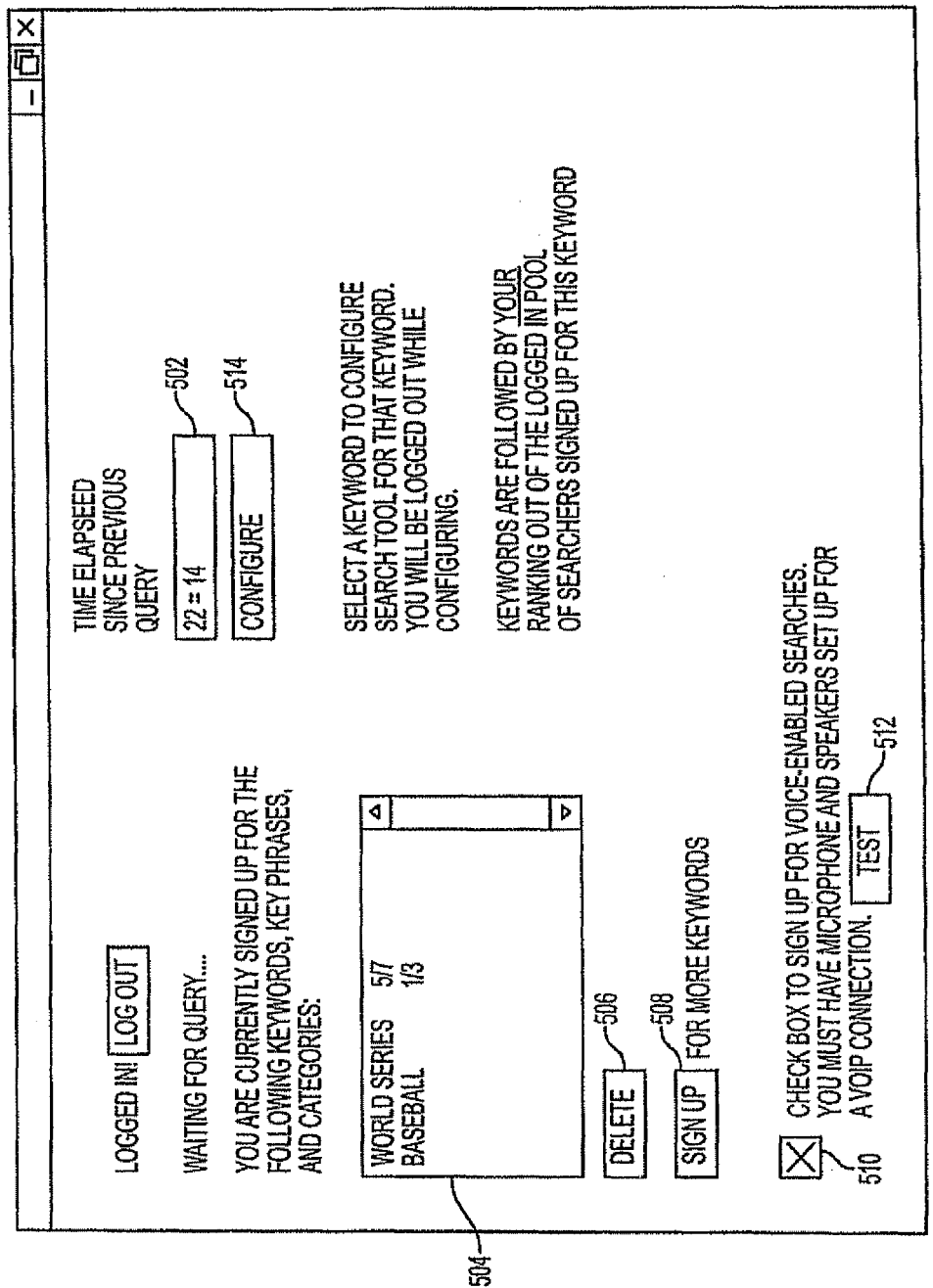
Figure 10B:
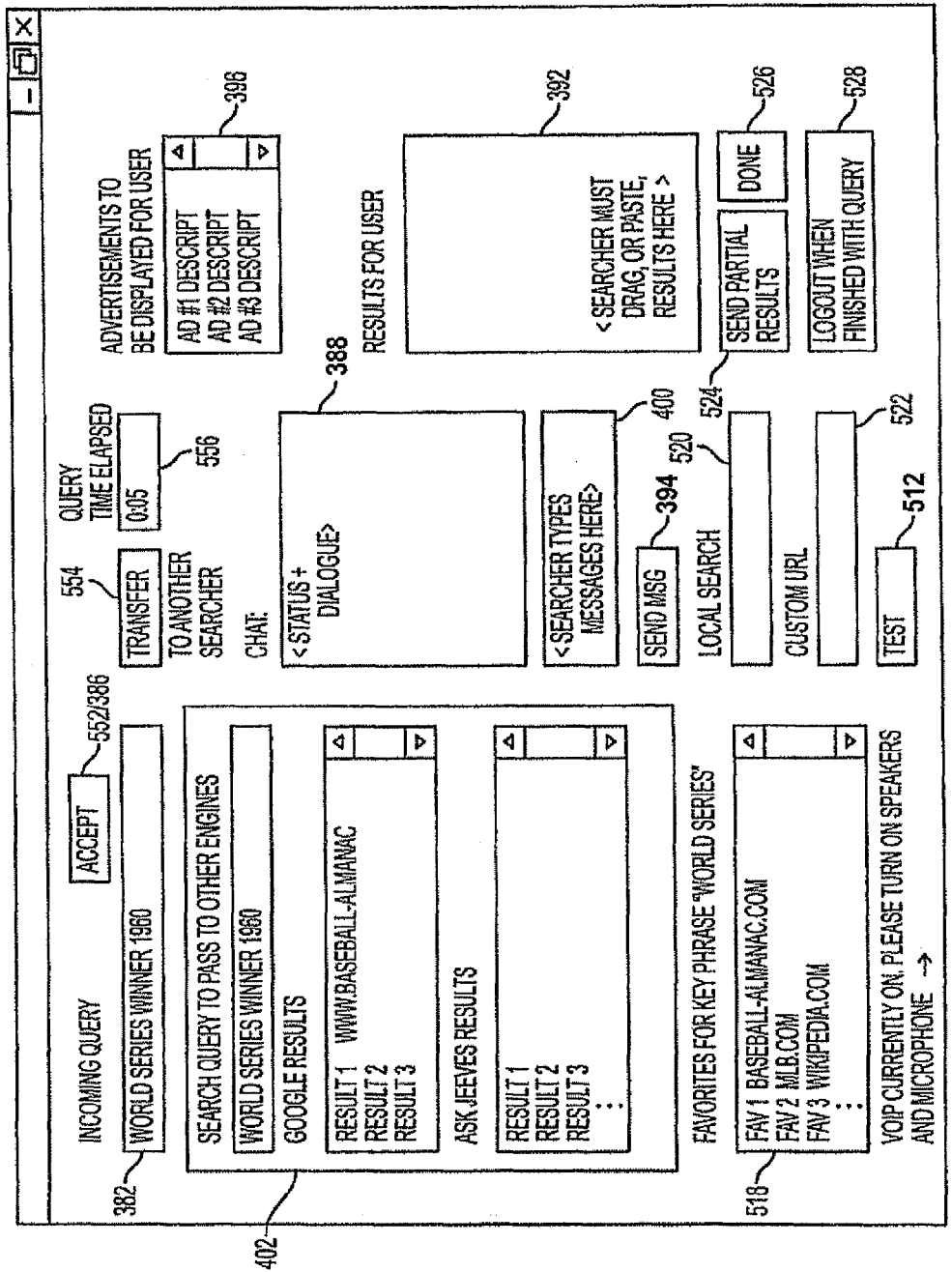

When the "old" searcher has decided to transfer to a new searcher, the old searcher hits a "transfer" button 554 on the searcher tool screen 550 (see FIG. 10B). The searcher may transfer the search to another searcher by selecting the keyword that seems most likely to have searchers that will know the answer to the user's query. In other words, a human can determine what seems to be the most relevant keyword in the search query. When the searcher clicks the "transfer" button 554, a new display 650 (see FIG. 10D) allows the searcher to perform the transfer operation. In at least one embodiment, a query string is presented to the searcher, for example in a query string text box 652. In this embodiment all pertinent keywords in the query string are displayed in a pertinent keywords frame 653, illustratively displayed below the query string text box 652. For the example, when the query string "world series winner 1960" is displayed in the query string text box 652, the pertinent keyword frame 653 may display the keywords "world" "series" "winner", "1960", "world series", and "world series winner" that searchers might have signed-up for. In the pertinent keywords frame 653, the keywords for which searchers have registered to perform searches may be presented on a clickable icon or button that allows the current searcher to select what is believed to be the most appropriate keyword for providing acceptable results to the query being transferred. In the illustrated embodiment, the number of currently available searchers who have registered to perform searches for each keyword, i.e., the pool of available searchers, represented in the pertinent keyword frame 653 is displayed below the icon or button for each keyword. In the illustrated embodiment, only the "world series winner" icon 656 and the searcher pool 654 of available searches registered for the "world series winner" keyword are identified by reference numerals. By selecting icon or button 656 associated with the keyword "world series winner", the human searcher will likely select a searcher out of a pool 654 of two currently logged-in "world series winner" searchers who seem perhaps most qualified to find relevant results regarding winners of the World Series. By selecting the button 656, the human searcher affects a transfer to this new searcher pool. By choosing a searcher that is most likely able to give relevant results, the original searcher may also be compensated if the subsequent search is considered successful by the user. A searcher(s) may be obtained 206 from the pool and the query is transmitted 198 to the searchers, as shown, for example, in FIG. 3.

Transferring 296 can be one factor utilized in ranking keywords (see above regarding importance of having a ranking for keywords in order to choose which pool of searchers to choose from during the initial routing of a query to an appropriate searcher). If an initial searcher (associated with an initial keyword selected by the server as the highest ranked keyword in a query) picks a different keyword to send with the query, then the weighting of the initial keyword decreases and the importance of the new keyword increases. Therefore, over time, when these two keywords show up in the same query phrase, the higher-weighted keyword selects for the searcher pool that will get the initial notification to perform the search.

The weighting of keywords can be kept on a global basis, decrementing and incrementing the weightings regardless of the keyword pairings. An alternative approach that may require more resources but may provide better results is to store keyword pairs and monitor the weighting within the specific pairing. An example of this might be, "How many police helicopter pilots are there in the NYC area?" which might initially trigger a search performed by a searcher who has signed-up for the keyword "police". However, over time, it might be that those searchers do not feel competent to deliver an answer so they transfer such queries to searchers linked to the keyword(s) "helicopter" or "helicopter pilot". Over time, the latter words may become higher weighted so that such a search would go to the "helicopter pilot" searchers first, rather than the "police" searchers. Initial keyword weightings may be assigned based on keyword or word frequency of occurrence in web documents, search queries from other search engines, etc.

When a transfer of a query occurs, the system can send a message to a user that another searcher is being sought to handle the query in order to give the user better service. Information to entertain and/or engage the user, such as an advertisement or other information can also be sent.

Having the system facilitate a dialog between the searcher and a user through these operations may allow a user to receive a higher quality and more rewarding search experience. The dialog allows the user to guide the searcher so that a better search result can be produced. The dialog may be conducted through the server 118 (FIG. 1) or, alternatively, by a mechanism such as instant messaging directly between two computers, telephones, or devices (or using a different server than the one provided by this service). The dialog may also occur via mechanisms such as VoIP, circuit-switched voice networks, or voice packet networks.

When the end of a billing period is reached, the server accesses the database 156 (FIG. 2) to obtain information associated with the success of the searchers (e.g., relevance of the results to the end user), the number of advertisements, advertisements selected by the searcher, the speed of response, etc. and applies a formula that may take these factors into account in order to compute a remuneration for the searcher. The server may also apply a formula to compute the advertising cost for the advertisement (paid by the advertiser) that can take into account the number of times an advertisement has been presented, the length of time a user watched an ad, whether the user "clicked through" the ad, whether the user bought products or services from the advertiser's website (this information may be delivered back to the server from the advertiser), etc. Appropriate payments to searchers and bills to advertisers can then be sent out. Searchers may receive their payment via an "account" on the system which continues to accrue credits, points, dollars, etc. until a searcher asks for a payout, which might occur via any form of payment, or the searcher may chose to spend their credits, points and/or dollars, etc. on products that are offered via the search tool system.

Figure 6:
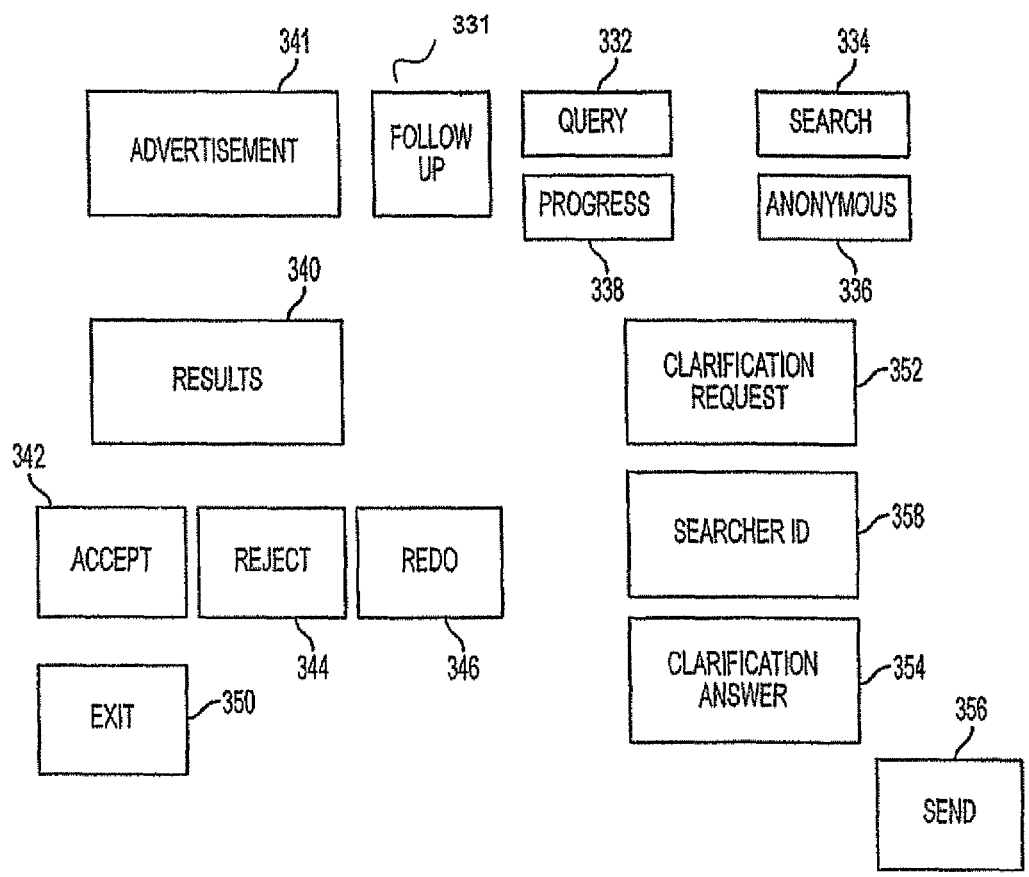
FIG. 6 is an exemplary user or requester graphical user interface (GUI).
Figure 9A:
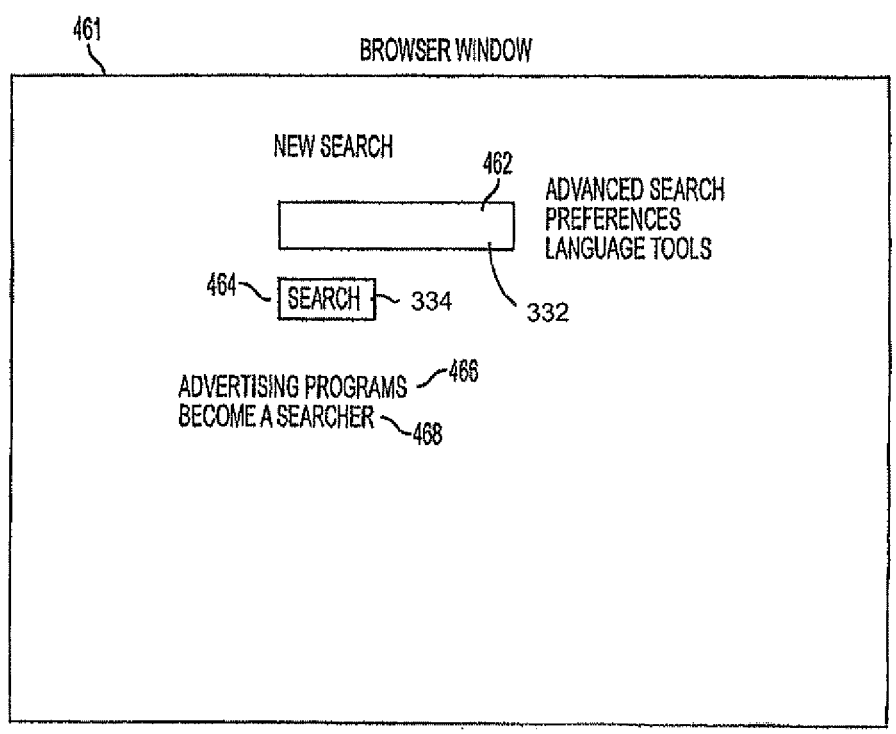
FIGS. 9A-9C illustrate different phases of an exemplary user GUI during a search session.
Figure 9B:
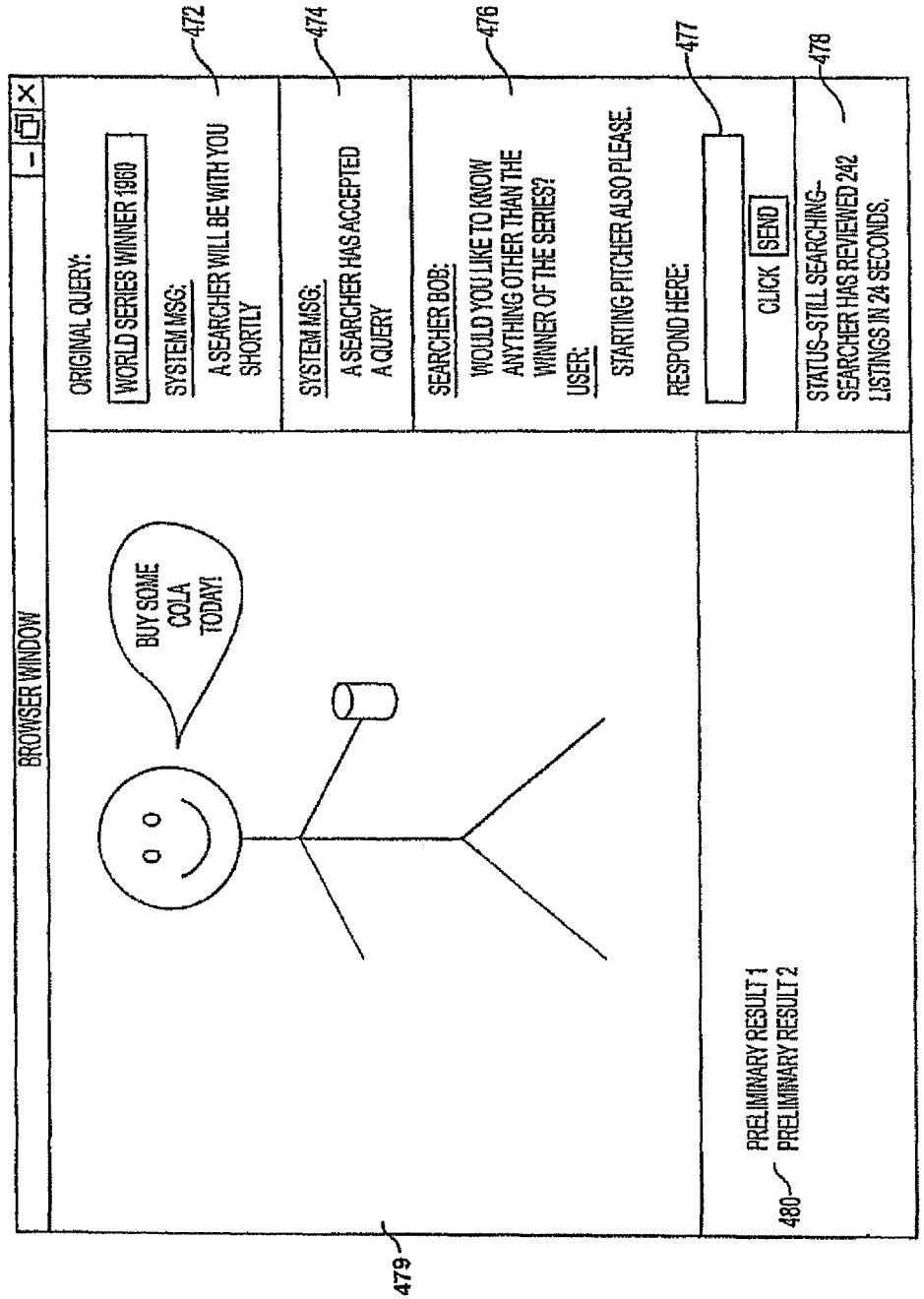
Figure 9C:
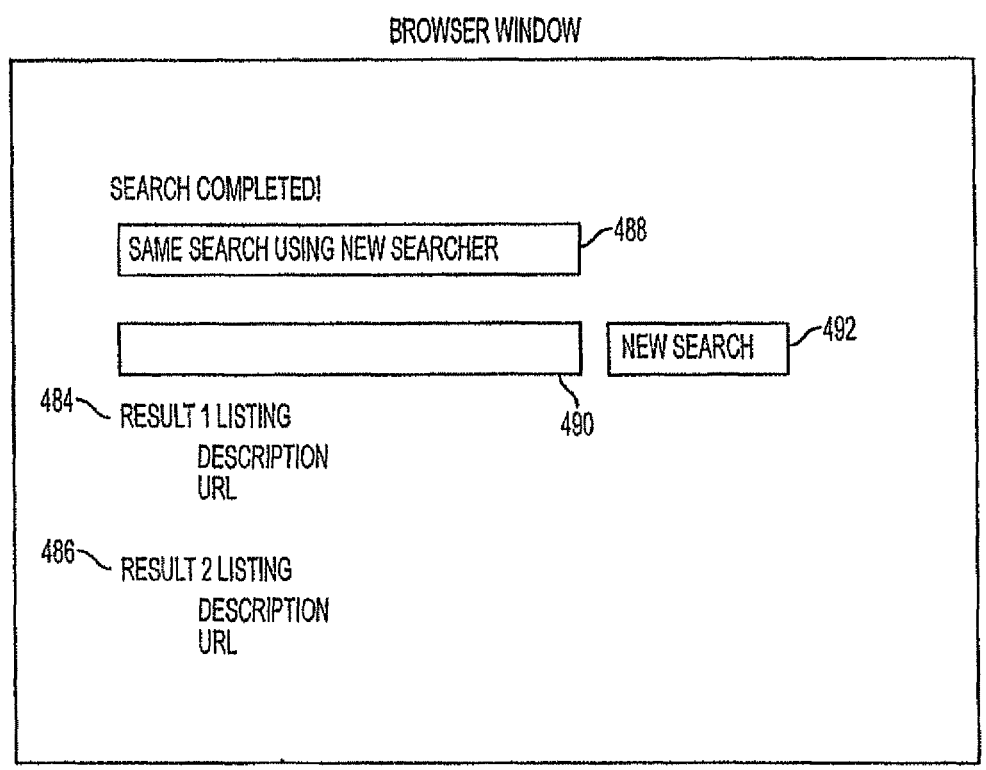

A user system, such as computer system 102 (FIG. 1), may present a user with a graphical user interface (GUI) 330. The basic components of the user GUI 330 are depicted in FIG. 6. FIGS. 9A-9C show a possible layout of other components of the user GUI 330 and an example of its usage. The components of the GUI 330 (FIG. 6) may include a frame (or field/window) for a query 332 and a control or button 334 to start a search. The user can also activate a button 336 to signify that they do not want to remain anonymous to the searcher, which prompts the user to login or to setup an account (register) so that logins are possible. A progress frame 338 can be displayed to show the user information of the progress of the search and a follow up frame 331 may be provided to send and receive data regarding searches which have been deferred or are pending for results. A results frame 340 can display the results of the search and buttons are provided to accept 342, reject 344 and redo 346 the search. The text of the redo button 346 may say "Click here if you are not pleased and want to repeat your search with a new searcher" and the buttons 342 and 344 may be eliminated. The accept, reject and redo input indications available to the user may be implemented in various action buttons without modifying the basic functionality. An information frame 341 can also be provided for the information, such as an advertisement, provided to the user during the stages of the search and/or the result frame 340 may be used for the presentation of the information (e.g., an advertisement). An exit button 350 may also be provided which can result in log-off from the search system. If a searcher requests clarification, the request may be presented in clarification request frame 352 and the user can enter the clarification in clarification request frame 354. The user may send the clarification by activating a send button 356 or by simply hitting "enter" on a PC keyboard, as would be done with a chat session. The searcher identification can also appear in searcher ID frame 358. Alternatively, both the user's and searcher's comments may appear in the same frame, similar to the way many chat services are structured, designating each person's comments via a tag which could be their real identity, a user ID, or a temporary ID, etc.

The GUI 330 has an associated GUI data structure or database (not shown) that may store the contents of each of the buttons and frames or fields. For example, the data structure may store a flag indicating whether the user is anonymous, whether a search has been requested, the contents of the clarification request frame, the content of the results frame, etc. This GUI data structure is mirrored in the database 156 (FIG. 2) of the server 118 (FIG. 1) and when the database in the server is updated, the content of the GUI data structure and GUI can also be updated. The entire contents or any subset of the GUI data structure can be transmitted to the server 118 any time a user activates a button and the server responds with an update to the GUI data structure (and GUI). The entire contents of the GUI data structure can also be updated when events occur at the server, such as when an advertisement is to be displayed. Alternatively, and preferably, to keep the user GUI simple, the system may only provide the frames and buttons, as they are needed. For example, until a clarification request is made, the GUI need not display the frames 352, 354 and/or button 356. To minimize any visual overload that may be presented by the GUI and keep the presentation to the user simple when they first come to the website, only the search query frame 332 and the "search" button 334 may be initially presented to the user along with a minimal amount of text such as the title of the company (see FIG. 9A). Once a user has entered a query, other frames may appear on the display such as an advertisement 341, progress indication 338, and the chat or clarification elements 352, 358, 354, 356 (see FIG. 9B). When the results are sent back, the results frame 340 may open and share space on the display or take the place of the advertisement. The buttons such as 342, 344, 346 might appear along with the results (see FIG. 9C). The exit button 350 and the identify (or login or "anonymous") button 336 may be displayed for the user, depending on the service implementation.

Figure 7:
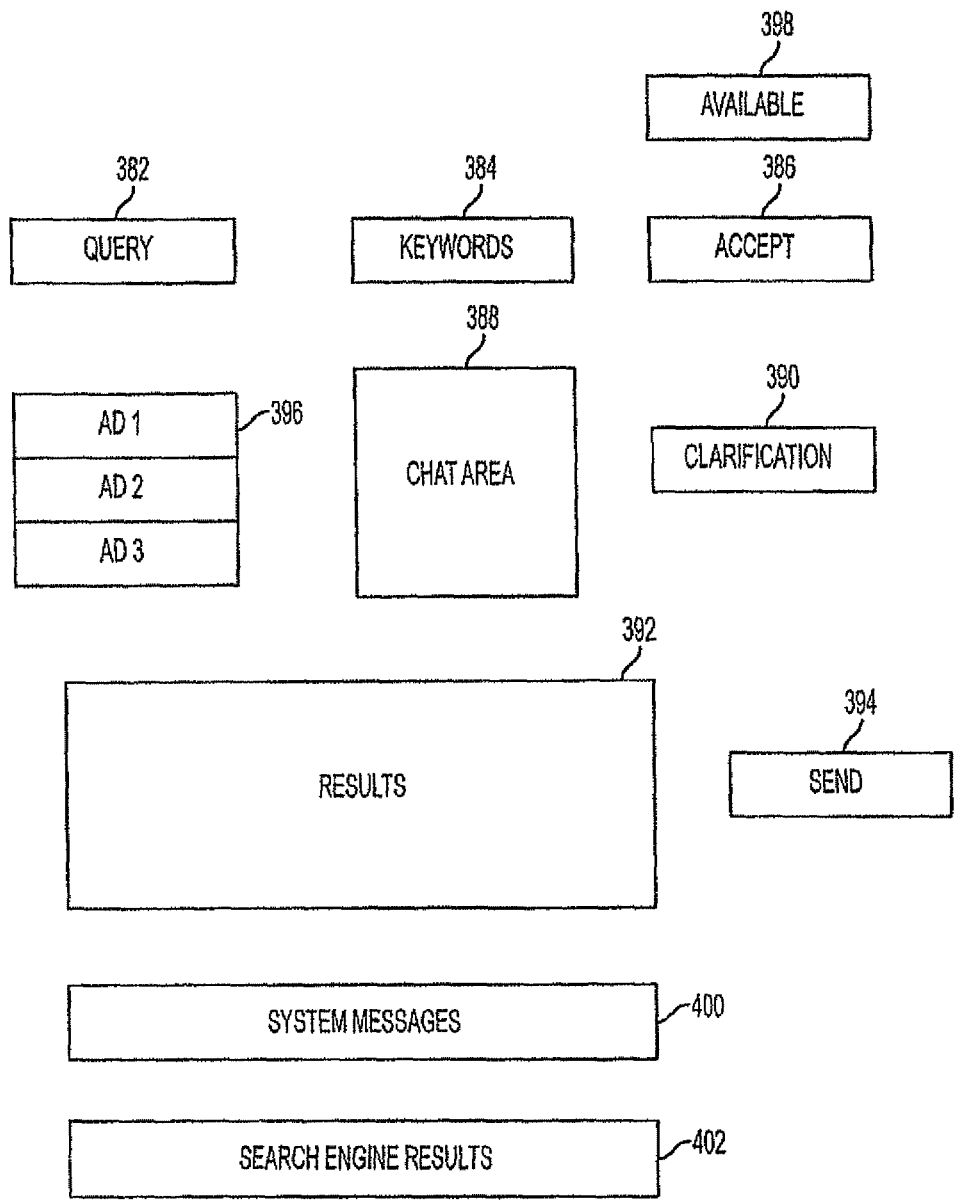
FIG. 7 is an exemplary searcher or provider GUI.

A searcher tool system (e.g., searcher tool system 122 (FIG. 1)) may incorporate a more sophisticated searcher GUI 380 and associated data structure. The components of the searcher GUI are depicted in FIG. 7 while a possible layout of the basic components shown and others among screens are depicted in FIGS. 10A-10E. The searcher GUI 380 allows a searcher to review a query in a query frame 382, accept the query via a "accept" button 386, request clarification via a "chat" area 388 of the display and a "clarification" button 390 to send a message to get clarification from the user. The searcher can also drag/drop/paste search results with text, pages, links etc. into a search result area 392, send the results via "send" button 394, and select or designate an appropriate advertisement for a query from an advertisement list 396 that can be correlated to keywords or results presented in frame 392. The searcher can also indicate availability ("logged in and accepting queries" or not) via the "available" button 398 and receive information in the "system messages" frame 400. Such system messages may include an indication that other searchers have also accepted the query, the status of the results from other search engines or websites to which the query has been passed, the statistics of the searcher such as the success rate, keywords associated with the searcher in the database 156 (FIG. 2), etc. The searcher GUI 380 (FIG. 7) can also show the results of conventional search engine searches in frame 402. Other buttons or display frames can include a request transfer the query or a clarified or searcher-rewritten query button 554, as shown, for example, in FIG. 10B, an indication that a received query has been transferred, activate a speech-enabled search capability so that cell phone users (and other speech-oriented users of the system) may access the speech-enabled searchers, and send voice messages to users, etc. using appropriate frames and button controls. This GUI could also be updated each time the searcher activated a button and each time the server 118 (FIG. 1) updated database 156 (FIG. 2) entries associated with the searcher GUI 380 (FIG. 7). The server 118 (FIG. 1) or the client side system such as searcher tool systems 122, 124, 126, 128 may control the GUI 380 using a variety of implementation platforms including Flash®, Flex™, J2EE®, XML, AJAX, Ruby, etc. The GUI 380 also can have bookmarks 680, etc. for the searchers favorite tools, databases, often used results, etc. The GUI 380 may provide sections of the screen that automatically fill with results of the query being passed to other search engines or websites and return results in those frames (or separate windows) without a searcher needing to copy and re-enter the query. The searcher may interact with any of the search engine(s) or website(s) independently until the searcher finds information that is highly relevant, which may then be selected, copied, and pasted into the results window 392. Once the collection of data is accumulated in the results window 392, it may be sent to the user's "results" window or frame. This may be accomplished by copying the data over the network from the searcher's results frame (or window) 392 to the user's results frame (or window) 340 (FIG. 6), which may need to be opened (and an advertising frame or window may be closed simultaneously).

Alternatively, selected areas of the information being searched may be dragged and dropped to the results window by a mechanism similar to selecting a Google® listing (or other search engine's listing) in Windows® Internet Explorer® and dragging the listing paragraph to another application such as Microsoft® Word and dropping it there to have it inserted. A similar mechanism could be used to drag a selected listing paragraph from search engine results frame 402 and drop the selected information into results frame 392 (FIG. 7).

Alternatively, an HTML and/or XML source interpreter may be implemented which interprets the source of the website or information that is being accessed and treats the selected area of the display as an object comprised of tagged sub-objects that can be more intelligently accessed by other applications. Each distinct search engine, website, or source of information may need its own form of translation in order to identify the sub-components of the information that will be sent via the searcher's results frame 392 to the user's results frame 340. Tagged information might include elements such as title, description, URL, etc.

Typically, the searcher's and user's results frame 392 (FIG. 7), 340 (FIG. 6), respectively, could be filled with links that look similar to those of current search engines. Alternatively, actual text, graphics, audio, video, or other information files may be returned by dragging and dropping to the results frame, similar to what is accomplished with operating systems such as Windows® where files may be copied by dragging and dropping to another location.

In one embodiment, the user-facing part of the system preferably operates as a web application through a browser on a personal computer on devices such as a user computer system 102 (FIG. 1) or as a voice application through an interactive voice response system. Typically, this would be a thin client, getting most or all of its data via the web page server, which can be a component of the server 118. The server might be one monolithic computer or it could be a distributed network of computers that slice up the processing of webpage serving, ad serving, query and results search, database accesses, etc. Alternatively, the user-facing portion of the system may be a standalone application or a part of a standalone application (e.g., implemented through an SDK).

The searcher-facing portion of the system may also be implemented as a browser-based thin client that allows all of the significant processing, data flow, various information source connections, and data manipulation to occur at the server 118. To address scaling issues (i.e., handling very large volumes of users who each may require searchers to be checking many sources per user), it is preferable to implement the searcher-facing portion of the system via a locally dynamic application that might run standalone or might run in the context of a browser. There are many examples of locally dynamic applications that do significant processing on the client side (in his case, searcher side such as systems 122, 126, 128) while relying on data structures that exist on a server (in this case, the server 118 which houses the database 156). Some examples of locally dynamic applications include Google® Earth (web-based mapping software), implemented using AJAX (Asynchronous Java combined with XML), and Basecamp® (web-based project management software) implemented using "Ruby on Rails™".

Figure 8:
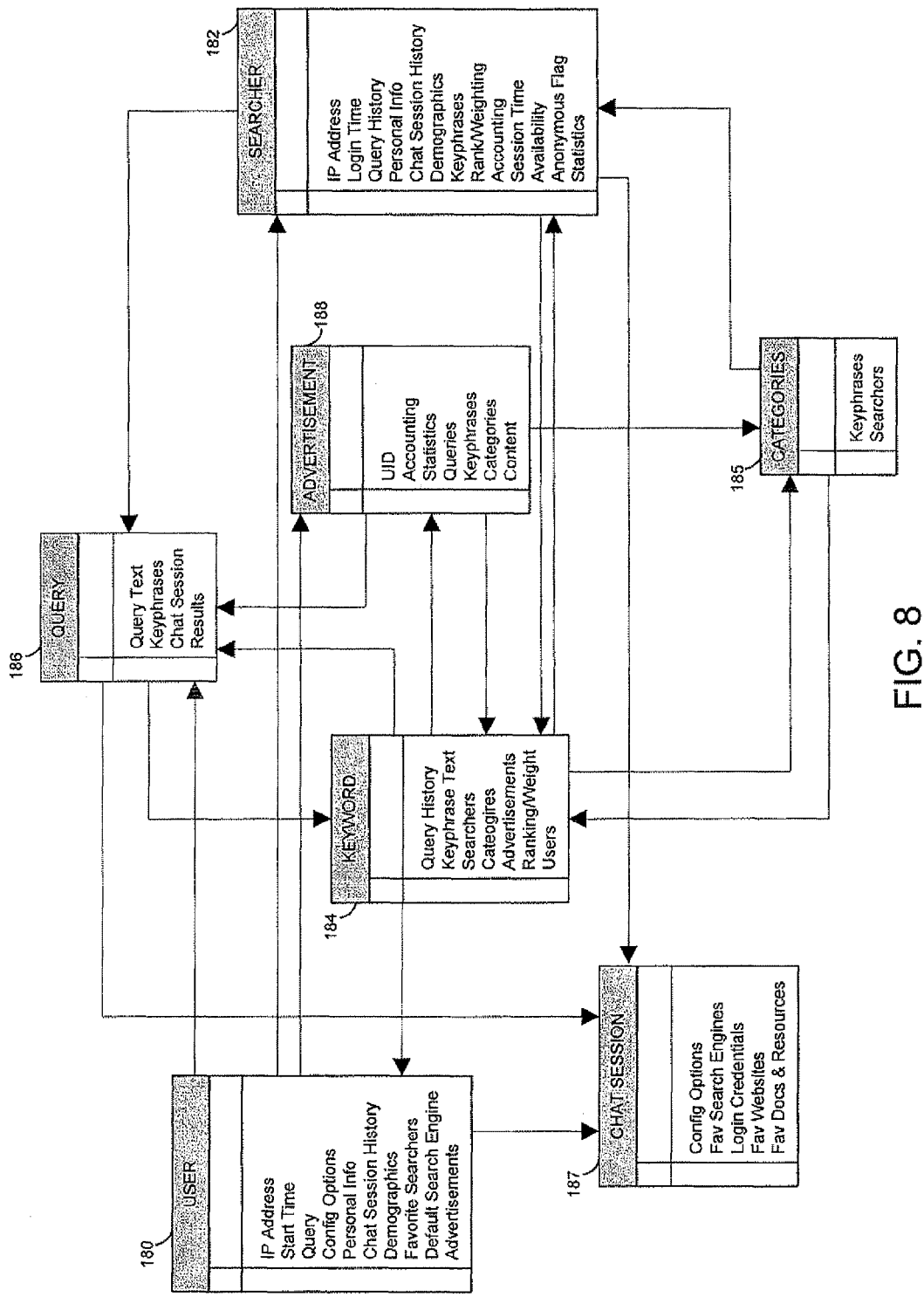
FIG. 8 is a diagram illustrating a database relationship.

The user- and searcher-facing parts of the system may be implemented using these various mechanisms, but the heart of the system is in its database 156, which, in one embodiment, is resident at the query server 118 (FIG. 1), which itself may be one or many computers working in harmony to implement various data structures. FIG. 8 shows the relationships of the data structure types. The illustrated primary data structure types include a user data structure 180, a searcher data structure 182, a keyword data structure 184, a query data structure 186, an advertisement data structure 188, a category data structure 185, and a chat session data structure 187. Within these primary structures, there are pointing relationships to the other types. In this system, data structures are comprised of single instances and/or lists of these data types. For example, each user is associated with a user data structure 180, which has local data such as IP address, start time, personal info and demographics while also having pointers to: the query data structure 186 containing information regarding the queries that the user has made; the advertisement data structure 188 containing a list of advertisements that the user has seen or is scheduled to see; the chat session data structure containing data regarding the chat session between the user and a searcher (or searchers), and the searcher data structure 182 containing a link to the current searcher, and a list of favorite searchers that might be prioritized for this user in the future.

Similarly, the query data structure 186 has local data such as the query text and results as well as pointers to keywords associated with the query, and a chat session associated with the query.

Other relational connections are presented in FIG. 8 showing various data types of the database 156.

One example of the framework that may be used to implement the functionality includes having the searcher-facing part 122-128 of the system 100 implemented as a WinForm application using NET Framework 2.0 using C# with embedded Flash® 8.0 elements for capabilities such as the chat session portion of the interface. The database may be implemented using SQL Server™ 2000, 2005 or another server with similar features. The database may also be implemented using data structures such as pointers in a custom application, or using a database application such as Oracle®, MySQL®, Sybase®, or the like. The user-facing part of the system can be a Windows® Internet Explorer® running on a PC with the FlashE® 8 Plug-In. Alternatively, the searcher-facing and/or the user-facing part of the system may be implemented as JavaScript®, as a Java® application, as an ASP application, or the like, in conjunction with a browser such as Firefox®, Opera®, Safari™, Mozilla®, or the like.

A preferred feature of this disclosure is that information that is located on the searcher's hard drive, intranet, or local environment may be searched, for example using automated desktop search engines offered by Google® and others and/or via manual searching in a directory of a hard drive or on a local network. When relevant information is found using this method, the searcher may select, drag, and drop information from this "local" source, but the referenced document is copied first to a publicly-available website, which is readily available via companies such as GoDaddy.com® and others. In such an embodiment, when a searcher sets up their configuration, a public website (and login credentials) may be identified to the searcher tool so that local data may be searched, copied to the public website, and referenced in the results with a link to this publicly available website. Alternatively, the search system itself may make files publicly available, on behalf of a searcher, at the server 118 (FIG. 1), at a searcher tool system 122, or elsewhere.

Files may be automatically transferred using a File Transfer Protocol (FTP) by the searcher tool system 122 to the public site, wherever it is located. The reference pointer (i.e., URL) given to the user via the results 484, 486 (FIG. 9C) will be to the material which has been copied to the public website where the searcher has permission to store documents (of any form such as text, images, audio, video, etc.).

This function of accessing the "Deep Web" (i.e., the very large volume of documents and information that is not commonly available via the most popular search engines today) is accomplished by allowing the broad base of searchers associated with keywords to have the ability to include materials that are not readily indexed via traditional search engines (e.g., Google®, Yahoo!®, MSN®, Ask Jeeves®, Dogpile®, or others).

Searchers who sign up for particular keywords are preferably motivated to collect excellent resources in order to provide relevant answers quickly to users. This may include increasing the searcher's points and/or rank or rating so that they may be compensated at a higher rate. Other searchers may be self-motivated to provide excellent results because they have had a medical experience themselves and would like to help others in need of timely information about the same issue. Searchers may have a passion for a hobby that motivates them to make themselves available to help others in real-time regarding that hobby.

The database 156 (FIG. 2) can include entries and a pointer-based structure as depicted in FIG. 8. This data structure or database 156 includes cross-linked entries for query 186, keyword 184, searcher 182, user 180, advertisement 188, categories 185 and chat session 192. Within these structures, there include entries for logged-in status of searcher (availability), rank (or weighting) of searcher, rank (or weighting) of keyword, searcher statistics such as number of searches, number of accepted (by user) searches, user identification (and/or IP address of user), name, address, demographics about users and searchers, search results, advertisements (game, video, text, audio, etc.), advertisement statistics, accounting information, anonymity flags for user and searcher, searcher availability, query clarification and request (and/or chat session log), and an indication as to whether the searcher is available for general searches, query follow-on, etc. The statistics for a searcher can include the total number of searches, the number of successful searches, the average speed of the searcher, the latency of the searcher before starting and ending a search, the average number of results returned by the searcher, the availability time of the searcher, etc.

During a search sequence as depicted in FIGS. 9A-9C, when the user first accesses the search system web site, the user is presented with a query GUI 460 (FIG. 9A) in the browser window 461. This GUI 460 includes a frame 462 where the user can enter a natural language query, keywords, etc. (that can be similar to what might be entered at the Google® or Ask Jeeves® websites). The GUI 460 also includes a search button 464 that is activated when the user is ready to perform a search on the query. The query GUI 460 may also include controls 466 and 468 that can highlight when the cursor passes over them and that when activated ("clicked-on") will connect the user to a page(s) that provides information on becoming an advertiser and becoming a paid searcher, respectively.

After a user initiates the search with the button 464, the browser window is loaded with a search GUI 470 (FIG. 9B). The GUI 470 includes a frame 472 where the user is presented a message that indicates searcher status. The user is also presented an advertisement in advertisement frame 479. There may be a variety of formats of advertisements. There may be multiple advertisements on the page. When a searcher accepts the query, a message 474 indicates that a searcher has been assigned and when the searcher is not anonymous, the name of the searcher may be presented in the chat frame 476, perhaps with the searcher asking a clarifying question. Items that are typed by the user in chat text box 477 show up in the chat frame 476. A status frame 478 is updated with the status and progress of the search as it changes. When results become available, even though they may be preliminary, the results can be presented in frame 480.

When the search is completed, the user is presented with a search results GUI 482 (FIG. 9C), that may include one or more search results 484 and 486 that can include text descriptions, URLs, etc. If a user is not satisfied with the search the user can request a new search by activating "same search with new searcher" button 488. The user is also allowed to start a new search by entering a new query in frame 490 and activating the new search button 492.

FIG. 10A illustrates an example of a searcher login screen 500 which a searcher sees after invoking the application but before being engaged in an actual search session. The screen 500 includes frames 502 for an elapsed time since the previous query. Also included is a frame 504 that shows a searcher the list of keywords for which the searcher has signed-up or registered to accept searches. (During the first invocation of this application, the searcher may be offered an online tutorial that teaches how to sign up for keywords using this application as well as tips about what keywords might be better choices). Preferably, a searcher signs up for a short list (e.g., three) of keywords initially until the searcher proves that he or she provides timely and relevant results (which will result in a higher ranking for the searcher). A searcher may sign up for more keywords by logging in and pressing the "sign-up" button 508. Once a searcher has registered for at least one keyword, keywords will then be listed in frame 504 showing not only the keyword but also the searchers ranking for that particular keyword (e.g., "5/7" means that there are seven searchers who are logged-in and who have signed-up for this same keyword. Of those seven, this searcher is ranked fifth). A delete button 506 allows the searcher to delete any highlighted keywords from the searcher keyword list 504. The sign-up button 508 allows the searcher to sign-up for additional keywords, by, for example, opening up a new screen (see FIG. 10E as well as the description below). The searcher can sign-up for voice based searches using a check box 510 and a test button 512 allows testing of the voice components (speakers, microphone, etc.) needed for a voice query. A configure button 514 allows the user to obtain a screen for configuring the searcher tool (see FIG. 10C).

FIG. 10B shows the query receipt screen 550 with the example query about the World Series previously mentioned having been received by the searcher in frame 382. The third party search engine results for the query are shown in frame 402. A searcher's preferred third party search engine(s) may be chosen by the searcher (see FIG. 10C) A frame 518 (FIG. 10B) is provided that shows the searcher's favorite websites associated with a keyword that was used to select the searcher. A searcher may select these favorite websites in advance (see FIG. 10C). A local search frame 520 (FIG. 10B) is provided allowing the searcher to check his or her own local hard drive or intranet to find relevant information related to the user's query. A frame 522 for a custom URL where the searcher may enter any URL at all to access the entire web in order to find relevant results on behalf of the user is provided. The searcher can send partial search results or final results via buttons 524, 526 and log out via button 528. When the searcher accepts the query, button 552 is selected. The searcher may choose to transfer the query to another searcher using button 554 (also see FIG. 10D). The query time may be displayed 556 showing the searcher how long this query has been "live".

Figure 10C:
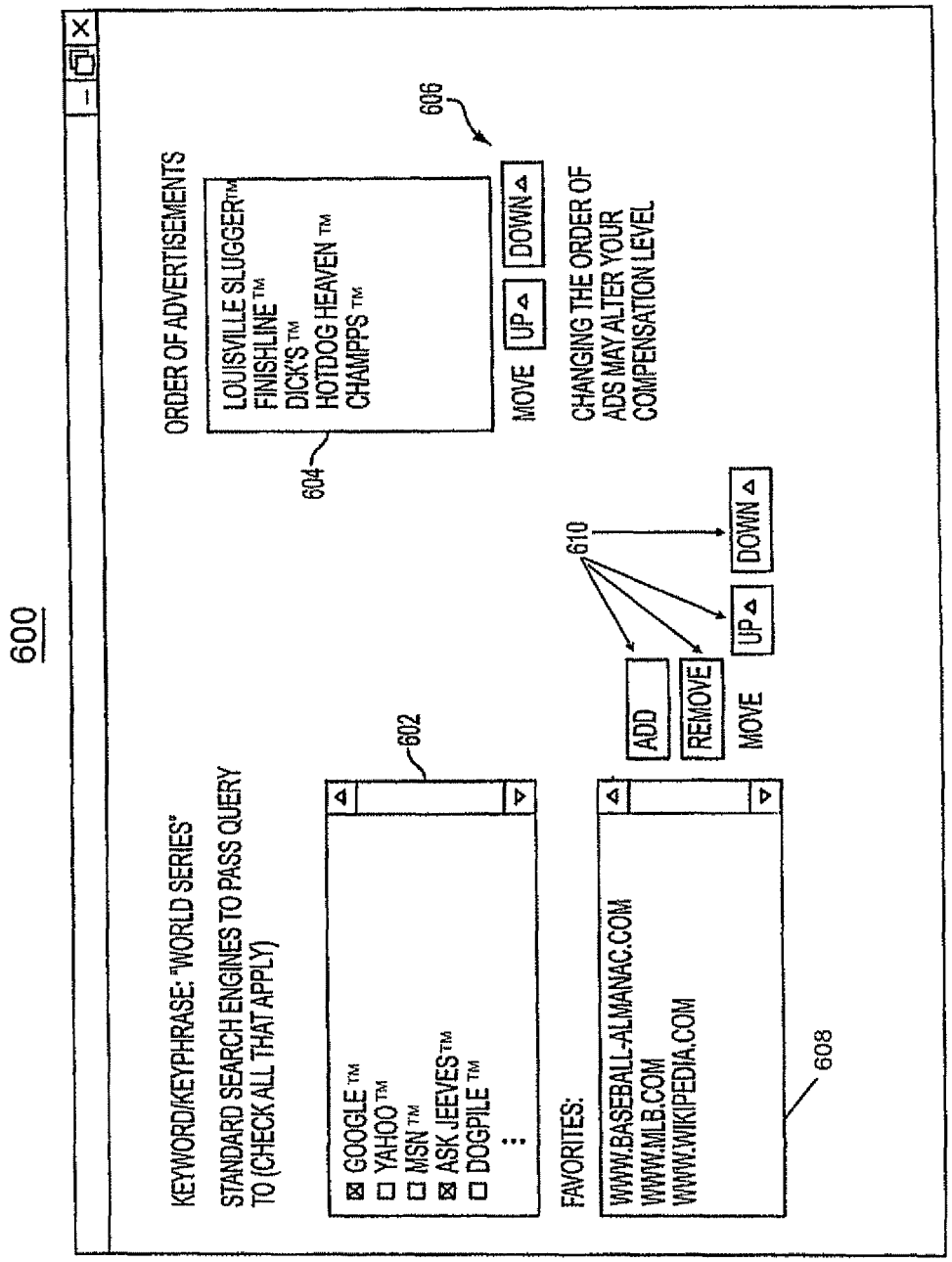

FIG. 10C shows the searcher screen 600 used to configure the searcher tool for particular keywords. This screen is reached by clicking on the "configure" button 514 on searcher tool screen 500 (see FIG. 10A). The searcher can specify which search engines are used in frame 602 and the sequencing of the advertisements in frame 604 using up/down sequence buttons 606. The searcher's favorite websites for finding information about the keyword can be listed in frame 608 and the listings can be modified and sequenced via up/down add/delete buttons 610.

Figure 10D:
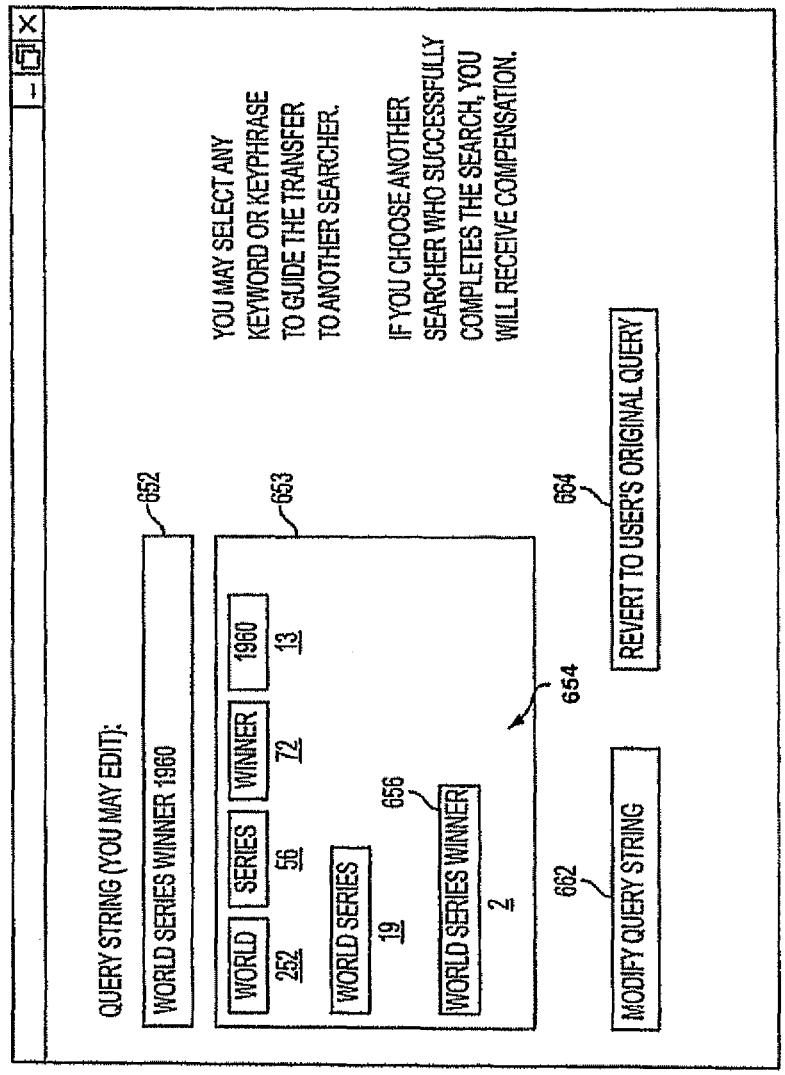

FIG. 10D illustrates the screen 650 used to transfer a query to another searcher. The query is shown in frame (or query string text box) 652 while the various component keywords of the query are displayed in pertinent keyword frame 653. Below each component keyword, the number of active searchers for pool 654 for the keywords and/or phrases of the query is shown. Buttons 662, 664 are also provided that will allow the searcher to change the query, which will result in new component keywords, etc. The searcher may cause a transfer to occur by selecting the keyword button (only the keyword button 656 associated with the keyword "world series winner" is identified by reference numeral in FIG. 10D) that would likely result in a more successful set of results being returned for this query. The searcher may be compensated for transferring to a searcher that provides a successful result to the user.

FIG. 10E shows the screen 700 used by the searcher to sign-up for keywords. Available keywords are listed in frame 702. "Available keywords" may include all known keywords, or during the system startup phase when searchers are just beginning to sign-up, the list may be a controlled subset of keywords. For example, the system might start with only the 500 most popular keywords used in searches by the general population. Or the system might offer keywords in a particular category such as medicine or sports. The frame 702 shows the keyword, its weight which indicates the "strength" of this keyword when found in a search query phrase. (i.e., if a keyword has the most weight in a query phrase, then that keyword determines which searcher pool from which to find an available searcher) (see FIG. 3A). The number of searchers signed up and logged in for the keyword is also shown. The number of queries in the last hour (or alternatively, last day, week, or any other period of time) on the keyword is shown along with the ratio of queries to logged-in searchers. This data allows an experienced searcher to carefully choose keywords that will result in the searcher being able to earn more searching opportunities and possibly a higher ranking. Providing this level of detail creates "efficiency" in the system, similar to what might be found on the trading floor of the stock market. While shown with this detail, it is within the scope of the disclosure for a keyword sign-up screen to have more or less detail or to provide more or less information to a searcher. It is also within the scope of the disclosure for the keywords to be presented in another manner, such as in a hierarchical tree or other manner showing the relationship between keywords and categories.

When a searcher discovers information that appears to satisfy the user's request, such as a passage in a book on the users personal bookshelf, the passage and possibly surrounding contextual material can be scanned in and posted on the searcher's public web site (as described earlier). The system may include processes to ensure adherence to copyright laws, such as providing a pop-up box each time scanned material is posted to a searcher's public web site requiring the searcher acknowledge that no copyright infringement will occur as a result of the posting, maintaining policies provided to searchers explaining the duty to comply with all copyright laws or other safeguards within the scope of the disclosure. The searcher can then provide the user with the passage of interest and a link to the website scanned version, possibly a link to a neighborhood library that includes a copy of the book, and/or possibly a link to a bookseller's website (e.g., Amazon®) where the book may be purchased. The search system can then add this information to the database so it is accessible to the searcher for future searches and to users for whom the searcher is searching. A desktop search capability may be installed as part of the searcher tool installation, which may be a local application running on the PC, a browser-based application, or server-based application that presents its information via a web-browser. Google® Desktop Search is one such example.

To facilitate having searches performed by searchers who are experienced in searching the subject matter of the queries, the searchers, when they initially register as a searcher in the system, select keywords or categories of keywords that indicate their search expertise and/or experience (see FIG. 10E). This set of keywords selected by a searcher can be updated as a searcher obtains a wider field of experience or simply becomes more accustomed to using this system. The system remunerates searchers for successful searches (e.g., which the user views as relevant and useful) and, as a result, it is expected that various searchers with a wide variety of search expertise will be logged in (available) to provide coverage at all times. The remuneration can be based on the advertising revenue thereby providing an incentive to the searcher to provide satisfactory results and, when given the option, to select advertisements relevant to the search query, hopefully maximizing advertising revenues. In addition, the remuneration may be based on the proportion of successful searches (user accepted search results) and this provides the searchers an incentive not to accept searches that are outside their field of search expertise. Or, if the searcher determines that he or she is not qualified to deliver a satisfactory result, the searcher is motivated to "transfer" the query to another searcher who can deliver a satisfactory result. If a query is transferred, the searcher may receive some credit if the next searcher delivers a satisfactory result to the end user, thereby motivating the original searcher to carefully transfer the request (see FIG. 10D). The amount of credit or remuneration may also be based on how quickly the searcher determines that a transfer is appropriate. This system also provides motivation for the searcher to only sign up for keywords for which he or she can provide a satisfactory response to the end user in a timely fashion.

A searcher need not be an expert in the subject matter of the query but is expected to be capable of locating information relevant to the query. The present disclosure will work best when the system has a large number of searchers that are available 24 hours a day, providing coverage regarding anywhere from a thousand (at system startup) to hundreds of thousands (or even millions) of keywords (a system that has evolved to have sufficient searchers to cover the large number of keywords). To help insure that such a mass of searchers sign-up to be paid searchers, the system can split the advertisement revenue with the searchers based on a formula. The system can also provide a different or additional reward to searchers based on their relevance ranking. The relevance ranking can include one or more that one factor, such as average search speed, number of accepted searches performed, number of searches performed, amount of cumulative time answering queries regarding a particular keyword, number of keywords that they search, etc. In various embodiments, the system provides a reward that rewards the best searchers, is graduated, rewards a large number of people, rewards a few with a very large reward, attracts media attention, engenders discussions among users and searchers of the system with other associates and contacts, can cause many searchers to compete to be the "best", provides incentive for searchers to sign up to keywords for which they can be particularly successful, and provides incentive for searchers to be logged in (available) as often as possible. One example of such a reward system is a reward pyramid that gives a few searchers a very large reward while many searchers receive some reward. This mechanism can be used to convince a large number of people to sign up as paid searchers. Such a pyramid might pay $1 million to the top searcher during a period, $100,000 to the ten next best searchers, $10,000 to the hundred next best searchers, $1,000 to the thousand next best searchers, and $100 to the next best 10,000 searchers. In this way, this particular bonus system involves 11,111 people. The reward could be issued on a yearly, quarterly, monthly, weekly, or daily basis.

An alternative embodiment involves having a "PC anywhere" (remote control) or WebEx® (remote meetings) type of experience for the end user who does not directly control the search screen but can watch what the searcher is doing to accomplish his or her task. This allows the user to be entertained, occupied, and engaged by what the expert searcher is doing.

A user may comment in the "chat" frame in ways that allow for the search to be accomplished more collaboratively. For example, during a search about the winner of the 1960 winner of the World Series, the user could say via the chat screen (while watching what the searcher is referencing): "What I really wanted to know was who was pitching for the winning team in that game." And the searcher could comply with that clarified request.

An alternative embodiment allows a searcher to "see" unhandled queries. When a searcher logs into the system, the searcher can get access to a list of current queries and keywords that are associated with the queries. The searcher can also see queries for which no search has been accepted after a predetermined period, such as ten seconds, and accept such a query, and such queries that are accepted and successfully searched can be provided a higher rate of remuneration.

Rather than present the search results to the user one searcher set at a time, the search results of all searchers that perform a search on the query can be presented to the user. This will increase the likelihood that relevant search results are presented to the user. The searchers involved in such a presentation would share the credit (remuneration) for a successful result. The system could also allow searchers to form searcher groups that would facilitate such group results presentation.

A user could pay to subscribe to the search service and not be presented with advertisements.

If a searcher "relevance rating" drops to a predetermined threshold for a particular keyword or across all his/her keywords, the searcher could be suspended (or permanently barred) from the system. There may be other reasons that a searcher gets suspended. For example, a user may report a searcher as being extremely rude, obnoxious, or inappropriate in their language or behavior, which could be reviewed by the service managers or system administrators.

A user may also be cutoff from the service if he/she is being rude, obnoxious, or inappropriate. Because the identity of the user is oftentimes not known, the user would be cutoff by refusing packets from a particular IP address. If the behavior continued, the service managers or system administrator could take legal action. The response that the user would receive to all queries would explain the consequences of inappropriate behavior, including legal action.

Similarly, when a searcher abuses the system the searcher could be cutoff. For example, if someone signed up as a searcher and provided "not relevant" results most of the time, across multiple keywords, the system could disable the searcher's account. The IP address could be monitored as well.

Advertisements presented to a user can be of different lengths and subjects based on the keywords of the query, the point of the search cycle, the priority of advertisers as set by the system, the priority of advertisers as set by a searcher, etc. The database 156 also includes information on the number of times an advertisement has been presented to a given user (either an identified user or a user at a given IP address), the number of times users have linked to any web site noted in the advertisement, etc. Advertisements may be managed via a product such as "Macromedia® Flash® Media Server 2" and/or other products.

The keywords of the database can include all of the words of a dictionary and groups of words (phrases) that have an ordering. Keywords can also be weighted to allow them to be sorted higher in the ranking for determining which searchers will receive a query (see discussion related to FIG. 3B). Because it is more specific, the phrase "breast cancer" may be ranked higher than the two words "breast" and "cancer", so that the ranking of "breast cancer" searchers would not include searchers that specialized in searches of the words "breast" or "cancer" individually. That is, keywords or phrases that are often used for a particular type search can be ranked higher in order to result in the selection of a searcher that has a higher level of experience in that specific area of search.

The keyword/keyword database may also indicate how many queries have included a particular keyword, as well as how many searchers are associated with that keyword. A ratio of queries versus associated searchers gives searchers the opportunity to find keywords that are more likely to generate traffic for the searcher, which may increase the searcher's income, if the searcher provides relevant results to the end user.

The database also indicates how many times a searcher has searched a particular keyword and how many times the searcher has been successful for the particular keyword.

Queries, associated keywords and corresponding answers can be removed from the database when they are no longer considered relevant. A calculation of relevance can be performed every time that a new user receives the "answer" and chooses to ask for another exact search (indicating a lack of useful data or relevance). If the user accesses the answer and does not request another search with the same search terms, then the original searcher who reported the answer may be credited with points. If the user does ask for another search with the same (or possibly similar) terms, then the searcher may have points deducted. The ratio of users who consider the answer relevant versus not relevant is tracked. If this ratio hits a threshold, then the answer may be deleted from the system, or alternatively it can be saved for archival but not reported to future users who make the same (or a similar) query. While the data content and links there between of multiple examples of databases 156 have been described, it is within the scope of the disclosure for a database 156 to include any combination of the described data content and/or links as well as other data and links there between.

In another embodiment, it is possible for the server to host all of the logic of loading and searching multiple search engines and websites in an ASP-type environment where most of the searching computation across search engines happens at the server. In one specific embodiment, much of the searcher computation is performed in a distributed way via the searchers' computers.

In another embodiment, the searcher tool interface is defined in an "open" way so that third-parties may provide better and better tools, perhaps tailored for specific keywords, categories, or industries including medicine, travel, shopping, etc.

In another embodiment, it is possible for a user's "default search engine" to return results in a window frame while the searcher is doing more extensive research and the user is presented with advertisements. This lets the user see some results as quickly as they would see them from one of the standard top search engines.

In another embodiment, harder queries can be sent to searchers who have signed up for "paid search". The queries are sent to the available searcher pool for a given keyword or set of keywords along with a bid for how much would be paid if the query were answered within a specified period of time. The first searcher to "lock" the query can then spend whatever time is necessary to answer the question and collect the payment from the user. This differs from Google answers because there is a pool of searchers available at all times who are associated with specific keywords.

There are many applications that can run better using this platform, creating a better user experience. For translating text from one language to another, you would simply query: "translate from English to Spanish I love you". The expert searcher might be using a translator service such as AltaVista to get that answer. In an embodiment wherein a user is using a VoIP-capable user system, the user would be able to hear the translation from a native speaker, in addition to getting the text translation.

With certain embodiments of the present disclosure users may get significantly improved highly-relevant search results from a broader base of information than current search engines can index. With certain embodiments of the present disclosure keyword-targeted searchers are enabled with powerful searcher tools that can adapt to the domain being searched; there is a process for having searchers compensated for helping find the answers that provides motivation for a large pool of searchers to be available in a variety of domains of searching expertise; and advertisers get to have their (sometimes hand-picked) ads seen be a highly targeted audience.

Figure 11:
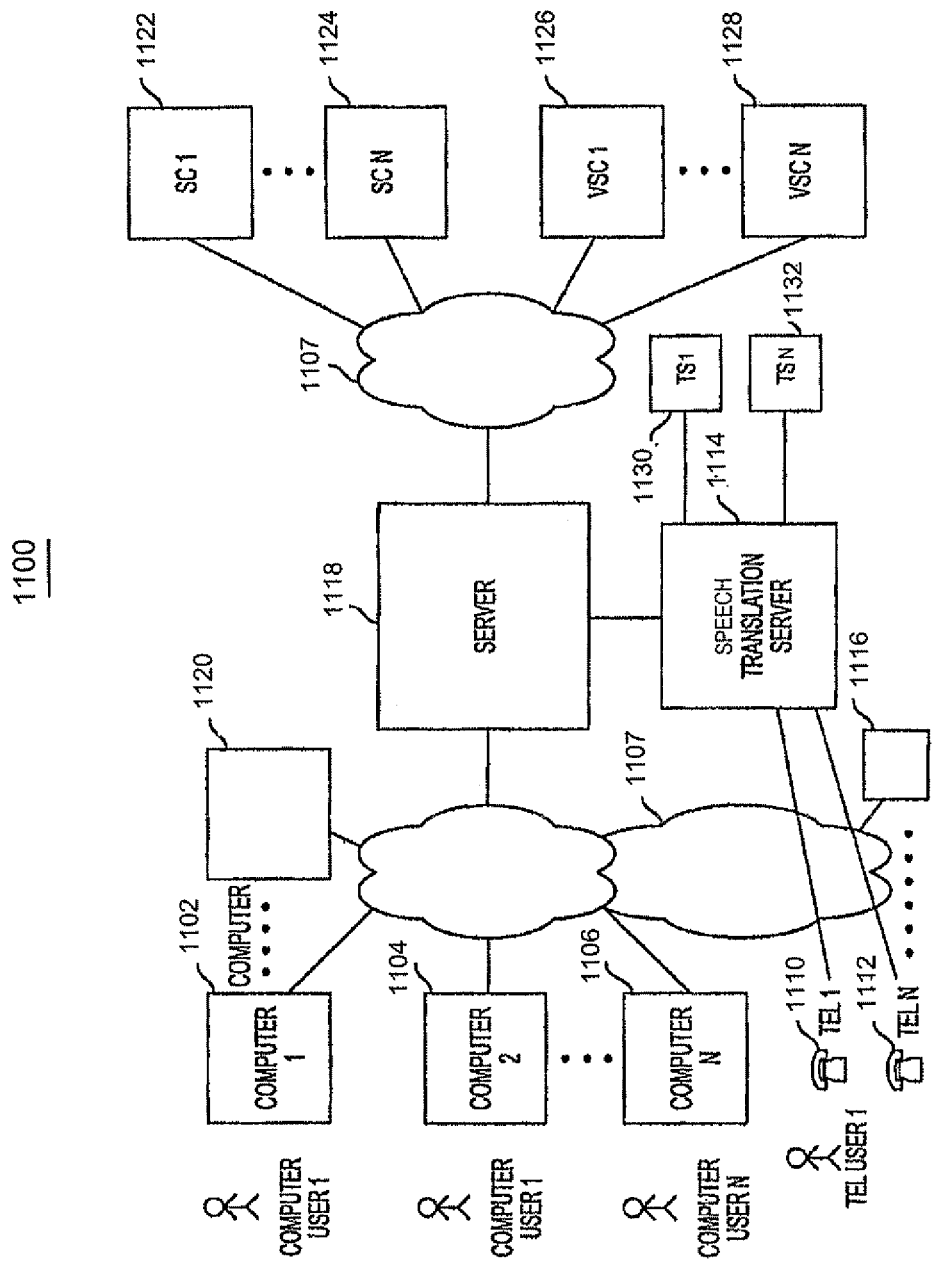
FIG. 11 is an illustration of an embodiment of a system architecture.

Another embodiment of the present system is disclosed, for example, in FIG. 11. FIG. 11 is a block diagram of a system 1100 that allows human workers to service user initiated tasks of any type with multiple levels of activity. As depicted in FIG. 11, the user initiated tasks can originate from user computer systems 1102, 1104, 1106 and are received over a communication system 1107 or from telephone handsets 1110, 1112. The user computer systems 1102, 1104, 1106 can be typical desktop or laptop systems, a handheld computer such as a personal digital assistant (PDA), a basic cellular telephone, a text-enabled or video-enabled cellular telephone, a specialized user initiated task terminal, or any other source that allows a user to enter a user initiated task via text, image or speech entry. The telephone handsets 1110, 1112 can be typical touch-tone telephones, cellular telephones, two-way radios or any other communication device that allows the user to talk or otherwise communicate over a distance. The communication system 1107 can include packet switched facilities, such as the Internet, circuit switched facilities, such as the public switched telephone network and DSL/ADSL, radio based facilities, such as a wireless network, etc.

In one embodiment, the oral speech tasks initiated by telephone handsets 1110, 1112 are stored in the system database and converted into digital text tasks by a speech translation server 1114. (Alternatively, the user's computer 1102, 1104, 1106 or telephone handsets 1110, 1112 may perform this processing). The speech translation server 1114 handles the task of translating the speech into text, possibly by interaction with other systems, or it may perform the task locally. It may perform speech to text conversion by using either speech transcription using human transcribers or using conventional speech-to-text processing, also known as automatic speech recognition (ASR). The speech user initiated tasks can originate from a user's telephone and can be handled initially via automated attendant speech prompt type processing (or alternatively, via an interactive speech response or IVR system) to obtain the user's user initiated task.

The speech translation server 1114 keeps track of the port from which a call originates and assigns a user identifier to the user of telephone handsets 1110, 1112 on this port for a particular session. The speech translation server 1114 can prompt the user to speak the user initiated task. The speech user initiated tasks can also originate from another source 1116 called a "speech task service requester" (STSR) rather than directly from the user, such as a private or public information provider. For example, a speech user initiated task can be initially processed by a public library telephone system and switched to the server 1114. The speech user initiated task may physically arrive at the system via a variety of input means, including time-division multiplexed lines, voice over IP (VoIP) packets from an Internet connection, and other sources. The speech user initiated task may arrive as a stream or packet or series of packets.

Similarly, a commercial site, such as a grocery store ordering system where a user orders food and inquires about recipes for a special after-dinner dessert can initially process a speech user initiated task and pass it along to the speech translation server 1114.

The STSR 1116 (FIG. 11) may communicate with the speech translation server 1114 via a variety of mechanisms including an IP-based socket address or via a Microsoft® .NET service, making the translation services of speech translation server 1114 widely available via the Internet to any application that wishes to use them.

The packet(s) may then be processed locally at the speech translation server 1114 to convert it from digitized speech into text or, alternatively, it may be processed by a remote system. If the digitized speech is being transcribed by human transcribers, this can be accomplished by sending the digitized speech to one or more transcriber systems (TS) 1130, 1132 where human transcribers can hear the speech, for example via headphones or speakers, and transcribe the information by typing the text into their system, so that the text is then sent back to the speech translation server 1114 (or alternatively, directly to the user initiated task server 1118 or to the STSR 1116), all within a matter of seconds (preferably less than 10 seconds after the user has finished speaking the user initiated task). To speed up processing, the speech user initiated task can be and typically is preferably broken up into a stream of packets and passed to the transcriber, without interruption, as it is being spoken by the user, thereby allowing for reduced latency in the system. Preferably, there are many more transcribers available in the system than there are instantaneous user initiated tasks so that delays are not induced into the system. In the case of an overflow of user initiated tasks, a form of flow control may be utilized by telling some callers that they must hold on the line for an available transcriber (which might be described to the caller as holding for an operator or agent). Preferably, the speech translation server 1114 maintains a database of all transcribers that are currently logged-in and available to perform the service of transcription using a transcription software application on their transcription system 1130, 1132. Alternatively, this function of tracking the availability of transcribers might be located on a remote system and/or might be implemented using a distributed mechanism among transcriber systems 1130, 1132 (for example, using peer-to-peer mechanisms).

The speech translation server 1114 may feed continuous sequential speech phrases from various and different sources (e.g., users) to any given transcriber system 1130, 1132. Hence, the transcriber is sequentially transcribing, in rapid succession, speech messages from various speakers and creating separate text packets that are associated with each speech message.

Once the user initiated task is in digital text form, it is provided to the user initiated task server 1118. The text entry features of cellular telephones can also be used to enter a user initiated task in digital text form allowing users to submit user initiated tasks textually from telephones.

User initiated tasks from a graphical user interface (GUI) of the user computers 1102, 1104, 1106 can originate directly from the user, or like the speech user initiated tasks, indirectly through a "text user initiated task service requester" (TTSR) 1120, which may be any software application or device connected via the Internet, for example As in the speech user initiated task, a user may be on a grocery store web site ordering food for delivery and may inquire about a recipe for a special dessert. This recipe user initiated task would be forwarded to the user initiated task server 1118. Any web site, consumer electronics device, or other device may become a TTSR or STSR for performing a task. For example, a set top box offered by a satellite TV or Cable TV provider could offer the ability to enter a user initiated task string and act as a TTSR or STSR. Any software application running on a PC, such as Microsoft Office® Word or Excel®, may also serve as a TTSR or STSR.

An appropriate interface, such as a graphical user interface (GUI) for the computer system 1102 or speech prompt system in the speech translation server 1114 extracts a user initiated task from the user and transmits the user initiated task to the user initiated task server 1118.

Upon the receipt of a user initiated task, such as from user computer 1102 in this example, the user initiated task server 1118 can provide information (e.g., advertisements) to the user for the user to see or hear while the task is being processed. This information can be related to the user initiated task (or to the keywords of the user initiated task) and may include visual and audio information as appropriate for the user's device and for the source of the user initiated task, such as a grocery store ad in the recipe example. This information can include not only advertisements, but also information such as video, audio, music, games, web links, etc. that may interact with and display for the user while the task is being performed. The information provided may serve as a source of revenue, for example through advertising. If the user views an ad, or clicks on a link, or purchases a product (sometimes referred to as "conversion") related to an advertisement while awaiting results of a task, the database can be updated to reflect additional ad revenue with a credit of points and/or compensation, if appropriate, to the worker. A digital text, graphics, audio, or video advertisement may be displayed (or played) on a user computer 1102 or on a user telephone (1112). A particular advertisement selected is or can be based on a weight associated with the advertisement based on single or combined factors such as advertiser contract commitments, bidding price of advertisers, popularity with users, keyword mapping to advertisements, statistical usage (e.g., least recently presented), user demographics, geographic data, worker choice of advertisements, etc.

The server 1118 processes the arriving user initiated tasks by determining which worker(s) are available to task for the information being requested, based upon factors such as the worker being logged-in, worker(s) who are associated or signed-up for a keyword, or category, or the ranking of the worker based on previous performance.

The server 1118 may also determine if this particular user initiated task has been queried previously and can send a response to the user with previously obtained task results without necessarily invoking a human worker.

When no previous user initiated task results satisfying or that may satisfy the user initiated task are available, the server 1118 sends the user initiated task to one or more of the available workers over the communication system 1107. If the user initiated task is a speech user initiated task, in addition to sending the text version of the user initiated task and the keyword(s), the speech recording of the user initiated task can be transmitted. The human workers can be located at computer-based worker tool systems 1122, 1124 and/or speech-enabled computer-based worker systems 1126, 1128, or any other suitable device for receiving tasks.

A server-chosen worker (or workers) reviews the user initiated task, including any speech recording or other additional information and decides whether to accept the task. When the worker accepts the task, this acceptance may be communicated back to the user who originated the user initiated task through the server 1118. This may happen automatically or manually. Because some tasks may require additional information or clarification, the worker can send a request for additional information to the user. This can be sent through server 1118 or via direct link to the user via the communication system 1107. The user may reply with a clarification, additional information and/or a revised user initiated task. The worker(s) then uses the worker tool system 1122, 1124, 1126, 1128 to produce task results. For example, task results, such as an answer, comments by the worker, web pages, web links, and other user initiated task related information, etc. may be gathered by the worker during the task. The results of the task, such as web pages and links which the user can review or use, an answer to a question and web pages or links to web pages that support the answer etc., is transmitted back to the user through the server 1118 or directly to the user via the communication system 1107. The information returned is typically what the worker thinks or intends can satisfy the need of the user. The information can include anything that could satisfy the user.

The results are presented to the user in real-time, associated with the amount of time it takes to find a worker and do the task. One or more available workers are preferably identified within 15 seconds and the worker preferably begins the work of performing the task within 15 seconds. Depending on the task, the accumulation of relevant results may generally take from a few seconds to a few minutes or longer. The server or task tool may interact with the user automatically preferably about every six seconds via the chat session (or via the VoIP connection) in order to identify to the user that progress is being made. This might be as simple as a dot typed on the user's screen or a more detailed automated text message. When on a telephone, the user will preferably be hearing or watching an advertisement, but during silent periods, the user interaction may occur via speech such as having the worker or an automated speech system say, "Please continue to hold while your task is being performed". The worker may interact with the user, either of his or her own accord or the worker tool may remind the worker to give status to the user. The worker may also send partial results to the user so that the user may begin to preview results. The server 1118 may store the user initiated task phrase and the task results for matching with future user initiated tasks.

Figure 12:
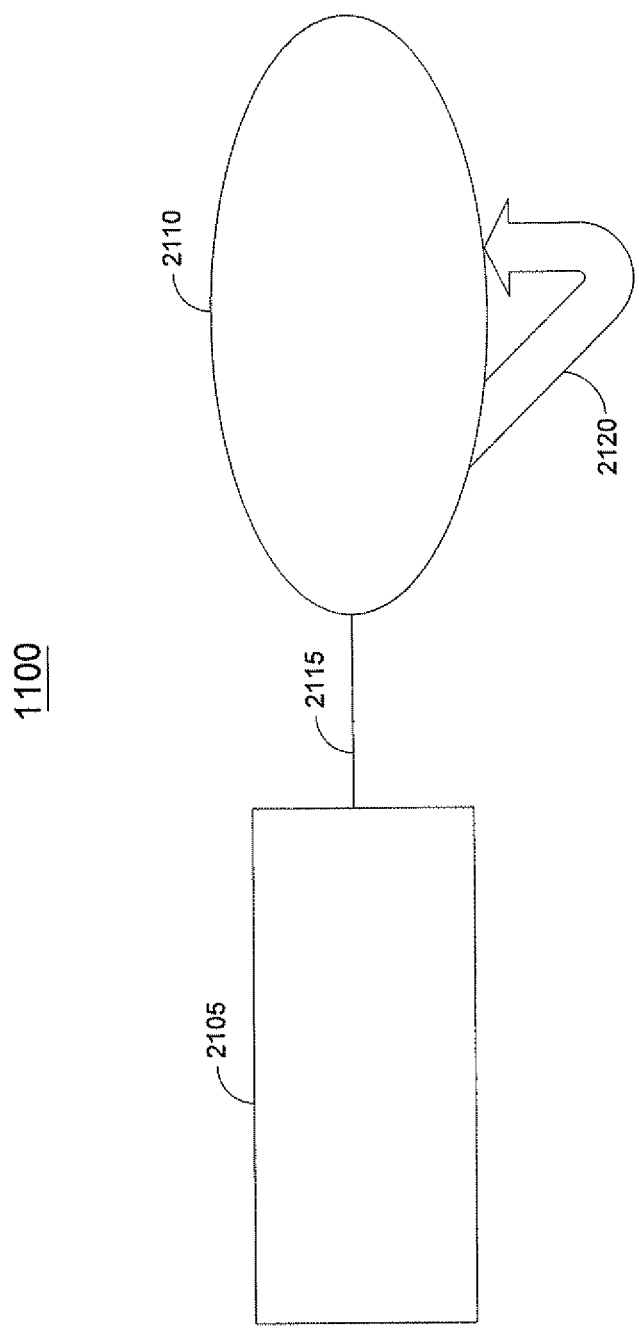
FIG. 12 is an illustration of the activities managed by the system.

In at least one embodiment of the present disclosure, as illustrated in FIG. 12, system 1100 includes users 2105 and workers 2110. The users 2105 may include Internet web surfers seeking information, for example, search results (e.g., an answer) to particular questions, as discussed elsewhere herein. The workers 2110 may include human searchers who are employed to perform searches on information queries, as discussed elsewhere herein.

In at least one disclosed embodiment, at least two different types of activities occur. For example, in the embodiment depicted in FIG. 12, primary activity 2115 is conducted between the users 2105 and the workers 2110. The primary activity 2115 includes the servicing of tasks submitted by the users 2105, which may include responding to queries transmitted from the users 2105 to the workers 2110. The primary activity 2115 is the highest priority activity in the system.

In addition to the primary activity 2115, the disclosed system and method also include secondary activities 2120. The tracking of secondary activities 2120 may occur internal to the system. The users 2105 typically are unaware of the secondary activities 2120.

In at least one embodiment, the secondary activities 2120 are conducted among workers 2110 for training purposes. The secondary activities 2120 can be exercised by the workers 2110 to practice serving user tasks initiated by other workers 2110.

For example, in at least one embodiment, users 2105 may include Internet web surfers seeking information on particular questions, workers 2110 may include human searchers who are employed to perform searches on information queries, and secondary activities 2120 (FIG. 12) may include methods for enhancing search skills of human searchers in an information search system or other activities as requested by the system administrators. Such a method may include presenting to a human searcher at least one information search query for which search results were previously provided to a requester (user) and monitoring performance of the human searcher in providing search results to the information search query. Thus, the human searcher being trained is presented with a query, for example, a previously answered query, to allow the human searcher to improve his or her search skills and to allow management to monitor the performance of the human searcher. In at least one embodiment, the previously answered query is a query that was answered without utilizing a worker.

While secondary activities such as, training, translation, transcription, etc., may be conducted internal to the system, other secondary activities may be tracked within the system, but performed outside the system. For example, a worker may take a photograph, create a video, draw a diagram, reference a text, or conduct any other type of activity which cannot be conducted within the system.

Workers 2110 who are not satisfied with their performance ranking may be able to increase their skills and ranking. In at least one disclosed embodiment, the workers 2110 can elect or request to participate in the secondary activities 2120. Alternatively, in at least one disclosed embodiment, workers 2110 are automatically selected for participation in the secondary activities 2120 based on a human searcher's performance rating, rank and/or other criteria to determine if a worker is available or idle or eligible for a secondary activity.

Figure 13:
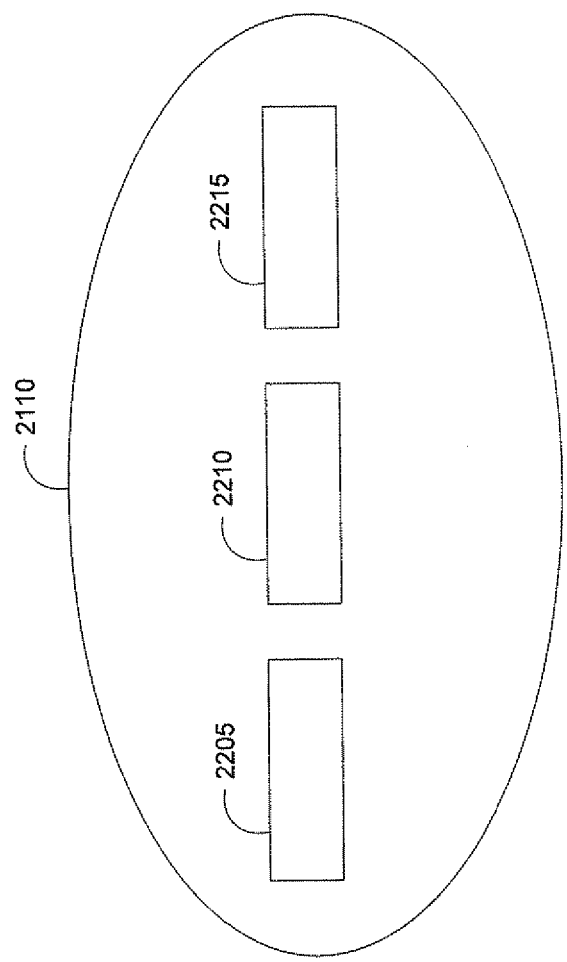
FIG. 13 is an illustration of the various categories of human searchers or guides.

As illustrated in FIG. 13, in at least one embodiment, the workers 2110 are divided into groups which may be based on skills and/or performance of the workers. For example, the workers 2110 as illustrated in FIG. 12 may be divided into apprentices 2205 (FIG. 13), pros 2210, and masters 2215. Each classification may be called a "state". After being presented with the disclosure herein, one of ordinary skill in the relevant art will realize that other divisions may occur without departing from the spirit and scope of the present disclosure. For example, the pros 2210 may be divided into classes, for example, class 1 pros, class 2 pros, class 3 pros, etc. Each of the types of workers 2110 identified in FIG. 13 has a different skill or performance level. In at least one embodiment of the present disclosure, the most highly rated of the masters 2215, such as, for example, the top 20%, may be given a different status such as, for example, "elite". It is further possible that the workers may be divided into groups which may overlap based on other criteria. A worker may have multiple "states" associated with a particular group.

In at least one embodiment of a system according to the present disclosure, the system 100, 1100 (see FIGS. 1 and 113 comprises a state engine that assigns tasks to the workers 2110 (FIG. 12) that are registered with the system 100, 1100. As a preliminary step, each worker 2110 registers with the system 100, 1100 to indicate if the worker 2110 is available to service user initiated tasks. The server 118, 1118 (FIGS. 1 and 11, respectively) recognizes a worker 2110 (FIG. 12) according to the worker's group and/or classification or state. For example, the server 118, 1118 may recognize that as of the last time a worker 2110 logged-off the system the worker was a pro 2210 (FIG. 13). Therefore, when the worker 2110 (FIG. 12) next logs in with the system 100, 1100 (see FIGS. 1 and 11) the worker 2110 (FIG. 12) is again a pro 2210 (FIG. 13).

Figure 14A:
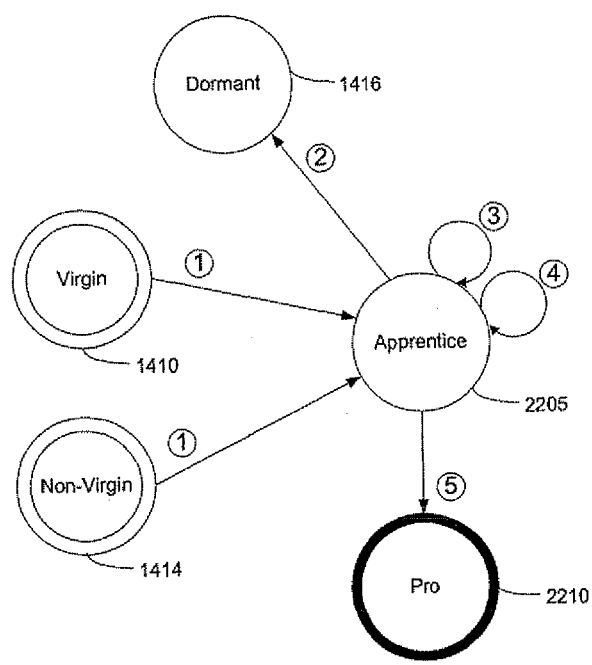
FIGS. 14A-14D illustrate the operation of an activity engine.
Figure 14B:
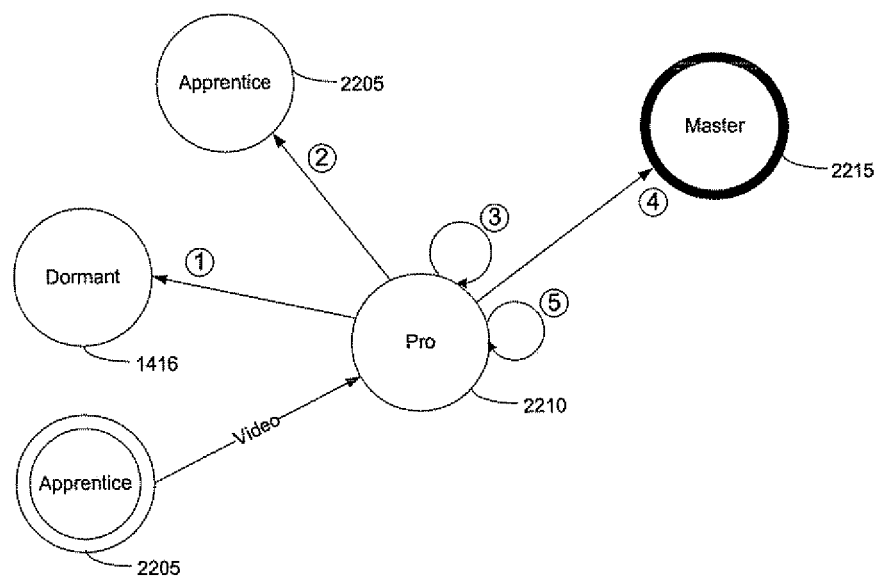
Figure 14C:
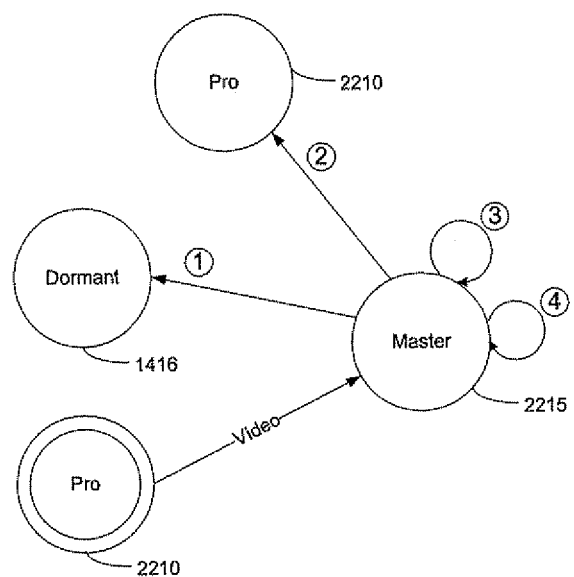

Once the worker 2110 (FIG. 12) is initially recognized according to a group classification, an activity engine evaluates the worker 2110 and may assign the worker 2110 secondary activities 2120 (FIG. 12) or move the worker between group classification levels or states. FIGS. 14A-14C illustrate an exemplary activity engine 1400 in an embodiment of the present disclosure where the system 100, 1100 (see FIGS. 1 and 11) is an Internet search system of the type described elsewhere herein.

Referring to FIG. 14A, a guide (searcher or worker) 2110 (FIG. 12) who is registered with the system for the first time or may be assigned to the state (a "virgin") 1410 (FIG. 14A), or returns to the system after a period of absence or dormancy or may be assigned to the state (a "non-virgin") 1414. In either case, upon entry into the system, a guide 2110 (FIG. 12) may be shown video training and is classified as an apprentice 2205 (shown in FIG. 14A as edge 1).

Continuing with FIG. 14A, once classified as an apprentice 2205, the activity engine 1400 according to at least one embodiment of the present disclosure analyzes the status of the guide 2110 (FIG. 12) according to sequentially evaluated set of conditions represented in FIG. 14A as edges 2-5. Each edge shown in FIG. 14A represents a conditional statement or potential state transition that is evaluated by the activity engine 1400 for each guide-keyword combination in sequential order. For example, if the condition associated with edge 2 evaluates to "false", the activity engine 1400 evaluates the condition associated with edge 3. If the condition associated with edge 3 evaluates to "false", the activity engine evaluates the condition associated with edge 4. If the condition associated with edge 4 evaluates to "false", the activity engine 1400 evaluates the condition associated with edge 5. The activity engine 1400 assigns a secondary activity 2120 (FIG. 12) to a guide 2110 according to the first edge condition that evaluates to "true".

At any time, the process of evaluating the edges in order may be interrupted by a primary activity 2115, such as a live search and/or a training query Once the guide 2110 has handled the query, the activity engine 1400 (FIG. 14A) may resume evaluating the conditions associated with the edges in sequence. In at least one embodiment, for an apprentice guide 2205 (FIG. 13), training queries received from other guides are the apprentice guide's primary activity.

According to at least one embodiment of the present disclosure, guides 2110 (FIG. 12) regardless of their status may be rated on their performance handling primary activities 2115. In one exemplary embodiment, edge 2 of FIG. 14A represents a condition where the guide 2110 (FIG. 12), who has attained apprentice status 2205 (FIG. 14A) achieves three consecutive ratings of 2 or less on a scale of 5. If this condition evaluates to "true", the guide 2110 (FIG. 12), who has attained apprentice status 2205 (FIG. 14A) is moved to dormant status 1416. In at least one embodiment of the present disclosure, the guide 2110 (FIG. 12) can be removed from dormant status only by an administrative action of a system operator. If the condition represented by edge 2 of FIG. 14A evaluates to "false", the activity engine 1400 evaluates the condition associated with edge 3 of FIG. 14A.

In one exemplary embodiment, edge 3 of FIG. 14A represents a condition where the guide 2110 (FIG. 12), who has attained apprentice status 2205 (FIG. 14A) has handled more than 10 queries and has a rating less than or equal to 2. If this condition evaluates to "true", the guide 2110 (FIG. 12), who has attained apprentice status 2205 is directed to view video training, and may be presented a graphical user interface such as, for example, the graphical user interfaces illustrated in FIGS. 19 and 20. Upon completion of the video training, the guide 2110 (FIG. 12) maintains apprentice status 2205 (FIG. 14A) and the activity engine 1400 begins the process again, i.e., the activity engine 1400 evaluates the condition associated with edge 2 for this guide 2110. However, if the condition associated with edge 3 evaluates to "false", the activity engine 1400 then evaluates the condition associated with edge 4.

In one exemplary embodiment, edge 4 of FIG. 14A represents a condition where the guide 2110 who has attained apprentice status 2205 has handled more than 10 queries and has at least one rating greater than 3 and has an average rating that is less than 4. If this condition evaluates to "true", then the guide 2110 (FIG. 12) remains an apprentice 2205 (FIG. 14A), and the activity engine 1400 reverts to evaluating the guide 2110 against the condition associated with edge 2 of FIG. 14A. However, if this condition evaluates to "false", then the activity engine 1400 evaluates the condition associated with edge 5.

In one exemplary embodiment, edge 5 of FIG. 14A represents a condition where the guide 2110 has responded to at least 10 queries and has an average rating of at least 4. If this condition evaluates to "true", the guide 2110 who has attained apprentice status 2205 is directed to view video training, and may be presented a graphical user interface such as, for example, the graphical user interfaces illustrated in FIGS. 19 and 20. The guide 2110 who has previously attained apprentice status 2205 then is promoted to a pro 2210. However, if the condition represented by edge 5 of FIG. 14A evaluates to "false", the activity engine 1400 evaluates the condition associated with edge 2 of FIG. 14A.

Referring to FIG. 14B, a guide 2110 (FIG. 12) is classified as a pro 2210. The activity engine 1400 evaluates edges 1-5 of FIG. 14B in sequence. Each edge represents a conditional statement that is evaluated by the activity engine 1400, and the activity engine 1400 assigns a secondary activity 2120 (FIG. 12) to the guide 2110 who has attained the pro status 2210 (FIG. 14B) according to the first edge condition that evaluates to "true". At any time, the process of evaluating the edges in order can be interrupted by a primary activity 2115 (FIG. 12), such as a query. Once the guide 2110 who has attained the pro status 2210 (FIG. 14B) has handled the query, the activity engine 1400 resumes evaluating the edge conditions in order for the guide.

In one exemplary embodiment, edge 1 of FIG. 14B represents a condition where the guide 2110 (FIG. 12), who has previously obtained pro status 2210 (FIG. 14B), achieves three consecutive ratings of 2 or less on a scale of 5. If this condition evaluates to "true", the guide 2110 is moved to dormant status 1416. In at least one embodiment of the present disclosure, the guide 2110 may be removed from dormant status 1416 only by an administrative action of the system operator. If the condition represented by edge 1 of FIG. 14B evaluates to "false", the activity engine 1400 evaluates the condition associated with edge 2 of FIG. 14B.

In one exemplary embodiment, edge 2 of FIG. 14B represents a condition where the activity engine 1400 determines whether the guide's average rating is less than 3. If this condition evaluates to "true", the guide 2110 (FIG. 12), who has previously obtained pro status 2210 (FIG. 14B), is demoted to apprentice status 2205, and the activity engine 1400 evaluates the worker 2110 (FIG. 12) according to the edge conditions associated with apprentice status 2205, as shown, for example in FIG. 14A. However, if the condition associated with edge 2 of FIG. 14B evaluates to "false", the activity engine 1400 then evaluates the condition associated with edge 3 in FIG. 14B.

In one exemplary embodiment, edge 3 represents a condition that determines whether a guide 2110, who has previously obtained pro status 2210, has a single rating less than or equal to 3. If this condition evaluates to "true", the guide 2110 is directed to view video training, and may be presented a graphical user interface such as, for example, the graphical user interfaces illustrated in FIGS. 19 and 20. Upon completing this secondary activity, the guide 2110 (FIG. 12) is permitted to maintain pro status 2210 (FIG. 14B). If this condition evaluates to "false", the activity engine 1400 evaluates the condition associated with edge 4 of FIG. 14B.

In one exemplary embodiment, edge 4 of FIG. 14B represents a condition that determines whether a guide 2110, who has previously obtained pro status 2210, has responded to at least 10 queries and has an average rating of at least 4. If this condition evaluates to "true", the guide 2110 is directed to view video training, and may be presented a graphical user interface such as, for example, the graphical user interfaces illustrated in FIGS. 19 and 20. The guide 2110 then is promoted to master status 2215. If this condition evaluates to "false", the activity engine 1400 evaluates the condition associated with edge 5 of FIG. 14B.

In one exemplary embodiment, edge 5 of FIG. 14B represents a condition where the guide 2110, who has previously obtained pro status 2210, has handled more than 10 queries or the guide's average rating is less than 4 and the modulo of the number of queries handled by the guide is 0. If this condition evaluates to "true", the guide 2110 is directed to view video training, and may be presented a graphical user interface such as, for example, the graphical user interfaces illustrated in FIGS. 19 and 20. Upon completion of the video training, or if the condition represented by edge 5 of FIG. 14B evaluates to "false", the guide 2110 is permitted to maintain pro status 2210 and the activity engine evaluates the condition associated with edge 1 of FIG. 14B.

Referring to FIG. 14C, a worker 2110 is now classified as a master 2215. The activity engine 1400 evaluates edges 1-4 of FIG. 14C in sequence. Each edge represents a conditional statement that is evaluated by the activity engine 1400, and the activity engine 1400 assigns a secondary activity 2120 (FIG. 12) to the guide 2110 who has attained master status 2215 (FIG. 14C) according to the first edge condition that evaluates to "true". At any time, the process of evaluating the edges in order may be interrupted by a primary activity 2115 (FIG. 12), such as a query. Once the guide 2110 who has attained master status 2215 (FIG. 14C) has handled the query, the activity engine 1400 resumes evaluating the edge conditions in order for the guide.

In one exemplary embodiment, edge 1 of FIG. 14C represents a condition where the guide 2110 who has attained master status 2215 achieves three consecutive ratings of 2 or less on a scale of 5. If this condition evaluates to "true", the poorly performing guide 2110 who had attained master status 2215 is moved to dormant status 1416. In at least one embodiment of the present disclosure, the guide may be removed from dormant status only by an administrative action of the system operator. If this condition evaluates to "false", the activity engine 1400 evaluates the condition associated with edge 2 of FIG. 14C.

In one exemplary embodiment edge 2 of FIG. 14C represents a condition where the activity engine 1400 determines whether the guide's average rating is less than 3. If this condition evaluates to "true", the guide 2110 who has attained master status 2215 is directed to view video training, and may be presented a graphical user interface such as, for example, the graphical user interfaces illustrated in FIGS. 19 and 20. The guide 2110 who had attained master status 2215 but has exhibited an inability to perform consistently at that level then is demoted to a pro 2210, whereby the activity engine 1400 then will evaluate the worker 2110 according to the edge conditions associated with an pro status 2210, as shown, for example, in FIG. 14B. However, if the condition associated with edge 2 in FIG. 14C evaluates to "false", the activity engine 1400 then evaluates the condition associated with edge 3 in FIG. 14C.

In one exemplary embodiment, edge 3 of FIG. 14C represents a condition where the guide 2110 who has attained master status 2215 is not in another training session and there are other guides registered with the system with lower ratings than the master guide. If this condition evaluates to "true", the guide 2110 who has attained master status 2215 is directed to issue a training query. If this condition evaluates to "false", the activity engine evaluates the condition associated with edge 4 of FIG. 14C.

In one exemplary embodiment, edge 4 of FIG. 14C represents a condition where the modulo of the number of queries handled by the guide 2110 who has attained master status 2215 is 0. If this condition evaluates to "true", the guide 2110 who has attained master status 2215 is directed to view video training, and may be presented a graphical user interface such as, for example, the graphical user interfaces illustrated in FIGS. 19 and 20. After viewing the video the guide 2110 retains their master status 2215. If this condition evaluates to "false", the activity engine 1400 evaluates the condition associated with edge 1 of FIG. 14C.

Although FIGS. 14A-14C were discussed in terms of an information search system 100 (see FIG. 1) involving human guides, the activity engine 1400 processes are not limited. The activity engine 1400 processes may be applied to any situation involving workers 2110 in a computer-based system, such as system 1100 (see FIG. 11) described above, that handle user initiated tasks, and the present disclosure includes at least one embodiment of this type.

FIGS. 14A-14C and the related discussion illustrate the operation of an activity engine 1400 according to at least one embodiment of the present disclosure. However, FIGS. 14A-14C and the related discussion illustrate the operation of an activity engine 1400 according to at least one embodiment of the present disclosure in the context of an individual task worker working on a single type of task. For example, in at least one embodiment of the present disclosure involving an Internet search system 100 (see FIG. 1) such as the type described elsewhere herein, FIGS. 14A-14C and the related discussion illustrate the operation of an activity engine 1400 in the context of an individual guide or worker 2110 (FIG. 12) handling query(ies) on a single keyword or other task(s). An Internet search system 100 (see FIG. 1) such as the type described elsewhere herein is not so limited. It is within the scope of the present disclosure that a guide 2110 (FIG. 12) may be qualified for a plurality of keywords. In addition, the same guide may be a master at some keywords, a pro at other keywords, and an apprentice at other keywords, resulting in a guide having multiple ratings. Accordingly, an activity engine 1400 according to at least one embodiment of the present disclosure is able to concurrently coordinate the activities of a plurality of guides 2110, where each guide is qualified for one or more keywords, and any given guide may be a master, pro, or apprentice for one or more keywords for which the guide is qualified.

Further the states and edge rules described are exemplary. Any state(s) and/or edge rule(s) may be used to manage a worker(s) using the method and system described herein.

Figure 15B:
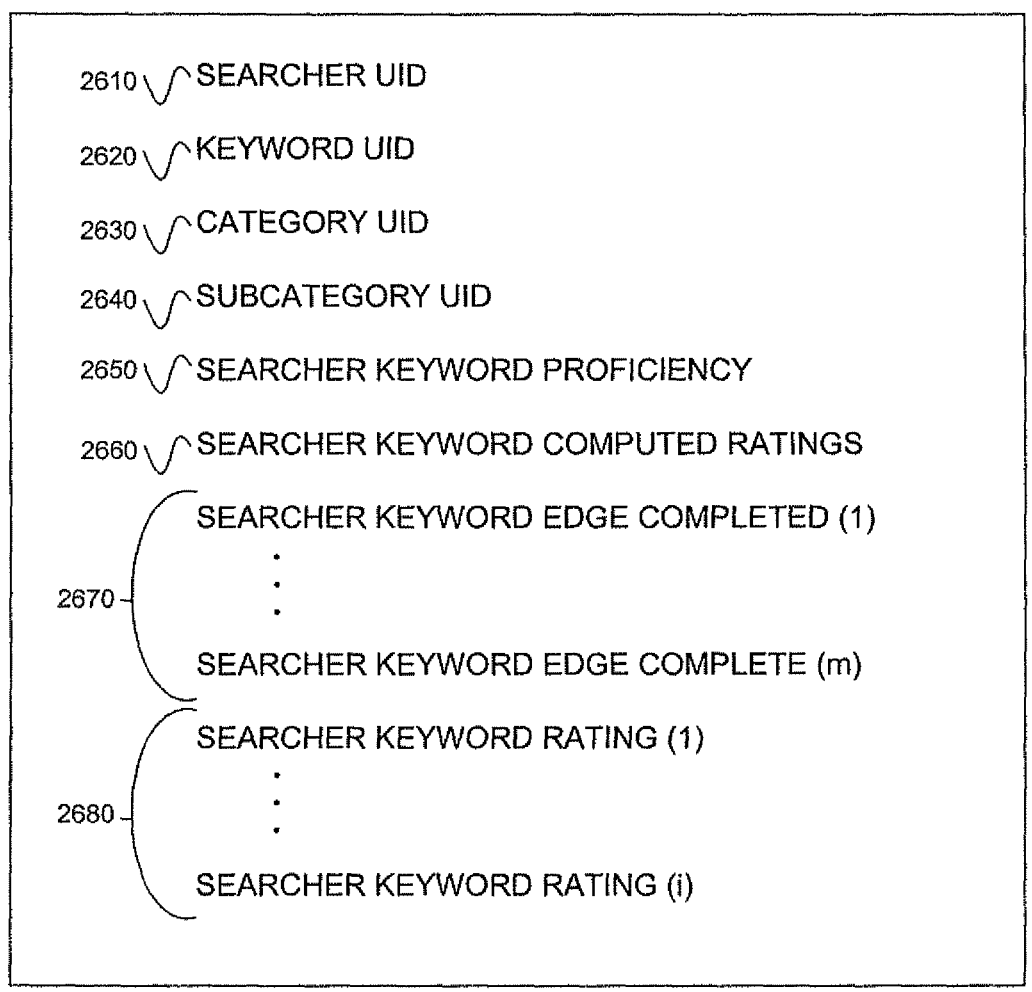

According to at least one embodiment, a system 100 (see FIG. 1) according to the present disclosure comprises a database for each guide 2110 (FIG. 12). The database may comprise a searcher record(s) 2400 as shown in FIG. 15A, and a searcher keyword record(s) 2600 as shown in FIG. 15B. A searcher record 2400 (FIG. 15A) may include a searcher UID field 2410, a searcher name field 2420, a searcher overall proficiency field 2430, a searcher category proficiency fields(s) 2440, a searcher subcategory proficiency field(s) 2450, a searcher overall rating field 2460, a searcher category rating field(s) 2470, a searcher subcategory rating field(s) 2480, and/or searcher keyword field(s) 2490. The content and functionality of the fields is explained below with respect to FIG. 15A.

FIG. 15A illustrates a searcher record 2400 according to at least one embodiment of the present disclosure. The searcher UID field 2410 may include a unique identifier (UID) of a searcher. The searcher name field 2420 may include an identifier of the searcher.

The searcher overall proficiency field 2430 may include an indicator of the current overall proficiency level of a searcher (e.g., "apprentice", "pro", "master", etc.).

The searcher category proficiency field(s) 2440 may include information of a category(ies) associated with a guide and of the guide proficiency level for the respective category (ies).

The searcher subcategory proficiency field(s) 2450 may include information of a subcategory(ies) associated with a guide and of the guide proficiency level for the respective subcategory(ies).

The searcher overall rating field 2460 may include an indicator of the current overall rating level of a searcher (e.g., a numeric value between 1 and 5, inclusive). It may further include rating level indicators which are based on Infoseeker™ ratings and/or searcher ratings, as explained further below.

The searcher category rating field(s) 2470 may include an indicator of the current rating level of a searcher (e.g., a numeric value between 1 and 5, inclusive) associated with searches performed relating to a category. It may further include category rating level indicators which are based on Infoseeker™ ratings and/or searcher ratings, as explained further below.

The searcher subcategory rating field(s) 2480 may include an indicator of the current rating level of a searcher (e.g., a numeric value between 1 and 5, inclusive) associated with searches performed relating to a subcategory. It may further contain subcategory rating level indicators which are based on Infoseeker™ ratings and/or searcher ratings, as explained further below.

The searcher keyword field(s) 2490 may include information relating to the keyword(s) which may be associated with a searcher. The information may include a pointer to keyword record(s) associated with keyword(s) of the searcher.

FIG. 15B illustrates a searcher keyword record(s) 2600 which may be associated with a searcher record 2400 (FIG. 15A). A searcher keyword record 2600 (FIG. 15B) may comprise a searcher UID field 2610, keyword UID field 2620, a category UID field 2630, a subcategory UID field 2640, a searcher keyword proficiency field 2650, a searcher keyword computed ratings field 2660, a searcher keyword edge completed field(s) 2670 and/or a searcher keyword rating field(s) 2680.

The searcher UID field 2610 may include a unique identifier (UID) of a searcher. The keyword UID field 2620 may include a UID of a keyword. The category UID field 2630 may include a UID of a category. The subcategory UID field 2640 may include a UID of a subcategory.

The category UID field 2630 data may be used to determine a searcher category proficiency level, which may be stored in a searcher category proficiency field 2440 (FIG. 15A). The category UID field 2630 (FIG. 15B) data may be used to determine a searcher category rating, which may be stored in a searcher category rating field 2470 (FIG. 15A).

The subcategory UID field 2640 (FIG. 15B) data may be used to determine a searcher subcategory proficiency level, which may be stored in a searcher subcategory proficiency field 2450 (FIG. 15A). The subcategory UID field 2640 (FIG. 15B) data may be used to determine a searcher subcategory rating, which may be stored in a searcher subcategory rating field 2480 (FIG. 15A).

The searcher keyword proficiency field 2650 (FIG. 15B) may include information regarding the guide proficiency level (e.g., "apprentice", "pro", "master", etc.), associated with a keyword. The searcher keyword proficiency field 2650 may further comprise information regarding the edges associated with each state of guide proficiency.

The searcher keyword computed ratings field 2660 (FIG. 15B) may include information calculated using a formula and/or any of the information included in a searcher keyword rating field(s) 2680. Multiple calculation results may be included in a searcher keyword computed ratings field 2660.

The searcher keyword edge completed field(s) 2670 may include information regarding the completion of operations associated with edges of state diagrams associated with a keyword(s). It may further comprise information regarding the method for evaluating an edge.

The searcher keyword rating field(s) 2680 (FIG. 15B) may include information regarding the ratings of a searcher (e.g., a numeric value between 1 and 5, inclusive) when performing searches associated with a keyword. It may further include information to indicate the source of a rating (e.g., trainer, information seeker, administrator, etc.).

Figure 14D:
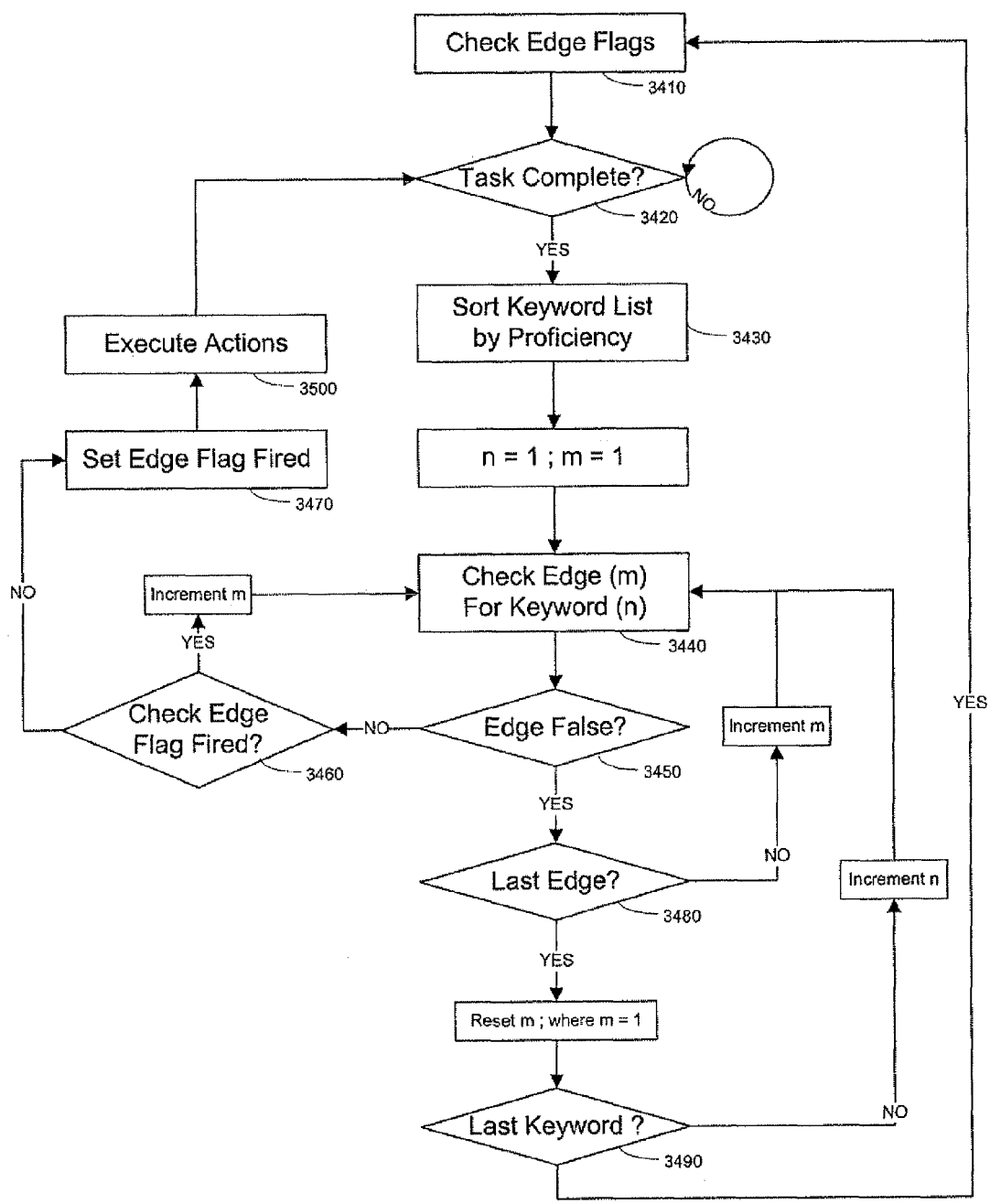

According to at least one embodiment of the present disclosure, when a guide completes a task, whether it is a search session or a directed task, the activity engine 1400 may perform one or more operations. A process for evaluating a change(s) in guide data in response to the results of a task is illustrated in FIG. 14D. The process 3400 first checks 3410 to see if any of the keyword edge completed flags (e.g., indicators stored in the searcher keyword edge completed field(s) 2670 (FIG. 15B)) associated with the keywords of a guide indicate completion of a task. If none of those indicate completed tasks, the guide may be a newly registered guide (i.e., "virgin" (see FIG. 14A)). Alternately, an indicator may be set by a process(es) within the activity engine 1400 or the database which indicates that a guide has been returned to virgin status. The process 3400 (FIG. 14D) then waits for completion 3420 of a task. A task may include, but is not limited to a search task (e.g., a training or customer search task), a directed task (e.g., training a guide, reviewing search results, transcription/translation tasks), a task requested by a guide (e.g., polling, surveys, self-directed training), or any other task a guide can perform which may affect information associated with a guide.

The process 3400 continues by sorting 3430 the data of the keyword record(s) associated with a guide. In at least one embodiment the keywords are sorted according to the guide proficiency level (e.g., "apprentice", "pro", "master", etc.) in descending order (i.e., "master", "pro", "apprentice"). The record associated with the first keyword is selected and process 3400 then checks 3440 an edge (as illustrated for the various exemplary proficiency levels in FIGS. 14A-14C) to determine the status of a condition associated with the edge.

If the edge evaluates 3450 (FIG. 14D) to "false" the process 3400 continues to determine 3480 if the last edge associated with the keyword has been evaluated. If the edge does not evaluate 3450 to "false" the process 3400 then proceeds to check 3460 the keyword edge completed flags (e.g., indicators stored in the keyword edge completed field(s) 2670 (FIG. 15B)) to determine if the edge has fired. If the edge completed flag indicates that the edge has fired, the edge pointer is incremented and the process 3400 (FIG. 14D) continues to check 3440 the next edge associated with the keyword.

If the check 3460 (FIG. 14D) of the edge flag indicates that the edge has not fired, the process 3400 continues to set 3470 the edge fired flag and execute 3500 actions associated with that edge, which may include updating the database to reflect results of a training exercise and/or test, indicating that a training video has been viewed, directing a guide(s) to perform a task, etc. The process then returns to wait for a task to be complete 3420.

Process 3400 then determines 3480 if the last edge associated with a guide keyword record has been evaluated. If the last edge has not been evaluated process 3400 increments the edge pointer and checks 3440 the next edge associated with the searcher keyword record(s) 2600 (FIG. 15B).

If process 3400 (FIG. 14D) determines 3480 that the last edge has been evaluated the process 3400 then resets the edge pointer (i.e., sets the pointer to the first edge) and determines 3490 if the last keyword record has been reached. If the process determines 3490 that the last keyword has not been reached, the process then increments the keyword pointer and returns to check 3440 the next edge associated with the next keyword. If the process 3400 determines that the last keyword record has been reached, process 3400 returns to check 3410 the keyword edge completed flags.

In an activity engine 1400 according to at least one embodiment of the present disclosure, if a guide 2110 is at the master level or equivalent in 50% or more of his qualified keywords, the checking 3440 (FIG. 14D) of edges is performed only for qualified keywords for which the guide 2110 is at the master level. For example, if a guide 2110 is registered for 11 keywords, and he or she has achieved the master level in six of the keywords, the pro level in four of the keywords, and the apprentice level in one of the keywords. The activity engine 1400 would evaluate the edges for the keywords for which the guide proficiency level was "master". The other keywords might be omitted from the list or an equivalent process step might be performed. For example, if the activity engine 1400 reached the last edge for the last master level keyword in the descending list, the activity engine 1400 would then return to the first master level keyword and begin processing edges for that keyword, rather than processing the first edge for the first pro level keyword in the descending list.

As illustrated in FIG. 14D, an activity engine 1400 according to at least one embodiment of the present disclosure, keeps track of edges that have evaluated to "true". Accordingly, if the task associated with an edge has been performed once, the edge will be skipped the next time in favor of the same edge on another keyword. The result is that the activity engine process according to this embodiment will not permit the guide 2110 to repeat a task until all tasks associated with all other edges associated with all other keywords associated with a guide have been performed once. In at least one embodiment of activity engine 1400 according to the present disclosure, a record is kept (e.g., a Boolean variable is changed to "true") to signify that an edge task has been performed as described with respect to FIG. 15B. When all edge tasks have been performed once, the records may be reset (e.g., the Boolean variables are changed to "false"). For example, if a guide 2110 is at the master level 2215 for the keywords "gorillas", "golf", and "spiderman". The process 3400 described above sorts the keywords in order. Four edges are defined in the activity engine 1400 for each keyword at the master level. If the activity engine process causes the guide 2110 to perform the task associated with the first edge for the keyword "gorillas", that task is recorded when complete. According to this embodiment of the activity engine 1400, before the activity engine process would require the guide 2110 to perform the task associated with the first edge for the keyword "gorillas" again, the activity engine process would require the guide to perform the tasks associated with the other edges for the keyword "gorillas" as well as all edges for the keywords "golf" and "spiderman".

This technique weighs in favor of higher ranked guides training lower ranked guides. If a guide 2110 has a widely distributed set of levels across a set of qualified keywords, he or she will typically not be performing tasks associated with the keywords for which the guide has a lower rank when there are guides who have lower rank for the qualified keyword (QKW) available for training sessions on the higher ranked keywords of the guide.

An activity engine 1400 according to at least one embodiment of the present disclosure comprises a state table that contains all of the descriptions and names of the various states. The table may also provide relative rankings among the states. For example, "apprentice" is lower than "pro" which is lower than "master". The state table may include multiple state(s) (e.g., "vetting", "voice", "sms", "live", "master", "pro", "apprentice") which may be associated with an item associated with a guide. A guide associated with the item (e.g., QKW, overall, category, etc.) may have multiple states associated with the item. Activities (both primary and/or secondary) may be assigned to and/or permitted for a guide based on a state(s). For example, as guide may have the rank master for vetting, apprentice for sms, and pro for voice for the category "sports". Using this example, a guide might be permitted to review and vote on any result associated with sports, might not be permitted to respond to sms queries associated with sports, and might be allowed to categorize voice queries associated with sports.

An activity engine 1400 according to at least one embodiment of the present disclosure comprises a task table that identifies secondary activities that a guide may be assigned.

An activity engine 1400 according to at least one embodiment of the present disclosure comprises a state edge table that may include the following data elements:

- Identification of the associated state of a guide (current value from the database or some other storage) as illustrated in the searcher keyword record 2600 (FIG. 15B).
- A test condition, including a set of script instructions that are to be executed in order to determine if a condition fires "true" or "false". The state process (as illustrated in FIG. 14A-14C) may utilize an embedded scripting language such as Perl®, Python®, Tcl, JavaScript® with a preferred implementation in Ruby. If a script is executed, a handle is provided to the information from the state process needed by the script in order to determine the outcome of the condition test (e.g., number of lower rated guides online, number of consecutive queries that have been rated less than or equal to 2, etc.) which is associated with an edge, and may be recorded in a searcher keyword edge complete field 2670 (FIG. 15B) of a searcher keyword record 2600.
- Identification of a directed task (i.e., assigning the guide to perform a specified task) or other action(s) associated with the edge based on the results of the test condition.
- A resulting state (i.e., a state that is assigned to a keyword for this guide) indicating the state where processing will start for any subsequent state processing request. That is, based on the outcome from the test condition; decide if the assigned state of a searcher should be modified.

As illustrated in FIGS. 15A and 15B, a guide may have a rank and a rating for a qualified keyword, a subcategory, a category and/or overall. Rank is a state associated with the guide (e.g., apprentice, pro, master) as illustrated in FIGS. 14A, 14B and 14C. A rating may be a parametric value which is used to determine changes in rank.

A qualified keyword (QKW) is a keyword which has been associated with a category and subcategory, as identified by, for example information in the keyword UID field 2620 (FIG. 15B), category UID field 2630, and subcategory UID field 2640. A searcher keyword record 2600 (FIG. 15B) is a data structure associated with a guide and the lowest level of the taxonomy (i.e., a qualified keyword).

For any item (e.g., qualified keyword, subcategory, category, overall, etc.) associated with a guide (or searcher) a rank(s) (or state) may be associated with the guide for that item. Information regarding this state (e.g., "pro") may be stored in the searcher proficiency (e.g., searcher keyword proficiency field 2650 of a searcher keyword record 2600).

For a qualified keyword(s) associated with a guide (or searcher) a rating(s), which may be a value computed from individual search session rating information (e.g., rating by a user, a searcher, administrator, etc.) and/or information of the type of search session (e.g., user search, trainer search, training search, etc.), and/or information of the rating(s) and/or rank(s) of the person who did the rating (e.g., master, pro, apprentice) may be recorded. One or more ratings may be computed for a searcher for a given QKW. For example, a rating based on user ratings, a rating based on training sessions where the guide was the trainer, a rating based on training sessions where the guide was the trainee, a rating based on all sessions, etc. Information regarding a rating (e.g., a numeric value) may be stored in the searcher keyword proficiency field 2650 of a searcher keyword record 2600.

For a rank(s) (state(s)) associated with a guide for an item (including but not limited to overall, QKW, category, subcategory) information regarding the edges associated with that state may be recorded. For example a pointer to the evaluation condition for the edge from the edge state table described above, and/or an indicator regarding whether the edge has evaluated to "true", as described with respect to FIG. 14D. The information may be stored in the searcher keyword edge completed field 2670 (FIG. 15B) of the searcher keyword record 2600. A rank(s) and the associated edge information for items (e.g., subcategory, category, overall) may be stored in, for example, the searcher overall proficiency field 2340, searcher category proficiency 2440, and searcher subcategory proficiency field 2450 of a searcher record 2400. For example, a rank indicator (e.g., "master", "pro", "apprentice"), edge conditions associated with a rank, edge indicators, etc.

Rank(s) associated with a guide for an item(s) may be dependent upon each other. For example, a guide may be a "master" on a subcategory if he or she has achieved the master rank for 3 or more QKW associated with the subcategory, as a different example, a guide may be a "pro" overall if he or she has achieved the master level or pro level for 70% or more of the QKW associated with the guide.

For a rating(s) associated with a guide for an item (including but not limited to overall, QKW, category, subcategory) information regarding rating(s) associated with that item may be recorded. For example a rating derived from rating(s) from other item(s), such as a subcategory rating which is the average of rating(s) for keyword(s) of a guide which are associated with the subcategory for a number of ratings, a category rating which is the average of rating(s) for keyword(s) of a guide which are associated with a category for a number of ratings. The rating information may be stored in the searcher keyword computed ratings field 2660 (FIG. 15B) of searcher keyword record 2600, the searcher subcategory rating field 2480 (FIG. 15A), the searcher category rating field 2470, and/or the searcher overall rating field 2460 of a searcher record 2400.

After being presented with the disclosure herein, one of ordinary skill in the relevant art will realize that other rank state conditions and/or rating formulas may be implemented without departing from the spirit and scope of the present disclosure.

Figure 22:
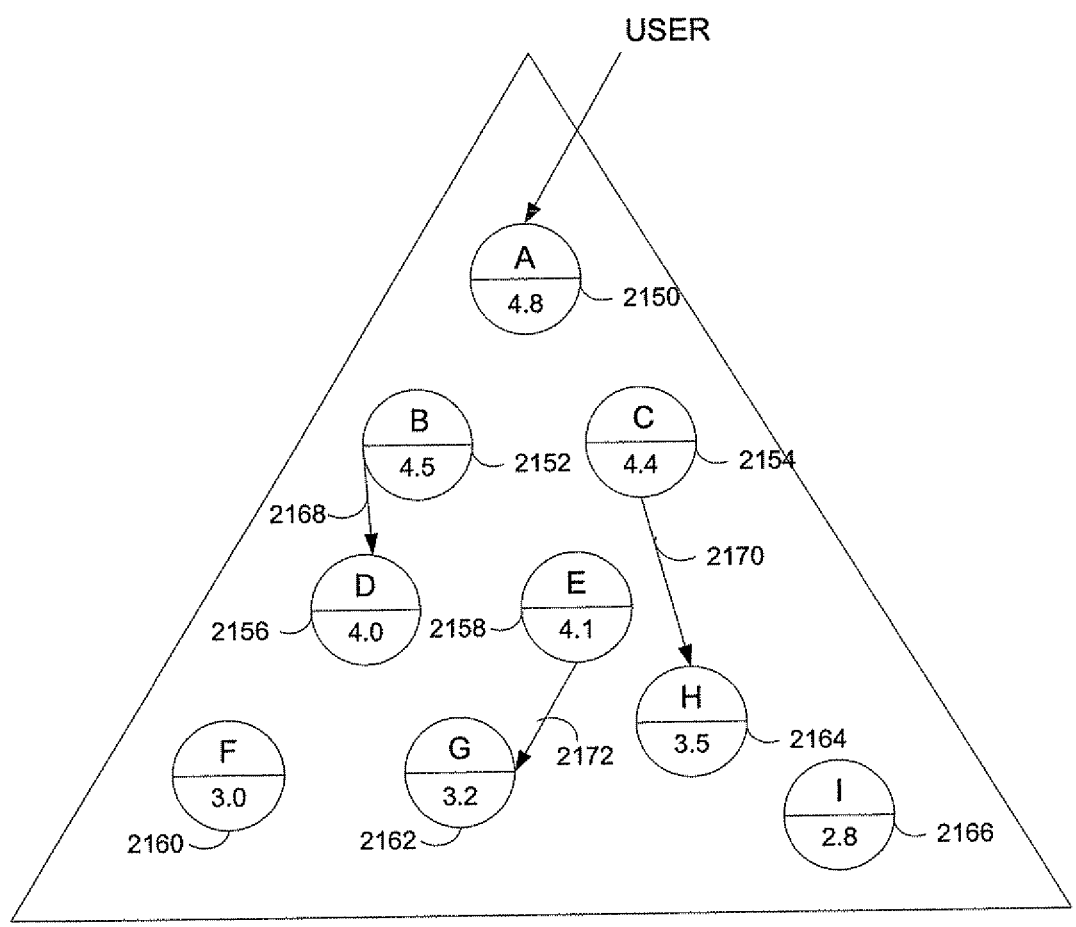
FIG. 22 is a graphical representation of a hierarchy of human guides.

FIG. 22 illustrates a graphic representation of the operation of a system according to at least one embodiment of the present disclosure. Shown in FIG. 22 are exemplary guides A through I. Guides A through I are arranged in FIG. 22 to reflect the relative average ratings of the guides on the keyword "superman". For example, guide A 2150 may have an average rating of 4.8, guide B 2152 may have an average rating of 4.5, guide C 2154 may have an average rating of 4.4, guide D 2156 may have an average rating of 4, guide E 2158 may have an average rating of 4.1, guide F 2160 may have an average rating of 3, guide G 2162 may have an average rating of 3.2, guide H 2164 may have an average rating of 3.5, and guide I 2166 may have an average rating of 2.8. The operation of a system according to at least one embodiment of the present disclosure will cause new user queries to be delivered to the highest rated guide for the keyword, i.e., guide A 2150, as described elsewhere herein. If guide A 2150 is not available or rejects the query, it would be routed to guide B 2152, as described elsewhere herein. In at least one embodiment rank and/or rating of a guide associated with the category which is associated with a QKW of a query may be used to select a guide to handle a query.

Meanwhile, the system according to at least one embodiment of the present disclosure will allow guides 2110 within the system to issue training queries to other, lower rated guides 2110 for that keyword. This activity reflects, for example, the result of the evaluation of the condition represented by edge 3 of FIG. 14C. For example, as shown in FIG. 22, guide B 2152 is querying 2168 guide D 2156, guide C 2154 is querying 2170 guide H 2164, and guide E 2158 is querying 2172 guide G 2162. As the guides 2110 accumulate new ratings, rankings may change, as discussed elsewhere herein. In at least one embodiment of the present disclosure, the highest rated available guide, e.g., guide A 2150 in FIG. 22, for a keyword trains the lowest rated available guide, for example guide I 2166 in FIG. 22, for the keyword, as a result of the operation of the activity engine 1400 described elsewhere herein including in FIGS. 14A-14D and FIGS. 15A and 15B.

Keywords and phrases may be classified using a typical taxonomy, such as DMOZ. The disclosed system may use such taxonomy or a similar method to classify keywords into broader classes (e.g., subcategory (a "small" group of keywords), category (a "big" group), and domain (a "very big" group) of associated words to allow "generalist searchers" to field queries when no "specialist" is associated with a given keyword. In at least one embodiment rank and/or rating of a guide associated with the category which is associated with a QKVV of a query may be used to select a guide to handle a query.

In at least one embodiment, if no available guide is associated with a QKW, the system 1100 (FIG. 11) may select a guide who has the highest rank and rating for the subcategory associated with the QKW. If no available guide is associated with the subcategory associated with the QKW, the system 1100 may select a guide who has the highest rank and rating for the category associated with the subcategory associated with the QKW. If no available guide is associated with the category associated with the subcategory associated with the QKW the system will select a guide with the highest overall rank and rating. Using this method, a user query may be directed to the most proficient guide with the highest level of expertise relating to the query (i.e., the available searcher with the highest rank and the highest rating within that rank). In a specific embodiment, if a guide is a "master" and has a rating of 3.5, he or she will be selected ahead of a guide that is a "pro" and has a rating of 4.0. Likewise, if a guide is a "master" and has a rating of 4.8 he or she will be selected ahead of a guide who is a "master" and has a rating of 3.8.

In other embodiments other selection criteria may be employed. In addition, the criteria may be dependent on the type of item with which the ratings and rankings are associated. For example, in selecting a guide associated with a keyword, rating only might be used to select a searcher, while when selecting a searcher associated with a category, rank and rating (as illustrated above) might be used.

In a system according to at least one embodiment of the present disclosure, if a guide 2110 is instructed to issue a training query to a lower ranking guide for a keyword, and there is no lower ranking guide for the keyword available, the system may instruct the guide 2110 to issue a training query to a lower ranking guide for a subcategory that includes the keyword. This could include a guide who was associated with a searcher keyword record 2600 (FIG. 15B) wherein the subcategory UID 2640 of a searcher keyword record 2600 is the same as the subcategory UID 2640 of the searcher keyword record 2600 of the higher ranking guide. If a guide 2110 is instructed to issue a training query to a lower ranking guide for a subcategory, and there is no lower ranking guide for the subcategory available, the system may instruct the guide 2110 to issue a training query to a lower ranking guide for a category that includes the subcategory. In this way, the "master" guide will provide training to lower-ranking guides who are associated with keywords related to the "master" guide keywords. While a category, subcategory, keyword taxonomy is used in this example a greater or lesser number of levels within the taxonomy is within the scope of the disclosure. In an alternate embodiment, searcher rating(s) and/or rank(s)

associated with any item(s) may be used to select a guide who issues a training query and/or a guide who receives a training query. The system 1100 (FIG. 11) is not limited to any particular method or formula for determining a searcher to provide training and/or a searcher who receives training. In at least one embodiment, subcategory rank and rating may be used for training selection.

Where a worker within a system according to at least one embodiment of the present disclosure is a master, a secondary activity 2120 (FIG. 12) that may be assigned to such a worker may include training other workers. As illustrated in system 8400 of FIG. 16, graphical user interfaces (GUI's) 8402 and 8427 may appear on a searcher computer system of a member of the master level 2215 (FIG. 13) in at least one embodiment of the disclosed system and method.

The GUI 8402 (FIG. 16) includes a "Train Guides?" caption 8405. In at least one embodiment of the disclosed system and method, the GUI 8402 also includes a cancel button 8410 that by "clicking" on a human searcher can elect not to train other human searchers.

The GUI 8402 also includes a text field box 8420 associated with an "Enter Query" caption 8415. In at least one embodiment of the disclosed system and method, the text field box 8420 accepts text from a human searcher providing training. In particular, the human searcher providing the training can enter an information query into the text field box 8420 and submit the query to be answered by a human searcher being trained. Alternatively, the human searcher providing the training may select a pre-answered query from a list of queries entitled, "List of PAQ's (Previously Answered Queries) w/o Guides" 8425, for example. In at least one embodiment of the disclosed system and method, the previously answered queries are answered without direct human searcher interaction.

Figure 16:
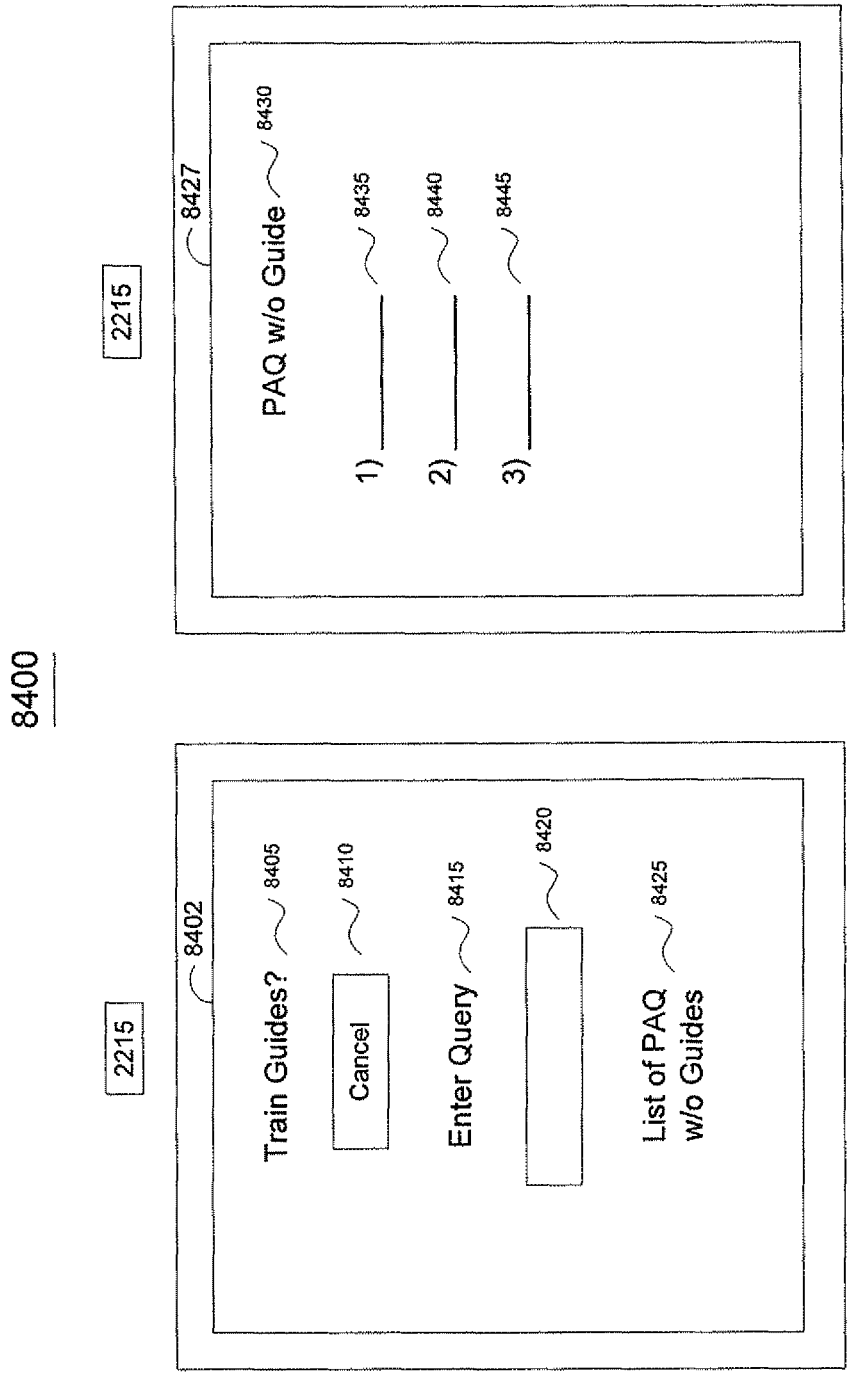
FIG. 16 is an illustration of exemplary graphical user interfaces (GUI's) for trainers.

As illustrated in FIG. 16, the GUI 8427 includes a list entitled "PAQ w/o Guide" 8430 from which a human searcher conducting training may select at least one information search query to submit to a human searcher being trained. For example, the information search query 8435 may be a previously answered information search query such as, "Who won the Super bowl in 1975", The human searcher conducting training may select the information search query to be submitted for training. A human searcher assigned to the category "football", for example, may be selected to receive the information search query and provide search results for the information search query.

Figure 17:
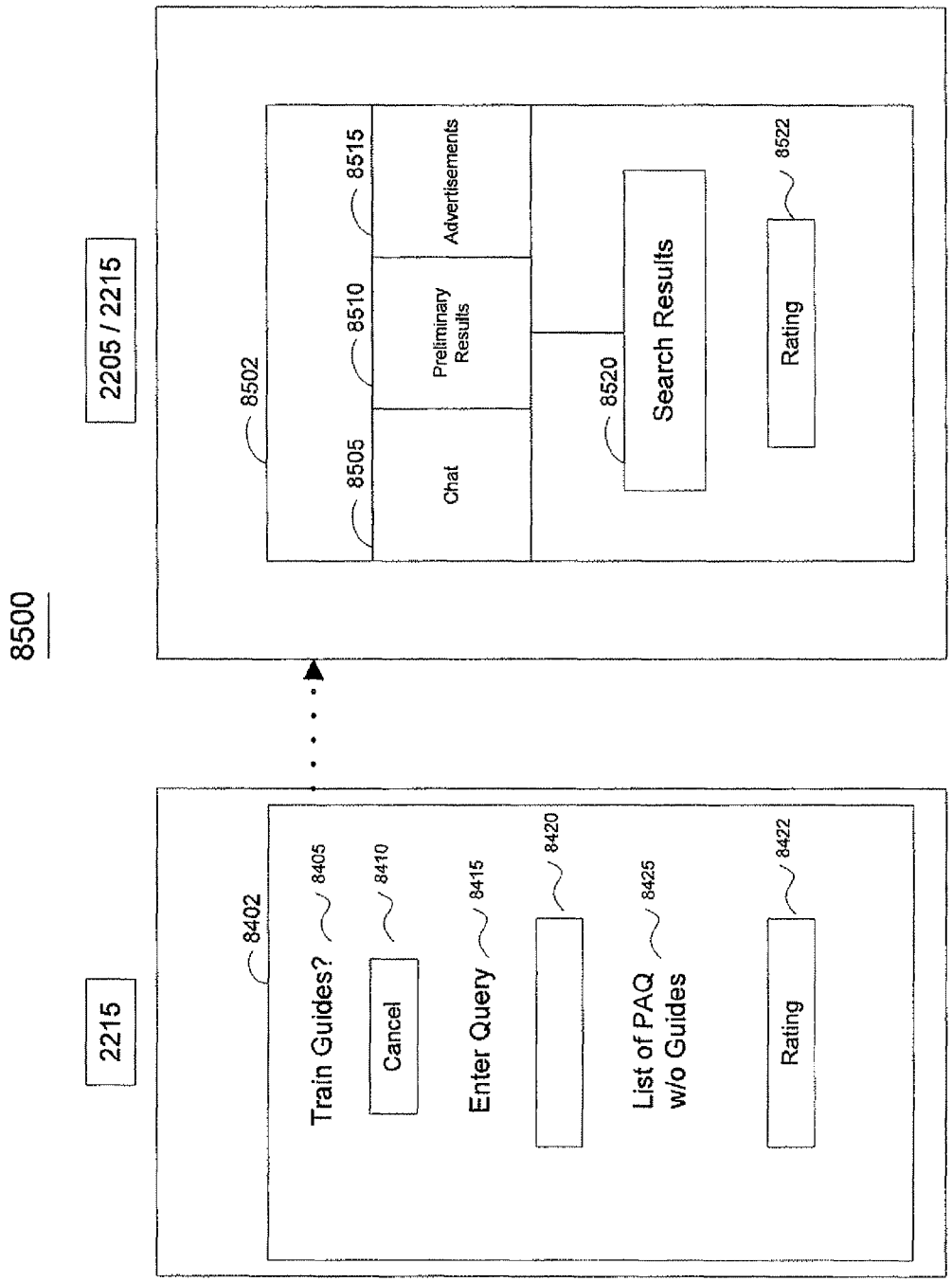
FIG. 17 is an illustration of exemplary GUI's for trainers and trainees.

As illustrated in FIG. 17, the computer screen of a master 2215 (FIG. 13), for example, includes GUI 8402 (FIG. 16). After the master 2215 submits the entered or selected query, to the apprentice in the text field box 8420, the guide being trained may interact with GUI 8502 (FIG. 17). In at least one embodiment, the GUI 8502 is an interface through which the information seeker interacts with the system. Once a search query has been transmitted to a guide being trained, a "rating" box may appear in the GUI 8402.

The "rating" box 8422 (FIG. 17) or other equivalent interface, such as a "radio box" or selectable rating buttons (e.g., "Good", "OK", "Bad") may be used by the guide providing training to enter a rating for the guide being trained, which may be stored in a searcher record (e.g., searcher keyword record 2600 (FIG. 15B)). The guide being trained may receive feedback on his/her performance, or the system may modify a rating(s) and/or ranking(s), as discussed above, etc.

As illustrated in FIG. 17, the GUI 8502 includes a chat window 8505, a preliminary results section 8510, and an advertisements section 8515, in addition to a search results section 8520 and may include a "rating" box 8522.

The human searcher conducting the training, for example, a "master", may utilize the chat window 8505 to interact with the human searcher receiving the training, for example, an apprentice. For example, the apprentice may chat with the master to seek clarification regarding a selected information search query.

The preliminary results section 8510 may include intermediate results produced by the apprentice being trained in response to the information search query submitted by the master.

The advertisements section 8515 (FIG. 17) may include advertisement text, video, audio, images, etc. promoting the system of the present disclosure, for example, or advertisement text, video, audio, images, etc. related to the query. Optional usages of the advertisements section 8515 are described below with reference to training a guide to select appropriate advertisement(s) for a query.

The search results section 8520 may include final results produced by the searcher being trained in response to the information search query submitted by the searcher providing training.

The "rating" box 8522 or other equivalent interface, such as a "radio box" or selectable rating buttons (e.g., "Good", "OK", "Bad") may be used by the guide receiving training to enter a rating for the guide performing the training, which may be stored in a searcher record (e.g., searcher keyword record 2600 (FIG. 15B)). In this way, the guide providing training may receive feedback on his or her performance, or the system may modify a rating(s) and/or ranking(s), as discussed above, etc.

While the embodiment illustrated above describes one worker (a master) training one worker (an apprentice), other variations of this scenario are within the scope of the embodiments described herein. For example, one worker might train multiple lower ranking workers in a collaborative environment wherein the chat interface, queries, results, etc. are viewable by any or all of a session participants. The participant(s) might join and exit the session at any time. In this scenario multiple low-ranking searchers may be trained during downtime, but may respond to user requests as required. This may allow a worker to earn any or all of his or her compensation by performing a secondary activity such as training other workers.

In addition, a guide being trained and/or a guide providing training may provide other forms of feedback to the system. For example, the ratings above might be applied to various aspects of performance, such as knowledge of the subject area, ability to provide effective training, courtesy, typing skills, language usage, speech qualities (if training is conducted using the voice-based capabilities described elsewhere in this disclosure), and/or any other aspects of a training session.

Figure 18:
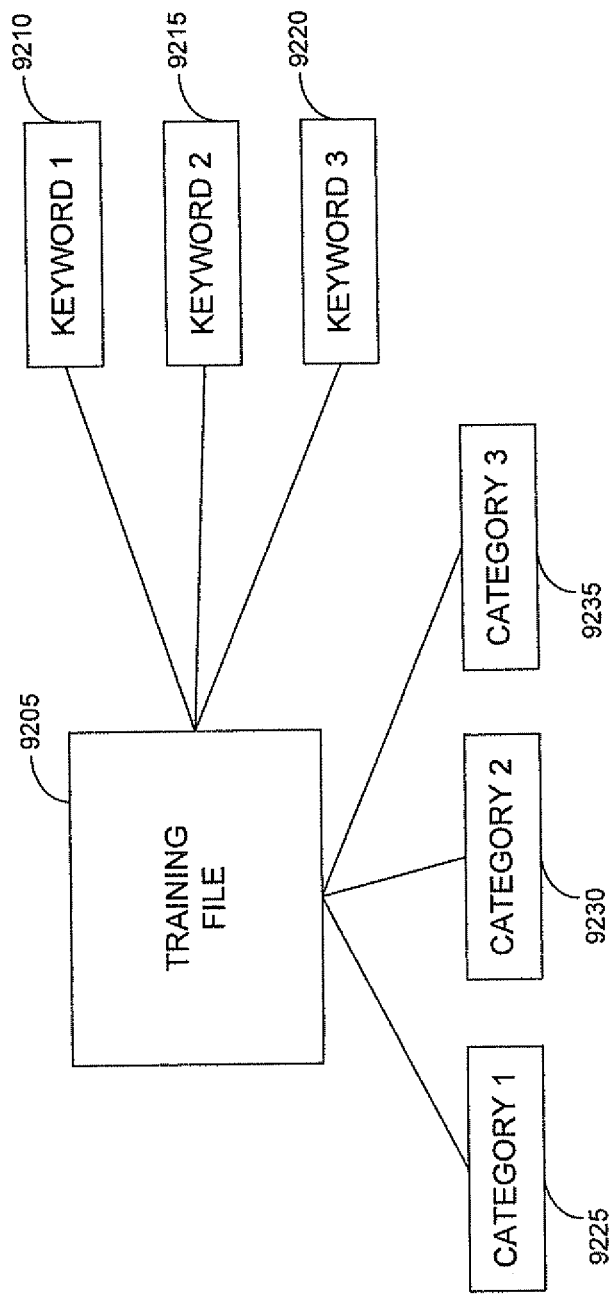
FIG. 18 is an illustration depicting the association between a training file and keywords and categories.

As illustrated in FIG. 18, a video training file 9205 utilized in the secondary activity 2120 (FIG. 12) to conduct video training, can be associated with a first keyword 9210, a second keyword 9215, a third keyword 9220, a first category 9225, a second category 9230, and/or a third category 9235.

For example, a human guide wishing to provide a video training file 9205 on searching related to basketball may associate a video training file with the first category 9225, for example, "Basketball" and/or with the first keyword 9210, for example, "NCAA Basketball". After being presented with the disclosure herein, one of ordinary skill in the relevant art will realize that a variety of other configurations may be provided without departing from the spirit and scope of the present disclosure. For example, in addition to being associated with the category "Basketball" and the keyword "NCAA Basketball", the video training file 9205 (FIG. 18) may further be associated with a second category 9230, for example, "NCAA Sports" and/or a second keyword 9215, for example, "NCAA Division 1 Basketball".

An association allows the system or a human guide searching for a video training file to be able to match the keywords and/or categories to which the guide is assigned to the keyword(s) and/or category(ies) assigned to the video training file 9205 (FIG. 18).

Figure 21:
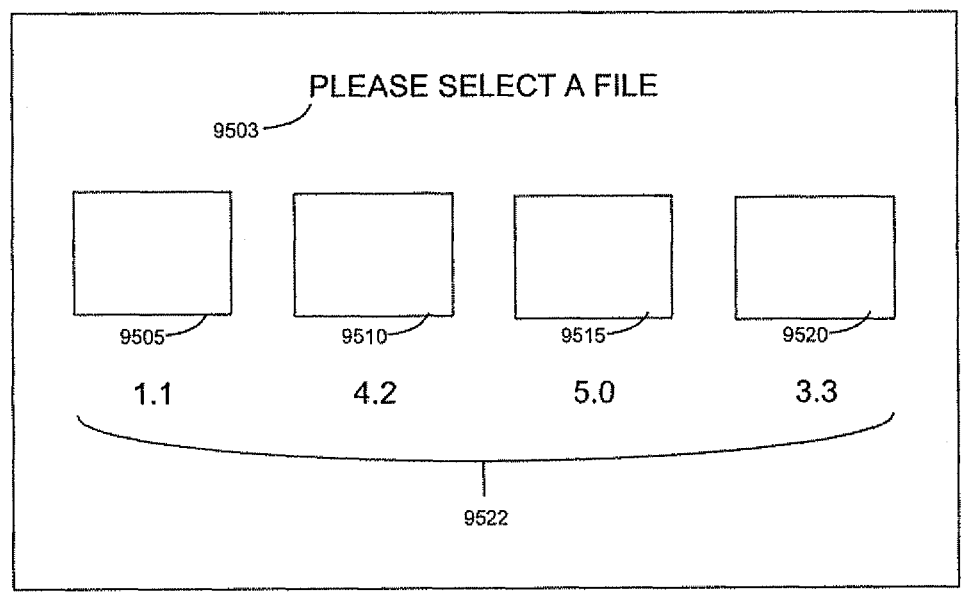
FIG. 21 is an example of a GUI for multimedia training file selection.

While the association of an item with a training file is illustrated for a provider who created the file, it is within the scope of this disclosure that a searcher/provider(s) may make associations between a file and any item (e.g., QKW, category, tag, state, etc.). This may allow providers who have viewed the file to associate it with other items. For example, a searcher may feel that a training file is suitable for searchers at the pro level for the category "NCAA Basketball", but another searcher may find it to be useful for a master level searcher for the category "Sports". A GUI such as that illustrated in FIG. 21 may be used for associating items with a training file.

Figure 19:
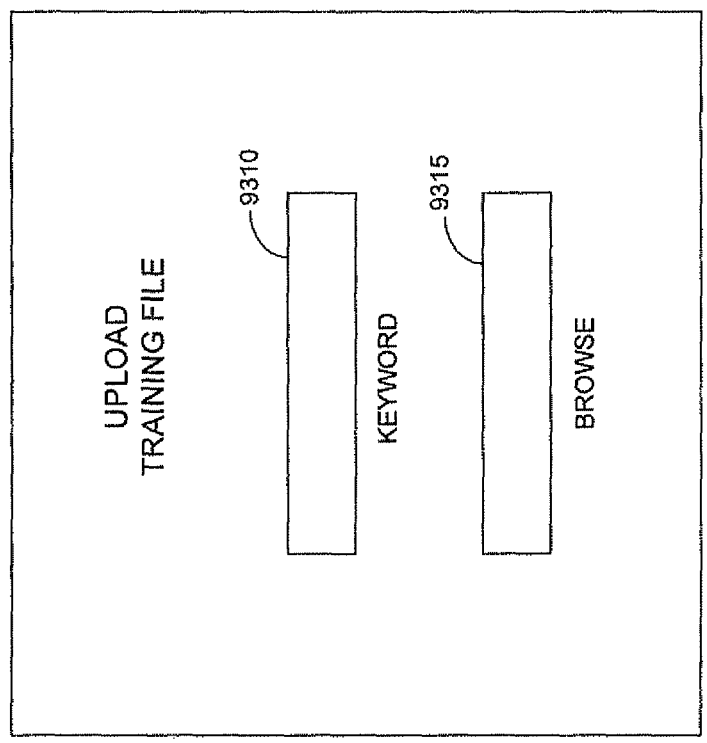
FIG. 19 is an example of a GUI for uploading a multimedia file.

As illustrated in FIG. 19, in at least one embodiment of the present disclosure, the graphical user interface 9305 allows a human guide to upload and/or store a video training file for use in future training. In such an embodiment, the graphical user interface 9305 may include keyword text box 9310 and browse box 9315.

Keyword text box 9310 allows the uploader of the video training file, that is, a human guide wishing to upload a video file, to assign a keyword or category to be associated with the video file. In particular, the uploader may type the name of a keyword, for example, to be associated with the video file into the keyword text box 9310. After being presented with the disclosure herein, one of ordinary skill in the relevant art will realize that other configurations may be provided without departing from the spirit and scope of the present disclosure. For example, in at least one embodiment, the keyword text box 9310 (FIG. 19) may be replaced with a list of keywords and/or categories that would allow the uploader to be able to select the keyword(s) and/or category(ies) to be associated with the video training file.

Browse box 9315 allows the uploader to select a training file to be uploaded. A training file may be located using any method which is applicable. For example, a training file may be located on a local storage device of a guide computer system (e.g., 1122 (FIG. 11)). An uploader may select a file which is uploaded to a target URI or other storage which may be accessible to the system 1100. Alternate methods of locating and storing a training file will readily occur to one of ordinary skill in the relevant art after being presented with the disclosure herein.

In at least one embodiment, a guide who uploads a video training file may be compensated based upon usage, efficacy (as measured by ratings and/or level of guides viewing the file), ratings of the file by guides, or other suitable measurements determined by the system managers. Such compensation may help motivate guides to produce effective training tools, to select suitable keywords and categories, and to produce training for popular topics. The tracking of a rating(s), etc. may further be used to select guides for activities by the system 1100 (FIG. 11). The video database 9685 (FIG. 25) alone or in combination with other elements of the system 1100 (FIG. 11) may be used to determine demand and/or need for training files in any area. A searcher(s) may be requested to produce training materials in the associated areas, for which they may be compensated. Searchers might be able to access the system to view relevant information using a GUI such as that illustrated in FIG. 10E with respect to keywords.

Figure 20:
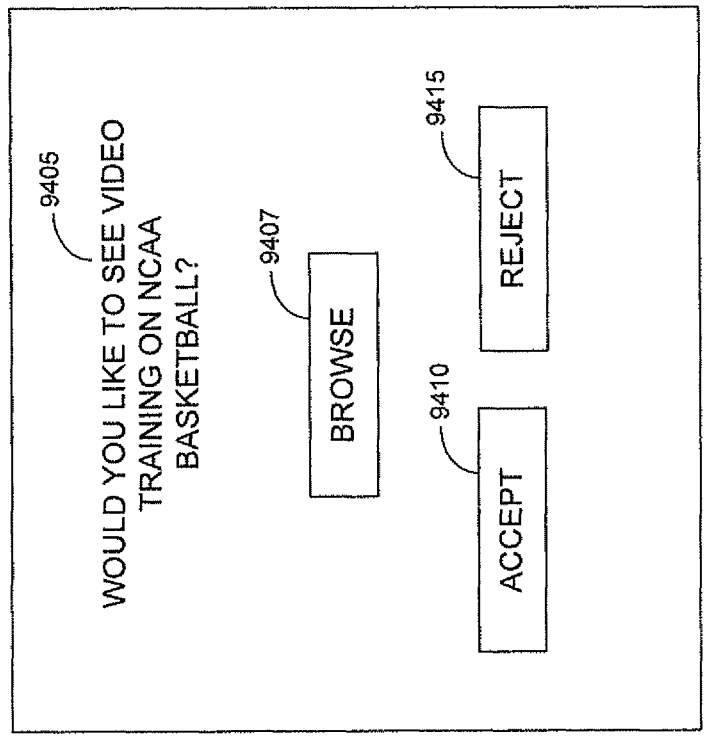
FIG. 20 is an example of a GUI for notifying a guide of a multimedia training file.

As illustrated in FIG. 20, the graphical user interface 9400 may allow a human guide who is considering video training to elect to receive training. In at least one embodiment, the graphical user interface 9400 (FIG. 20) includes a prompt 9405, an accept button 9410, and a reject button 9415. Should a human guide desire to receive video training, the guide would activate the accept button 9410. Alternatively, should a human guide not desire to receive video training, the guide would activate the reject button 9415.

Alternatively, if the system 1100 (FIG. 11) determines that a guide is idle, a browse menu 9407 may appear in the GUI 9400 (FIG. 20) which allows a guide to select a training video based on various criteria. For example, the menu might provide a "tree structure" of category(ies), subcategory(ies), and QKW(s) associated with the guide. The guide might select an item using the menu and view a training file based on the selection. The order and/or content of the menu may be determined based upon factors such as a rating(s), rank(s), permission(s), etc. which are associated with a guide.

If a guide accepts video training, or if the video training is not optional, as illustrated in FIG. 20, the system can present graphical user interface 9500 (FIG. 21) to a guide, which includes, for example, a file selection prompt 9503, and icons 9505, 9510, 9515, and 9520 representing video training and may show a thumbnail image of the video. In addition the GUI 9500 may contain rating field 9522 which may indicate a rating(s) of a video file. Rating(s) of a video file may be based on factor(s) such as usage, searcher rating(s), etc. Video files which have been previously viewed may be indicated in the GUI 9500, and/or may not be presented.

In at least one embodiment of the disclosure, the human guide desiring to receive video training activates at least one of the icons, thereby causing a video file to be executed and displayed on his or her computer screen. The human guide can then view the selected video file in an attempt to enhance his or her search skills and improve his or her performance ranking.

Figure 23:
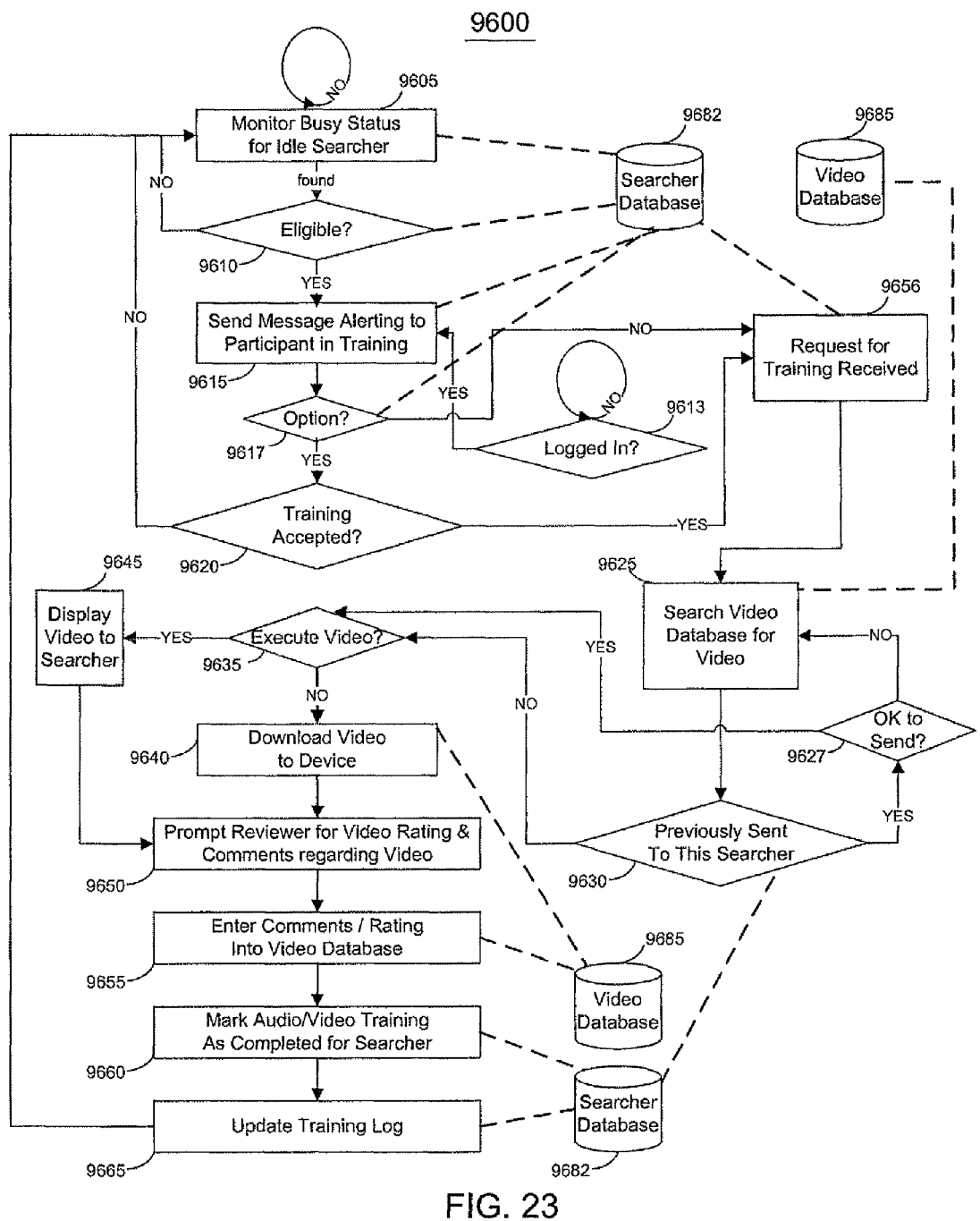
FIG. 23 is a flow diagram for managing targeted multimedia training of guides.

As illustrated in FIG. 23, in at least one embodiment of the present invention, method 9600 is provided. In the method shown in FIG. 23 and later in FIG. 27, searchers, task workers, guides are referred to as having attained a status of apprentice/pro/master. Although this set of states and hierarchy is used for illustrative purposes, other sets of states and rules for selecting searchers to receive and/or provide training of any type may be used within the scope of this disclosure.

In method 9600 of FIG. 23, busy status of searchers is monitored 9605 to determine if a searcher is idle. For example, in at least one embodiment of the present method or disclosure, a searcher database 9682 (FIG. 23) is consulted to determine if a searcher is available or idle or eligible to receive or provide training. As previously mentioned, one of the primary activities 2115 (FIG. 12) in the disclosed system may be to provide information seekers with search results. Secondary activities 2120 (FIG. 12), such as audio/video training of a searcher, interactive query training, search result(s) review, transcription, etc., may occur when a searcher is not fielding search queries to provide search results, that is, when a searcher is idle or not busy. If the busy status monitoring determination in operation 9605 (FIG. 23) does not result in locating an idle searcher, monitoring busy status for an idle searcher continues. If the determination in operation 9605 results in locating or finding an idle searcher, control is transferred to operation 9610 and method 9600 continues.

In operation 9610 a determination is made as to whether a searcher is eligible to participate in audio/video training. This may be based on any item associated with a searcher (e.g., rank, rating, etc.) of a searcher that is available for secondary activities. This may be done by consulting any or all of the contents of the searcher database 9682 (FIG. 23). If in operation 9610 it is determined that a searcher is eligible for participation in audio/video based training, control is transferred to operation 9615 and method 9600 continues.

If in operation 9610 it is determined that a searcher is not eligible for training, control is transferred to operation 9605 and method 9600 continues.

For example, in one embodiment of the system disclosed herein, a guide who has achieved pro rank for a keyword, subcategory, category, overall, etc. may be eligible to participate in audio/video training. Another guide, who has achieved the rank of master for the same item may not be eligible to receive audio/video training. This may be due for example, to high demand for interactive query training, which may be performed only by high ranking searchers. Other factors may be utilized to determine if a searcher is eligible to participate in audio video training as a secondary activity. These factors may be modified as described below in relation to FIG. 32.

A searcher(s) (e.g., an apprentice searcher, the lowest state in an apprentice/pro/master hierarchy) may only be able to participate in secondary activities 2120 (FIG. 12) (e.g., training, query and result review, polling, etc.). In this case, it may not be necessary to determine whether an idle searcher is eligible to participate in audio/video training. If a searcher is only allowed to participate in secondary activities, operation 9613 is provided in method 9600. In operation 9613, a determination regarding whether a searcher who is only permitted to perform secondary activities is logged-in to the system is performed. If the determination in operation 9613 is that a suitable searcher (i.e., a searcher who can only participate in audio/video training) is not logged-in to the system, determining whether a suitable searcher is logged-in to the system continues.

If in operation 9613 it is determined that a searcher only eligible for secondary activity is logged-in, control is transferred to operation 9615, and method 9600 continues.

In at least one embodiment of the system disclosed herein, business rules may be defined which determine the suitability of a searcher for determining eligibility for participation in primary activities. For example, a searcher at the apprentice level, or a searcher at the pro level who has a low performance rating may only be allowed to receive audio/video training in order to ensure a high level of service quality for information seekers.

In operation 9615 (FIG. 23), a message is transmitted to a searcher alerting the searcher to participate in audio/video training. In at least one embodiment of the disclosed method 9600, the message may be included in an electronic pop-up window or box. However, alternate notification means including e-mail, instant messaging, text messaging, or other means of communication and interfaces may be used within the scope of the system and method disclosed herein. Control is then transferred to operation 9617, and method 9600 continues.

In operation 9617 a determination is made if a searcher may elect to decline to participate in audio/video training. If operation 9617 determines that a searcher may not elect to decline to participate in audio/video training, control is transferred to operation 9656, and method 9600 continues.

If in operation 9617 it is determined that a searcher may elect to decline to participate in audio/video training, control is transferred to operation 9620, and method 9600 continues.

In operation 9620, a determination is made as to whether training is accepted by a searcher. If in operation 9620 it is determined that a searcher declines to accept audio/video training, control is transferred to operation 9605, and method 9600 continues.

In at least one embodiment of the disclosed method, when a searcher does not accept audio/video training, a flag may be set such that he or she may not be offered the option to reject video training when it is offered again.

If in operation 9620 it is determined that a searcher has accepted audio/video training, control is transferred to operation 9656, and method 9600 continues.

In operation 9656 a video training session is initiated. In this operation, a flag may be set to indicate a searcher is not available for activity, (as further discussed in relation to FIG. 33), the start time of a audio/video training session, a record of the number of times a video training session was previously declined, etc. may be recorded in searcher database 9682. Control is then transferred to operation 9625, and method 9600 continues.

In operation 9625 (FIG. 23), a search is conducted for video training that is suitable for presentation to a searcher that is associated with item(s) (e.g., keyword(s), category (ies), etc.) which are associated with a searcher. For example, a pro searcher assigned to the keyword "NCAA Basketball" may require video training relating to the keyword "NCAA Basketball" in order to improve his or her skills to attempt to advance to the master level. Therefore, a search would be conducted in the video database 9685 for such a video, (i.e., a video associated with the keyword "NCAA Basketball" and the "pro" and/or "apprentice" state). The search operation 9625 may select a video training file based on any criteria, which may include the level, rating, etc. associated with the searcher to be trained and/or a video training file. Control in process 9600 then passes to operation 9630.

In operation 9630, a determination is made regarding whether a video selected from the video database 9685 was previously transmitted to a searcher by consulting the searcher database 9682. If in operation 9630 it is determined that a video was previously transmitted to a searcher control is transferred to operation 9627, and method 9600 continues.

If in operation 9630 it is determined that a video was not previously presented to a searcher, control is transferred to operation 9635 and method 9600 continues.

In operation 9627, a determination is made whether to send a video previously sent to a searcher to the searcher. If in operation 9627 it is determined that a video previously sent to a searcher may be sent to a searcher, control is transferred to operation 9635, and method 9600 continues.

If in operation 9627, it is determined that a video previously sent to a searcher may not be sent to a searcher, control is transferred to operation 9625 and method 9600 continues.

The determination in operation 9627 may be based on various criteria. For example, if there are no other suitable video training files for a searcher, he or she may be allowed to view a previously viewed training file which may include an interactive skills assessment. A second viewing of such a file might provide an indicator of improved performance by a searcher. In other situations, the training file may be suitable for viewing only one time as its contents may be brief and not relevant once viewed previously. Other options for determining whether to send a training file which has been sent and/or viewed previously to a searcher will readily occur to one of ordinary skill in the related art, and the method described herein is not limited to any particular criteria.

In operation 9635, a determination is made as to whether a video is to be executed from a server. If it is determined that a video is to be executed from the server, control is transferred to operation 9645, and method 9600 continues.

If in operation 9635 it is determined that a video is not to be executed from a server, control is transferred to operation 9640 (FIG. 23) and method 9600 continues.

The determination in operation 9635 as to whether the video is to be executed online or "podcasted" to the searcher, may be made depending on the desires of the searcher being trained, or any other factor(s), such as rights management of the training file, available transfer methods, etc.

In operation 9640, the video is downloaded (or "podcasted") to a video playback device. Control is transferred to operation 9650 and method 9600 continues.

In operation 9645, the video is streamed or played to a searcher from a server (e.g., the video database server). Control is transferred to operation 9650 and method 9600 continues.

In operation 9650, a searcher receiving video training is prompted to rate the video and/or provide comments regarding the training. In at least one embodiment, a numerical rating or letter grade such as "A", "B", "C", "D" or "F" is assigned to the video. Alternatively, ratings such as "poor" or "good" can be assigned to a video. In addition to a rating, in at least one embodiment of the disclosed method, a searcher may also be requested to provide feedback regarding the "helpfulness" of the video training received. In addition, the searcher may be advised as to what skills a video was designed to improve. In other embodiments, an item(s) such as result(s) of a skills test(s), amount of time spent viewing a video by a searcher(s), result(s) from a human-assisted training session, etc. may be used to determine a rating(s) of a video training. Control is then transferred to operation 9655, and method 9600 continues.

In operation 9655, a searcher's comments and/or rating(s), and other data regarding the effectiveness of a video are recorded in the video database 9685. The rating(s) of the video training file from a search training session may be used to select a video for training, and to provide feedback to system administrators and/or producers of the training video file. Further, the compensation of a producer of a video training file(s), and/or searcher(s) viewing a video file may be determined based on searcher rating(s), usage of the video file for training, changes in skill level(s) of a searcher(s) who have viewed a training video, time interval(s) spent viewing a training video(s), advertisement(s) viewed by a searcher(s) before, during or after a training video, etc. Control is then transferred to operation 9660, and method 9600 continues.

In operation 9660, audio/video training is marked as completed for a particular video for the searcher trained to allow the system to determine if a video(s) has been presented to a searcher. In addition, other data associated with a searcher may be recorded in the searcher database, such as rank, rating, etc. which may have been modified due to audio/video training. This marking operation 9660 (FIG. 23), in one embodiment of the disclosed method is achieved by recording appropriate data in a field of the searcher database 9862 related to the searcher receiving training. Control is then transferred to operation 9665 and method 9600 continues.

In operation 9665, the searcher's training log (stored in searcher database 9682, as will be described herein below) maybe updated. A busy/idle flag may be set to idle to indicate that a searcher has completed audio/video training, a time stamp indicating the time of completion of the training session may be recorded, and other data of the searcher may be updated in the searcher database. Control is then transferred to operation 9605, and method 9600 continues.

While method 9600 has been described in terms of a video training, any other type of training material which might improve a skill of a guide may be provided. Training materials might include images, audio information, text, a url(s), an interactive media presentation, a set of edge condition(s) and/or test(s) to quantify skills acquired, or any combination of such materials. For example, a MySpace® page (or link thereto), a blog, a YouTube®, a quiz about a famous historical figure(s), a computer system(s), software program(s), or any resource(s) which may be indicated by an uploader (as described herein with respect to FIG. 19) may be training material. In addition, a training material may be associated with a UID of an uploader in order that a person utilizing a training resource may contact the uploader anonymously, with a limited degree of anonymity, or without anonymity.

Figure 24:
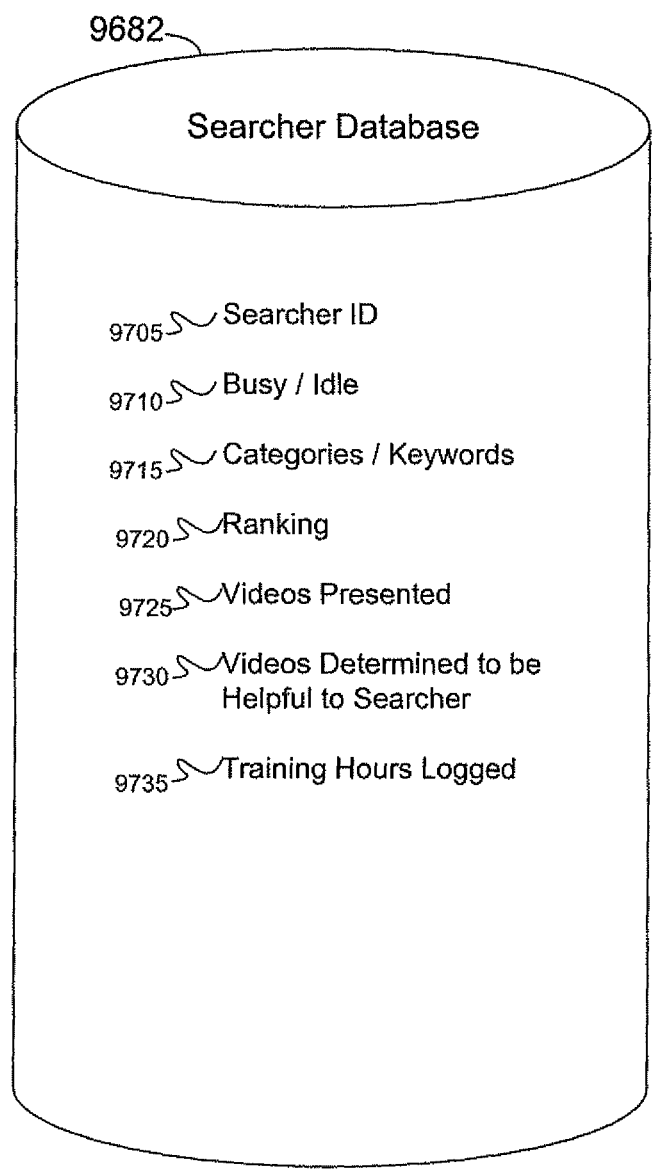
FIG. 24 is an illustration of a searcher database.

As illustrated in FIG. 24, searcher database 9682 may include fields relating to a searcher being trained. After being presented with the disclosure herein, one of ordinary skill in the relevant art will realize that other fields may be included within the searcher database 9682. It should also be noted that the searcher database 9682 may be any type of viable database for assisting with implementation of the present invention, for example a relational database.

The searcher identification (ID) field 9705 in searcher database 9682 may include a searcher identifier field for identifying a status of a searcher being trained, for example, an apprentice, a pro, or a master. Alternatively, the searchers status may be stored in a separate field in the searcher database 9682 or may be included as a portion of the ranking field 9720 as described below. The searcher identification field 9705 may also include the web address of a searcher, the searcher's name, telephone number, etc., allowing the creator of a video file, for example, to contact the searcher to provide direct feedback. The searcher identification field 9705 (FIG. 24) may include a random number produced by a random number generator. Information in the searcher database 9682 and/or the video database may further be used to provide anonymous communication between a searcher and a provider of video training files. The anonymous communication method is further described in related application titled ANONYMOUS SEARCH SYSTEM USING HUMAN SEARCHERS, inventor Scott A. Jones, et al. Ser. No. 11/779, 502, which is included herein by reference in its entirety.

The busy/idle field 9710 may include a status indicating whether the corresponding searcher is busy participating in a primary activity 2115 (FIG. 12), that is, fielding information search queries from information seekers. For example, in at least one embodiment, the busy/idle field 9710 is a flag field including a value of "true" to indicate that the searcher is idle or a value of "false" to indicate that the searcher is not idle. The busy/idle field 9710 may assist in allowing the system to determine searchers who are eligible or available for video or audio training in at least one embodiment.

The categories/keywords field 9715 may include names of keywords, categories, etc. to which the searcher is assigned. For example, the field may include the value "NCAA Basketball" to indicate that a particular searcher is assigned to the keyword "NCAA Basketball" in at least one embodiment of the disclosed system and method.

The ranking field 9720 may include an indication of the rank of a particular searcher. In at least one embodiment of the disclosed system and method, the searcher's rank can be is utilized in determining a suitable video to be presented to the searcher for training purposes. For example, the ranking field 9720 may include a number indicating the ranking value of the searcher to which the field corresponds. For instance, an apprentice searcher who is ranked as the best apprentice searcher in the system may be specified by including a value of "T1" in the searcher's ranking field 9720. The value would indicate that the searcher is the number one (1) ranked apprentice searcher (T) in the disclosed system and method. Similarly, a master searcher who is ranked as the third best master searcher may be specified by including a value of "V3" in the searcher's ranking field 9720. The value would indicate that the searcher is the number three (3) ranked master searcher (V) in the disclosed system and method. After being presented with the disclosure herein, one of ordinary skill in the relevant art will realize that other ranking specifications may be utilized without departing from the scope and spirit of the present invention.

For example, a global ranking/rating system as described further herein may be employed by the disclosed system and method. In such a scheme, the ranking field 9720 (FIG. 24) may include a numerical value indicating the overall ranking of the particular searcher to which the field corresponds. For example, a value of "155" would indicate that a pro searcher is the 155$^{th}$ best searcher out of all of the searchers, including masters, pros, and apprentice searchers in the disclosed system and method.

The videos presented field 9725 may include a list of the video and/or audio files, for example, previously presented for a particular searcher. The videos presented field 9725 may assist in determining whether a particular training video was previously presented to a searcher to prevent a particular searcher from receiving the same training video more than once.

In at least one embodiment of the disclosed system and method, the searcher database 9682 includes a videos determined to be helpful to searcher field 9730. The field 9730 may assist the system in determining a type of video that a searcher would consider helpful. For example, if the searcher happened to prefer videos that provided much detail, such a preference may be stored in the field, which could assist the system with providing a searcher with a video that the searcher would most likely consider helpful to him or her.

Alternately, the videos determined to be helpful field 9730 could be a list of videos a searcher rated "good". The system could then extract indirect information such as length of a video, author, resources or other parameters as noted below which are common to the videos in the list in order to select similar training videos for that searcher for future training sessions.

The training hours logged field 9735 may include a total number of minutes and/or hours of video training in which a searcher has participated. The field 9735 can assist with determining whether a searcher should be promoted. For example, if a searcher has logged many hours of video training, the factor may be positively taken into consideration when determining whether a searcher should be promoted.

Figure 25:
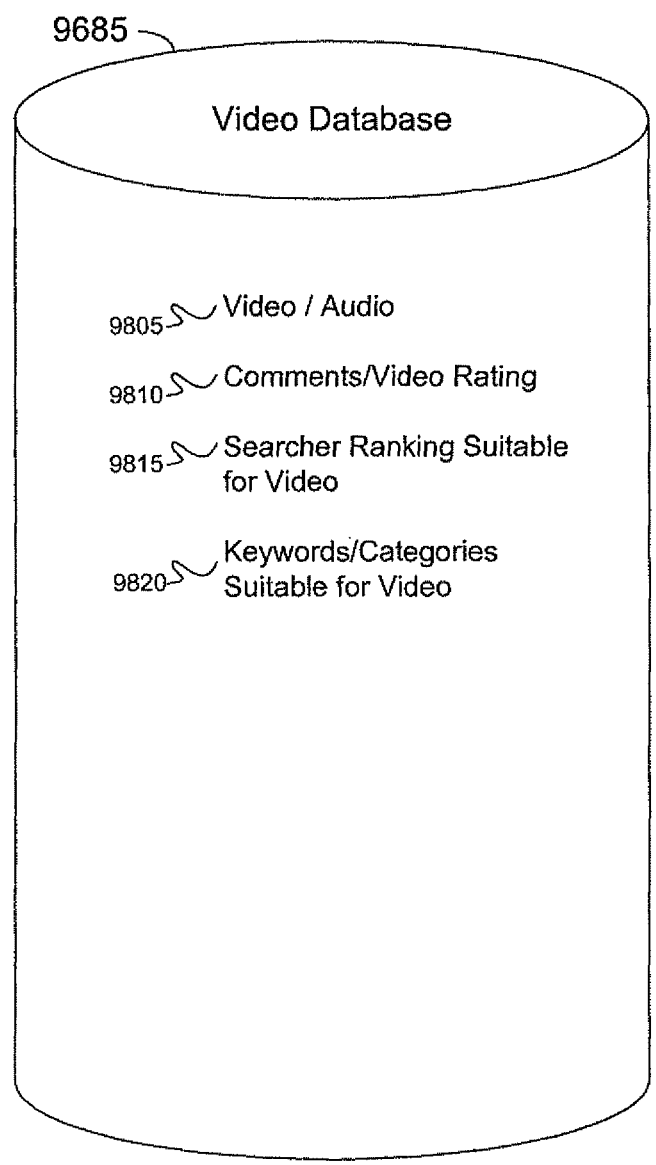
FIG. 25 is an illustration of a video database.

As illustrated in FIG. 25, video database 9685 may include a video or audio file 9805. The video or audio file 9805 may include an electronic file previously provided by experienced searchers, by system administrators, or by a video producer for example. After being presented with the disclosure herein, one of ordinary skill in the relevant art will realize that other types of files or resources may be provided without departing from the spirit and scope of the present invention. For example, in at least one embodiment of the disclosed system and method, text, video, audio, and/or image, etc. files and/or information providing access to a file(s) (e.g., URL, password, etc.) may be stored in the database 9685.

The comments/video rating field 9810 (FIG. 25) may include comments from searchers regarding training videos (for example, whether a searcher considered a video helpful). In addition, in at least one embodiment of the disclosed system and method, a rating or grade can be provided for the video to indicate the level of satisfaction searchers experienced relating to the training provided by the video.

The searcher ranking suitable for video field 9815 includes ranking categories or skill categories of searchers for which a video would be most likely helpful. For example, if a video provides training on particularly complex search issues, the video would typically not be well-suited for a novice searcher such as an apprentice, for example. Similarly, if a video provides training on a particularly easy search issue and a searcher is ranked as the best searcher in the system, the video would typically not be well-suited for such an expert searcher.

The keywords/categories suitable for video field 9820 may include keywords and categories for which a video is suitable. For example, a particular video showing how to search a website provided by the "NCM", may include the keyword "NCAA Basketball" in the keywords/categories suitable for video field 9820. The keyword(s), category(ies), tag(s), etc. associated with a video or other resource may be determined by various factors as previously described herein.

After being presented with the disclosure herein, one of ordinary skill in the relevant art will realize that other fields can be provided in the databases without departing from the spirit and scope of the present invention.

Figure 26:
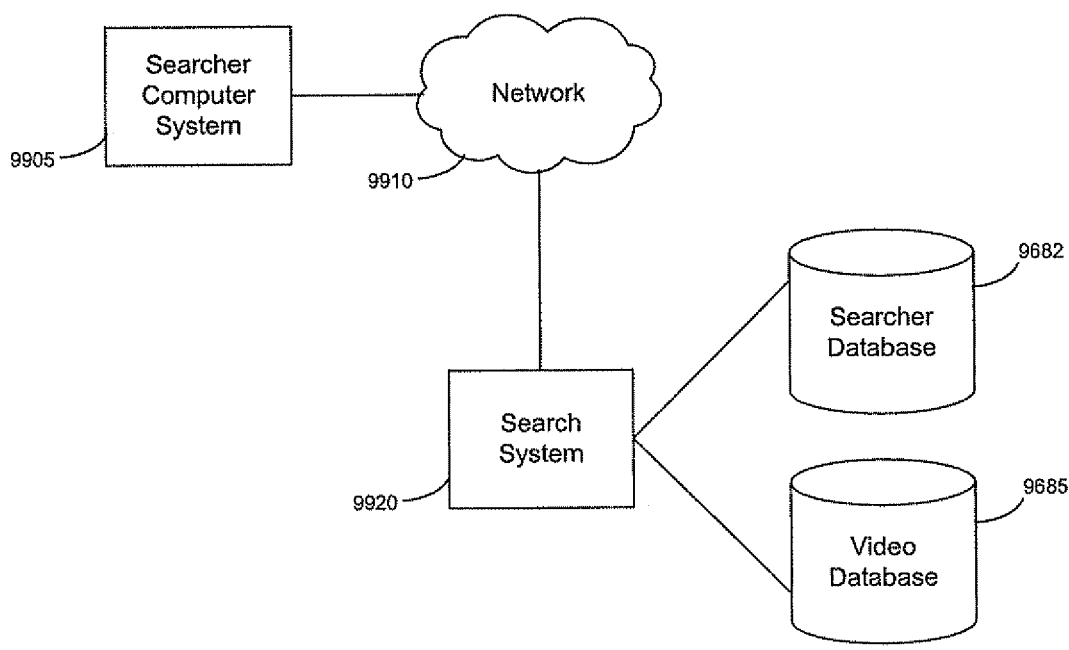
FIG. 26 is a system diagram for targeted multimedia search training.

As illustrated in FIG. 26, in at least one embodiment of the present invention, the system 9900 is provided. The system 9900 may include searcher computer system 9905, a network 9910 such as the Internet, a search system 9920, and databases such as searcher database 9682 and video database 9685.

The searcher computer system 9905 can be operated by an apprentice searcher, for example, to receive video training. In particular, an apprentice searcher may employ the searcher computer system 9905 to download video files or audio files, for example, from the search system 9920 via the network 9910.

The search system 9920 is provided by the provider of the disclosed system and method and serves as the "brain" of the system 9900. For example, the search system 9920 may control database queries from the searcher database 9682 and the video database 9685, which may include data for executing the disclosed system and method in accordance with the description provided herein above.

Figure 27:
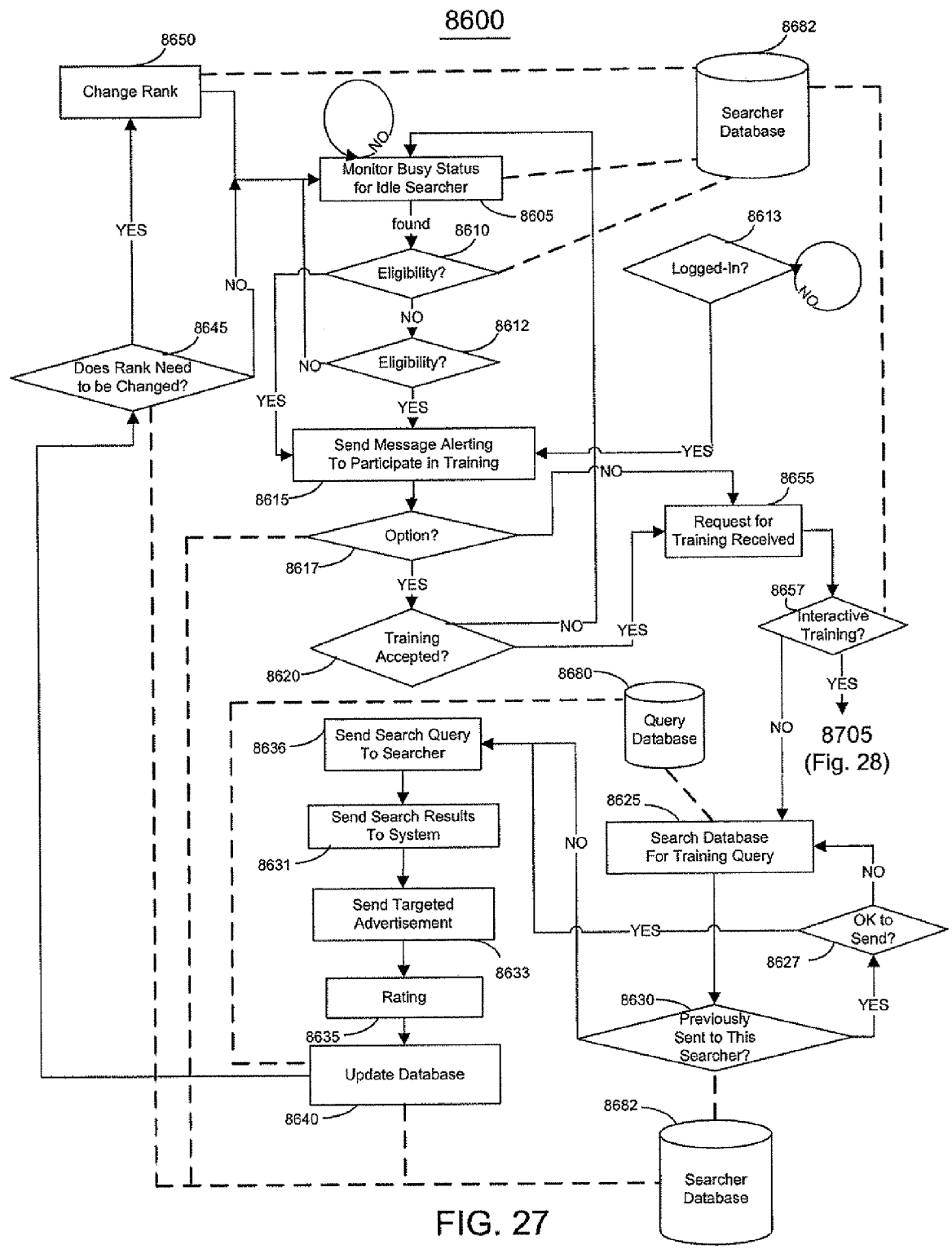
FIG. 27 is a flow diagram for managing targeted human-assisted training of guides.

As illustrated in FIG. 27, in at least one embodiment of the disclosed system and method, method 8600 is provided.

In operation 8605 of method 8600, busy status of searchers is monitored to determine a searcher that is idle. For example, in at least one embodiment of the disclosed method, a searcher database 8682 (FIG. 29) is consulted to determine an idle searcher. As previously stated, one of the priorities is to provide information seekers with search results. Secondary activities 2120 (FIG. 12) and/or training of a searcher may occur when a searcher is not fielding search queries from information seekers to provide search results, that is, when the searcher is idle or not busy. If the determination in operation 8605 (FIG. 27) does not result in locating or finding an idle searcher, monitoring busy status for an idle searcher continues. If the determination in operation 8605 results in locating an idle searcher, control in the method 8600 is transferred to operation 8610.

In operation 8610, a determination is made as to whether a searcher is eligible to receive human-assisted search training. This determination is performed by referring to the searcher database 8682. If an idle searcher is not eligible to receive human-assisted search training, control passes to operation 8612 and method 8600 continues.

If in operation 8610 it is determined that a searcher is eligible to receive human-assisted search training, control is transferred to operation 8615 and method 8600 continues.

In operation 8612 a determination whether a searcher is eligible to provide human-assisted search training is performed. If it is determined in operation 8612 that a searcher is not eligible to provide human-assisted search training, control is transferred to operation 8605 and method 8600 continues.

If in operation 8612 it is determined that a searcher is eligible to provide human-assisted search training, control is transferred to operation 8615 and method 8600 continues.

In at least one embodiment, the determination in operation 8610 is based on the rank and/or rating of a searcher. For example, if a searcher has attained a rank of master, but a rating below an average of 3.2 for the last 5 search sessions he or she has preformed with an information seeker, it may be determined that he or she needs to receive further training from another master guide. While a specific example is provided, any set of rules based on any or all data stored in the searcher database, may be used to determine if a searcher is eligible to receive query based human-assisted training.

The determination in operation 8612 (FIG. 27) of eligibility of a searcher to provide human-assisted training may be based on any factors which have been determined to be relevant by the system administrators. As previously discussed, searcher rank and/or rating may be used to determine eligibility of a searcher to provide human-assisted search training. In at least one embodiment, the selection of a searcher to provide human-assisted training may be based on rank(s) and/or rating(s) which are based on searcher rating(s) from previous human-assisted search training sessions. Rank(s) and/or rating(s) related to providing human-assisted training may be different than the rank(s) and/or rating(s) for providing search result(s) to information seekers. Any or all rank(s) and rating(s) may be utilized to select guides to receive training, or guides to provide training.

For example, a searcher (e.g., searcher Bill) may have a rank of master and a rating of 4.8 for his or her ability to provide search result(s) to users/information seekers. He or she might have a rank of apprentice and a rating of 2.5 for his or her ability to provide human-assisted training to searchers. A different searcher (e.g., searcher Sally) might have a rank of master and a rating of 2.5 for his or her ability to provide search result(s) to users/information seekers. He or she might have a rank of master and a rating of 4.8 for his or her ability to provide human-assisted training to searchers. In this example, the searcher with a higher human-assisted training rank and/or rating (i.e., the searcher Sally) could be selected to provide human-assisted training before the searcher with a higher rank and/or rating for providing search results to information seekers. Thus a searcher selected to provide human-assisted search training may be selected based upon skills associated with training activities, with search activities, or with any combination of the parameters.

After being presented with the disclosure herein, one of ordinary skill in the relevant art will realize that other formulas and methods may be implemented to select searcher(s) for providing and receiving human-assisted training based on information in the databases described herein without departing from the spirit and scope of the present invention.

As previously discussed some searchers registered in a search system such as system 1100 (FIG. 11) may not be eligible to participate in primary activities. As a result, it is not necessary to determine if a searcher such as this (for example, an apprentice searcher) is busy or idle. In this case, operation 8613 of method 8600 is provided. In operation 8613, a determination is made whether a worker who is not eligible to participate in primary activities is logged into the system 1100 (FIG. 1). If it is determined that such a worker is not logged-in operation 8613 (FIG. 27) continues.

If it is determined that a searcher who is only eligible to participate in secondary activities is logged-in to the system, control is transferred to operation 8615 and method 8600 continues.

In operation 8615, a message alerting a searcher who has been determined to be eligible to participate in human-assisted search training is sent. This may include both a searcher(s) eligible to receive human-assisted search training and/or a searcher(s) eligible to provide interactive human-assisted search training.

In operation 8617, a determination is made as to whether a searcher may be offered the option to decline an interactive human-assisted training session. If it is determined that a searcher may be offered this option, control is transferred to operation 8620, and method 8600 continues.

If in operation 8617 it is determined that a searcher may not be offered the option to decline an interactive human-assisted training session, control is transferred to operation 8655 and method 8600 continues.

The determination in operation 8617 of whether a searcher may decline a training session may be based on data from the searcher database 8682. For example, if a searcher has declined to participate in a training session previously, if a long time interval has passed since his or her last training, or if a searcher's rating(s) have declined and his or her rank may need to be modified, a searcher may not be eligible to decline a search training session. In at least one embodiment, no searcher is provided the option to decline a training session. In another embodiment, a master guide selected to provide training may not be provided the option to decline a training session when a large number of low ranking guides are eligible and available for a training session.

In operation 8620, a determination is made as to whether a training session is accepted by a searcher. If it is determined that a searcher does not accept a training session, control is transferred to operation 8605 and method 8600 continues.

If in operation 8620 it is determined that a searcher does accept a training session, control is transferred to operation 8655, and method 8600 continues.

In operation 8655 a request for a search query based training session is received. As described below, search query based training may be provided in an interactive and in a non-interactive session. A guide receiving training will be unavailable for primary activities. In operation 8655 (FIG. 27) a busy flag may be recorded in the searcher database 8682 to indicate that a searcher receiving training is unavailable for other activities.

In operation 8657, a determination is made if a session will be an interactive query training. If in operation 8657 it is determined that a session is not an interactive query session control is transferred to operation 8625 and method 8600 continues.

Figure 28:
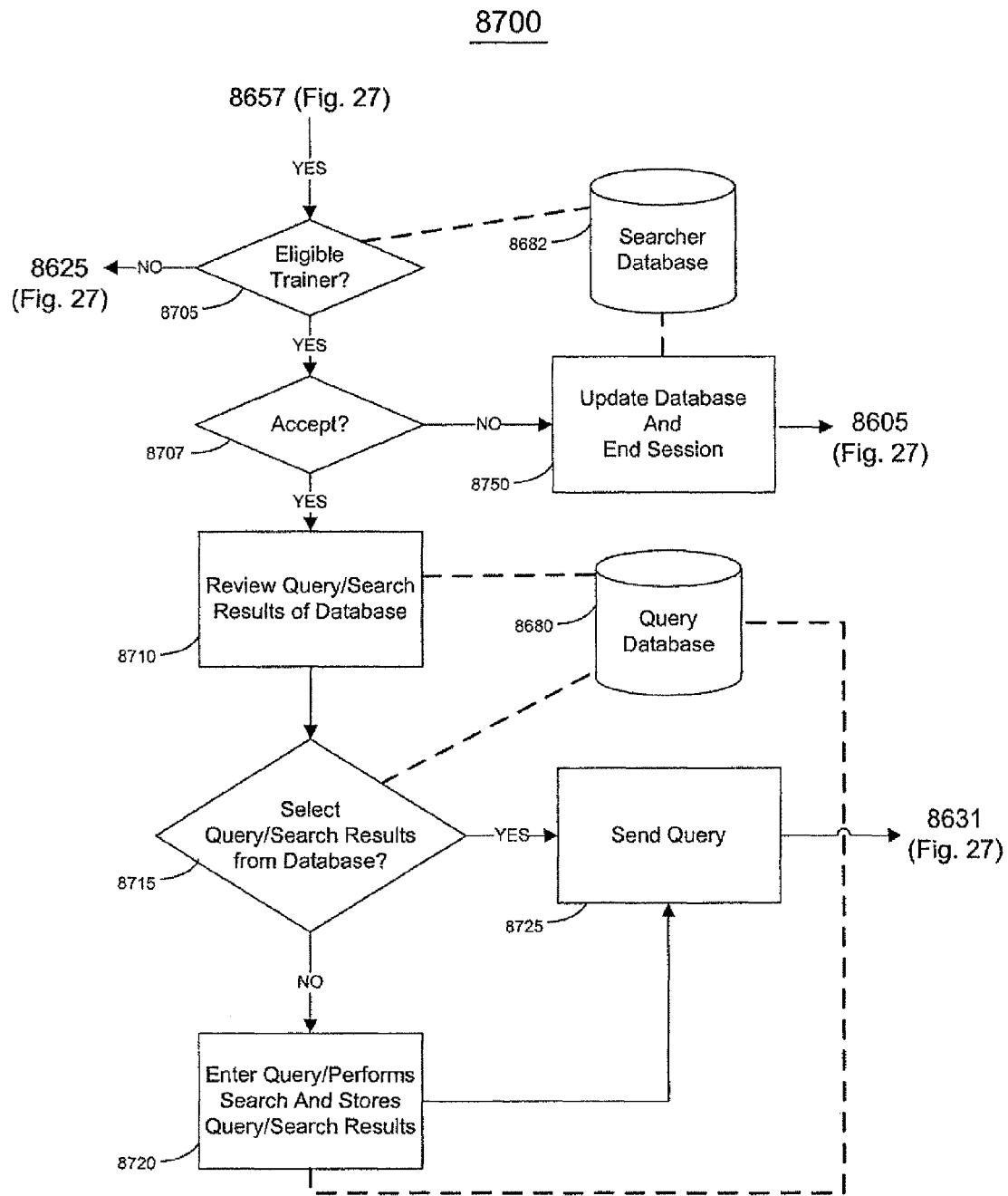
FIG. 28 is a flow diagram of selection of a training exercise (query) for a guide being trained.

If in operation 8657 it is determined that a session is an interactive search session control is transferred to operation 8705 of method 8700 illustrated in FIG. 28.

In operation 8625 the query database 8680 is searched for a training query to be presented to a searcher receiving query-based training. The search operation 8625 may select a training query based on various criteria, which may include searcher rank, searcher rating, keyword(s), category(ies), tags, etc. associated with a searcher and/or a query. A selected search query(ies) is retrieved from the query database 8680.

For example, in at least one embodiment of the present invention, if the searcher has a low ranking, a relatively easy search query requiring a relatively low level of search skill would be retrieved from the query database 8680 for a low ranking searcher. If the low ranking searcher is presented with a search query requiring a relatively high level of search skill, the searcher may become discouraged. In addition, the query database 8680 is searched for a query related to or suitable for being presented to a searcher assigned to the keywords and or categories to which the searcher is assigned.

To illustrate further, if a searcher being trained has the rank "apprentice" and an average rating of 3.0, and is associated with the category "Music>History", a query selected from the search query database 8680 might be "who was the drummer for the Beatles?" as this query has been associated with the category "music" and the subcategory "history". This query may be associated with the rank "apprentice", based on, for example, the rank of a searcher who handled the query, frequency of use of the query, voting by a group of guides and/or users, or other factors.

Figure 29:
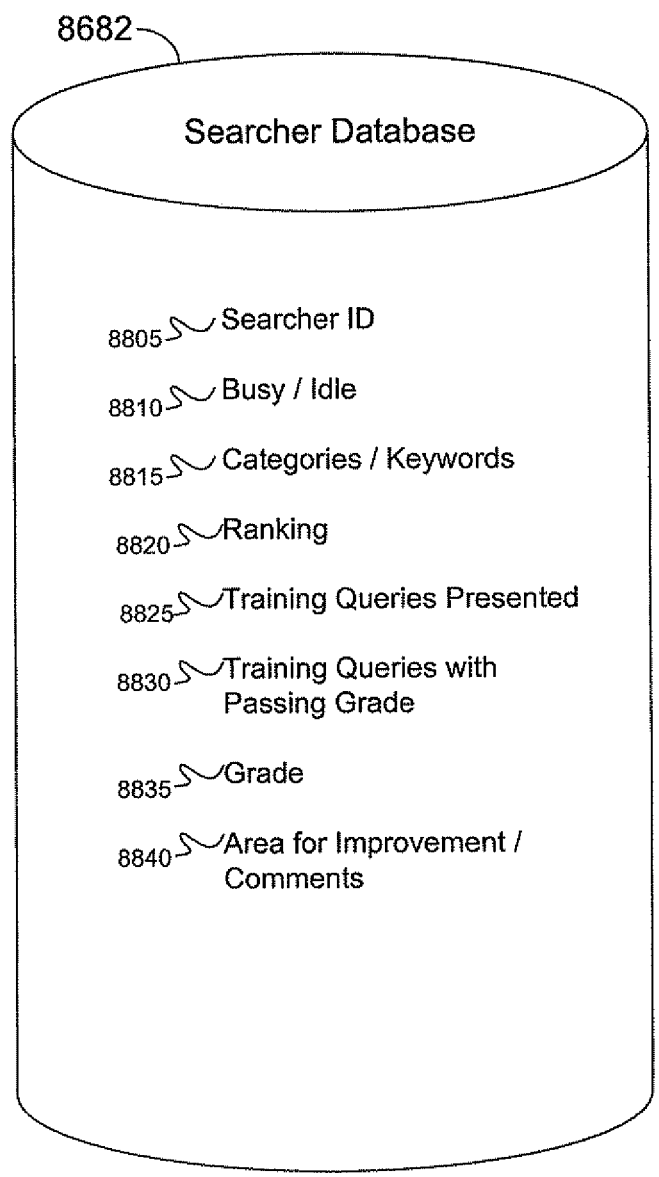
FIG. 29 is an illustration of a searcher database.

In operation 8630, a determination is made regarding whether a search query was previously transmitted to the searcher by consulting the searcher database 8682 (FIG. 29). If in operation 8630 it is determined that a query has been previously sent to a searcher, control is transferred to operation 8627 and process 8600 continues.

If in operation 8630 (FIG. 27) it is determined that a query was not previously sent to a searcher, control is transferred to operation 8636 and method 8600 continues.

In operation 8627, a determination is made as to whether it is OK to send a query previously sent to a searcher to a searcher. If in operation 8627 it is determined that it is not OK to send a query that was previously sent to a searcher, control is transferred to operation 8625 and method 8600 continues. If in operation 8627 it is determined that it is OK to send a query that was previously sent to a searcher to a searcher, control is transferred to operation 8636 and method 8600 continues.

In operation 8636 a search query is sent to a searcher receiving human-assisted query-based training. Query-based training may be interactive or non-interactive, as previously noted.

In operation 8631, a search result(s) produced by a searcher receiving training is received by the system 1100 (FIG. 11). Control is transferred to operation 8633 and method 8600 continues. In operation 8633 a targeted advertisement may be selected by a searcher receiving training and received by the system 1100 (FIG. 11).

In operation 8635 a rating is created for a searcher receiving training. Various methods may be employed to create a rating for a searcher being trained. For example, a search result produced by a searcher receiving training may be compared to a search result(s) previously produced for a query. In at least one embodiment of the disclosed method, for example, the comparison includes analyzing a search result(s) produced by a searcher being trained and a previous search result(s) and comparing a time interval required to produce a result(s). If the same result(s) were produced by a searcher being trained as a previous search result(s) and the time interval required by a previous searcher to produce a result(s) was less than that required by a searcher receiving training, a determination may be made that a searcher receiving training should not have a rating equal to the rating of a searcher who produced a previous search result(s). As an alternate example, a result(s) produced by a searcher receiving training may be rated by a searcher(s) during and/or subsequent to completion of a training session. If a result produced by a searcher receiving training is rated higher than a previous search result(s), a searcher receiving training may be rated (or ranked) higher than a searcher(s) who produced a previous search result(s). In at least one embodiment, a search result(s) produced by a searcher(s) receiving training may be compared with those produced by a searcher(s) with the same or lower rank than a searcher receiving training.

For example, in at least one embodiment of the disclosed method, the comparison may include analyzing the two sets of search results (a previously provided search result(s) and a search result(s) produced by a searcher being trained) and comparing the number of resources and/or thoroughness of resources included in the search results. A result(s) obtained from one or more authoritative resource(s) may be rated higher than a result(s) obtained from other resource(s).

After being presented with the disclosure herein, one of ordinary skill in the relevant art will realize that other factors may be utilized in the rating of a search result(s) without departing from the spirit and scope of the present disclosure.

If the query based training is an interactive training session, a guide providing training may be able to view a search result(s) sent to the system 1100 (FIG. 11) by a guide receiving training. A search result(s) may be presented in a GUI such as GUI 8502 (FIG. 17). A guide providing training may interact with a guide receiving training using the chat interface 8505. In this way, a searcher providing training may interactively assist a searcher receiving training regarding methods for locating the best search result(s) and resource(s) which may be useful for the topic being searched, and otherwise assist a searcher receiving training to improve his/her capability.

In at least one embodiment of the disclosed method in operation 8633 (FIG. 27), a searcher receiving training may send advertisement(s) to the system and/or a searcher providing training, for example, to emulate a searcher sending advertisements to an information seeker during primary activities, as described elsewhere herein. Advertisement(s) may be sent after a searcher receives a training query. An advertisement(s) may be intended for presentation to an information seeker while a search is proceeding, and/or when a searcher responds to a query(ies) with a search result(s). Regardless of when an advertisement(s) may be sent, a searcher being trained can be presented with, and can select from, a pool of advertisements that were previously transmitted to information seekers for example, by a more experienced searcher(s).

After a searcher being trained selects an advertisement(s), the advertisement(s) selected may be compared with a "correct" advertisement(s), that is, an advertisement(s) that was previously sent to an information seeker by a more experienced searcher.

For example, if the query is "who won the National Basketball Association (NBA) championship game in 2005", an apprentice level searcher may be able to select from advertisements including advertisements associated with the keywords "tickets for sale for NBA games", "NBA championship team memorabilia", and "NBA clothing". A master level guide who previously provided an advertisement to an information seeker may have selected "NBA championship team memorabilia" to send to an information seeker in response to the query. In at least one embodiment of the disclosed method, a comparison is made between the advertisement selection of a guide being trained and an advertisement(s) that was previously sent in response to the query, (e.g., the advertisement that was previously selected by a master level guide). This comparison may be used to determine whether the guide being trained has selected a suitable advertisement(s) associated with the query.

In continuing with the example above, if a guide being trained selects the advertisement(s) including "tickets for sale for NBA games", the system may rate the advertisement selected by the guide being trained as less relevant than the advertisement selection previously made by a master. In such an instance, in at least one embodiment of the disclosed method, as a part of the training, the system may prompt the guide being trained to select another advertisement or an additional advertisement in an attempt to select a more relevant advertisement. In at least one embodiment of the disclosed method, the system may allow the guide providing training to send a second selected advertisement and rate the guide being trained based on his or her selection(s) of advertisement(s). Criteria for rating the performance of a guide being trained may include relevance of advertising selected, time interval required to select an advertisement, etc.

As with the search result(s)), if the query training session is an interactive training session, an advertisement(s) sent by the searcher being trained may be presented in a GUI such as GUI 8502 (FIG. 17). A searcher providing training may interact with a guide receiving training using the chat interface 8505. A guide providing training may be able to advise and improve the ability of a guide being trained to select advertisement(s) which are relevant to the search query and/or search result(s).

In operation 8635 (FIG. 27), a grade or rating for a training session may be assigned to a searcher being trained. In at least one embodiment, a letter grade such as "A", "B", "C", "D", or "F" is assigned to a searcher receiving training. Alternatively, grades such as "novice performance" or "expert searcher" may be assigned to a searcher's performance. In addition to a grade, in at least one embodiment of the disclosed method, a searcher is also provided with feedback regarding a searcher's performance during a training session. For example, a searcher may be advised as to why he or she received a grade that he or she received and/or how a searcher could have improved his or her performance.

If a query based training session is an interactive session, a guide providing training may provide a rating of any or all aspects of the performance of a guide receiving training. This may be performed using the GUI 8402 (FIG. 16), or other interfaces which may include a more detailed evaluation checklist of skills. A guide receiving training in an interactive query session may also be able to rate the performance of a searcher providing training. An interface such as GUI 8502 (FIG. 17) may be used, or a more complex interface to allow a guide receiving training to comment on various skills of a guide providing training may be provided.

In operation 8640 (FIG. 27), the training query is marked in the searcher database 8682 (FIG. 29) as completed for a searcher being trained and/or a searcher providing training. For example, in at least one embodiment of the disclosed method, an entry is recorded in the searcher database 8682 to indicate that a searcher completed the training query. Operation 8640 (FIG. 27) may include recording rating(s), search result(s), advertisement(s), chat session history, and other information regarding a searcher receiving training and/or a searcher providing training in the searcher database 8682 and/or the query database 8680. Control is then transferred to operation 8645 and method 8600 continues.

In operation 8645, a determination is made as to whether a rank of a searcher needs to be modified based on information from a query based search training session. If it is determined that a change in rank is required, control is transferred to operation 8650 and method 8600 continues.

If in operation 8645 it is determined that no change in rank is required, a busy/idle indicator in searcher database 8682 is set to idle for a searcher(s) in a training session to indicate that the searcher(s) are available for primary or secondary activities, control is transferred to operation 8605 and method 8600 continues.

In operation 8650, change in rank is performed as described in relation to FIGS. 14A-14C. The searcher database 8682 is updated with a new rank(s) for searcher(s) participating in a query training session. A busy/idle indicator in searcher database 8682 is set to idle for a searcher(s) in the query training session to indicate that the searcher(s) are available for primary or secondary activities, control is transferred to operation 8605 and method 8600 continues.

In an embodiment illustrated in FIG. 28, method 8700 is provided. The alternate embodiment provides query based training which includes interactive training utilizing a selected searcher to provide training.

If in operation 8657 of method 8600 (FIG. 27) a determination is made that a session is an interactive training, method 8700 of FIG. 28 is provided. In operation 8705 (FIG. 28) a determination is made as to whether a searcher eligible to provide training is available, as previously described with respect to operation 8612 of method 8600. If it is determined that a searcher eligible to provide training is not available, control is transferred to operation 8625 of method 8600 illustrated in FIG. 27.

In operation 8705 (FIG. 28) if it is determined that a searcher eligible to provide training is available, the searcher database 8682 is updated to reflect that a searcher providing training is not available for activities, and other data, such as the time at which the session has been initiated, the identification of a searcher being trained, etc. is recorded in the searcher database 8682.

A guide providing training may review keywords and/or categories of a searcher selected to receive training. For example, a searcher being trained may be assigned to the keyword "NCAA Basketball", and "amateur basket weaving". In such an instance, a guide providing training may determine that a searcher being trained is assigned to the keyword "NCAA Basketball". In at least one embodiment of the disclosed method, a guide providing training may determine the category(ies) and/or keyword(s) on which a searcher receiving training will be trained. For example, although a searcher to be trained, (e.g., an apprentice), may be assigned to the keywords "NCAA Basketball" and "amateur basket weaving", a guide providing training may determine that he or she will provide training on the keyword "NCAA Hockey".

In operation 8707, a guide being trained is provided an option to decline training on the keyword, category, etc. selected by a guide providing training. If a guide being trained declines to be trained on a keyword, category, etc. selected by a guide providing training, control is transferred to operation 8750 and process 8700 continues.

In operation 8750 a training session is terminated, a searcher database 8682 is updated to reflect that a searcher providing training and a searcher receiving training are available for activities and control is transferred to operation 8605 of method 8600 illustrated in FIG. 27.

If in operation 8707 a guide being trained does not decline to be trained on the keyword, category, or item selected by a guide providing training, control is transferred to operation 8710 and process 8700 continues.

In an alternate embodiment, a searcher receiving training may be given an option as to the keyword or category, etc. on which he or she will receive training. Accordingly, a guide providing training is may be offered the option to decline to provide training in operation 8707 of method 8700, and control is transferred based on the selection of a guide providing training.

In operation 8710 (FIG. 28), a guide providing training may review queries and/or search result(s) from the query database 8680 to locate a query (ies) and/or a search result(s) that correspond to a keyword(s) and/or category (ies) to which a searcher being training is assigned and/or for which training will be conducted. For example, in at least one embodiment of the disclosed method, if a searcher being trained is assigned to the keyword "NCA Basketball" a searcher providing training searches the query database 8680 to locate a search query(ies) suitable for training a searcher assigned to the keyword "NCAA Basketball".

In operation 8715 (FIG. 28), a guide providing training is presented with an option regarding whether he or she would like to select a query and/or search result(s) from the query database 8680. A guide providing training can select a particular search result(s), for example, one he or she deems to be most correct to use in grading or rating performance of a guide receiving training, or one that will be the most useful training exercise for a searcher being trained.

If a guide providing training elects to select a search query and/or search result from the query database 8680, control passes to operation 8725, and he or she sends a selected search query to a searcher being trained. Method 8700 then continues and control passes to operation 8631 of method 8600 (FIG. 27)

After reviewing queries and/or search result(s) in the query database 8680, a guide providing training may determine not to select a query and/or search result from the database. For example, he or she may believe that a particular search query in the database is too difficult to be fielded by a searcher with the skill level of a searcher being trained. In such an instance, in operation 8720 of method 8700, a guide providing training may compose his or her own search query, perform a search, and store a query and/or a search result(s) corresponding to the query in the database 8680. Performing a search allows the system to compare a search result(s) that may eventually be produced by a searcher being trained with a search result(s) produced by a searcher providing training. Storing a query and/or a search result(s) in the query database 8680, for example, may advantageously allow the query database 8680 to be expanded with additional search query(ies), and corresponding search result(s). Method 8700 (FIG. 28) continues and control passes to operation 8725.

After the searcher providing training has stored a search query and/or a search result(s) in the database 8680, the selected query is sent to a guide being trained in operation 8725. Method 8700 continues and control is passed to operation 8631 of method 8600 (FIG. 27).

In the embodiment illustrated in FIG. 28, a human searcher providing training is able to select a search query, a search result(s), an advertisement(s), etc. which may be associated with a query and/or a search result(s) and transmit that information to a human searcher receiving training. A searcher providing training may interact with a human searcher receiving training using the interfaces described elsewhere herein.

Any or all of the selections made by a searcher providing training in method 8700 may be optionally performed by the system 1100 (FIG. 11). In at least one embodiment all of the operations in method 8700 are performed by the system 1100.

As illustrated in FIG. 29, searcher database 8682 may include fields relating to a searcher being trained according to at least one embodiment of the disclosed method. After being presented with the disclosure herein, one of ordinary skill in the relevant art will realize that other fields may be included within the database. It should also be noted that the searcher database 8682 may be any type of viable database for assisting with implementation of the disclosed system and method, for example a relational database.

The searcher identification (ID) field 8805 may include a searcher identifier field for identifying a searcher being trained, for example, an apprentice, a pro, or a master. Alternatively, the searchers status may be stored in a separate field in the searcher database 8682 or may be included as a portion of the ranking field 8820 as described below. The searcher identification field 8805 may also include the web address of the searcher, the searcher's name, telephone number, etc., allowing the master to contact the searcher to provide direct feedback. In at least one embodiment of the database, the searcher identification field 8805 may include a random number produced by a random number generator.

The busy/idle field 8810 may include a status indicating whether the corresponding searcher is busy participating in primary activity(ies), that is, fielding information search queries from information seekers. For example, in at least one embodiment, the busy/idle field 8810 is a flag field including a value of "true" to indicate that the searcher is idle or a value of "false" to indicate that the searcher is not idle. The busy/idle field 8810 assists in allowing the system to determine guides who are eligible for training in at least one embodiment of the disclosed system and method. This field 8810 may be updated when the searcher has accepted a search.

The categories/keywords field 8815 may include names of the keywords and categories to which the searcher is assigned. For example, the field may include the value "NCAA Basketball" to indicate that a particular searcher is assigned to the keyword "NCAA Basketball" in at least one embodiment of the disclosed searcher database 8682.

The ranking field 8820 may include an indication of the rank of a particular searcher such as "pro". As another example, the ranking field 8820 may include a number indicating the rating of the searcher to which the field corresponds. For instance, an apprentice searcher who is rated as the best apprentice searcher in the system may be specified by including a value of "T1" in the searcher's ranking field 8820. The value might indicate that the searcher is the number one (1) ranked apprentice searcher (T). Similarly, a master searcher who is ranked as the third best master searcher may be specified by including a value of "V3" in the searcher's ranking field 8820. The value would indicate that the searcher is the number three (3) ranked master (V). After being presented with the disclosure herein, one of ordinary skill in the relevant art will realize that other ranking specification may be utilized without departing from the scope and spirit of the disclosure.

For example, a global ranking system may be employed by the disclosed system and method. In such a scheme, the ranking field 8820 may include a numerical value indicating the overall ranking of the particular searcher to which the field corresponds. For example, a value of "155" would indicate that a pro searcher is the 155th best searcher out of all of the searchers, including masters, pros, and apprentice searchers.

The training queries presented (TQP) field 8825 may include a list of the training queries previously presented for a particular searcher. The 8825 field assists in determining whether a particular training search query was previously presented to a searcher to prevent the searcher from receiving the same training query, as described above in the text corresponding to FIG. 27.

In at least one embodiment of the disclosed system and method, the searcher database 8682 includes a training queries with passing grade field 8830. The training queries with passing grade field 8830 (FIG. 29) includes training queries for which a searcher has received a grade that is considered "passing". The field can assist a master searcher providing training to an apprentice searcher, for example, in determining which types of queries the apprentice most needs training in to improve his or her performance.

The grade field 8835 may include a grade of the last training query performed by a searcher. In at least one embodiment, the grade field 8835 corresponds to a particular training query that was previously presented to the searcher (for example, as specified in the training query presented field 8825) and specifies the grade for the particular corresponding performance.

The area for improvement/comments field 8840 may include text specifying areas or keywords/categories in which the particular searcher needs improvement allowing the recording of feedback for the searcher. In at least one embodiment of the disclosed system and method, factors included in the performance ranking for searchers are specified as areas requiring improvement. For example, if a particular apprentice searcher needs to improve (shorten) the length of time for producing a search result, the area for improvement/comments field 8840 may specify the particular factor with comments regarding suggestions for how the searcher can improve on the factor.

Figure 30:
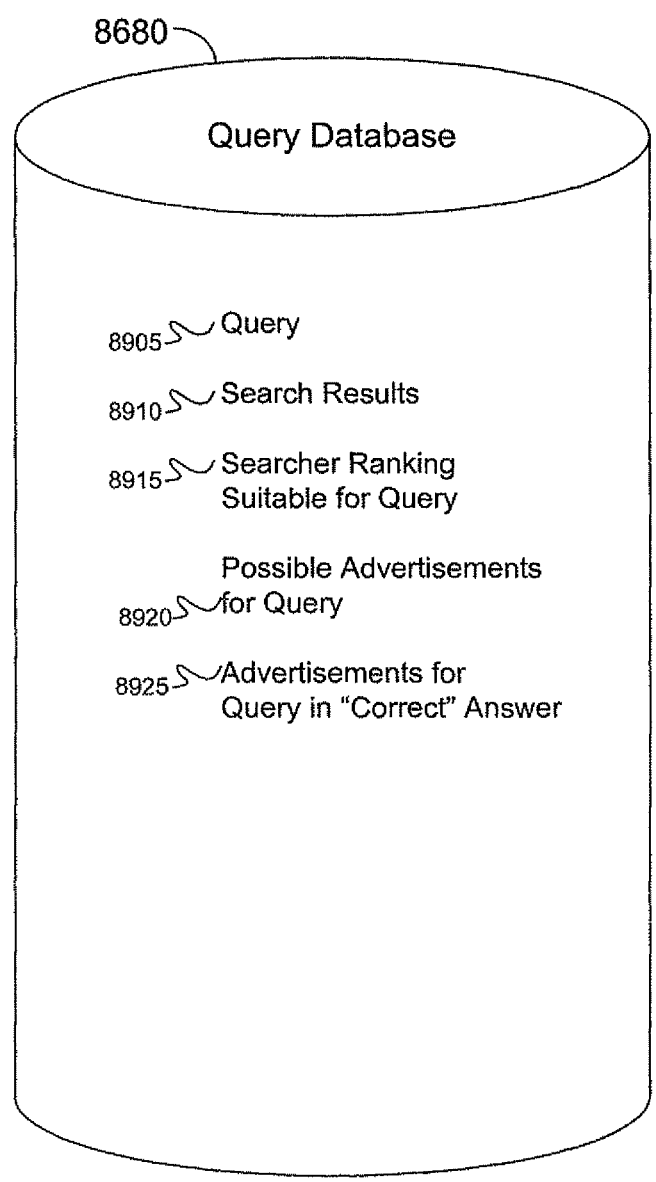
FIG. 30 is an illustration of a query database.

As illustrated in FIG. 30, query database 8680 includes a query field 8905. The query field 8905 includes queries for which search results were previously provided by more experienced searchers, for example.

The search results field 8910 includes search results corresponding to the previously provided queries in the query field 8905.

The searcher ranking suitable for query field 8915 includes an indication as to ranking level for which the particular query is suitable. For example, if the query is a relatively difficult query, the field indicates that the query is best suited in training searchers who are good and/or experienced searchers. Similarly, if the query is a relatively easy query, the searcher ranking suitable for query field 8915 field indicates that the query is best suited in training searchers who are poor and/or inexperienced. In at least one embodiment, the field indicates categories and/or keywords for which the query would be most suited. A query relating to information regarding college basketball championship teams over the past few years may include "NCAA Basketball" in its searcher ranking suitable for query field 8915 to specify that the training query is a suitable query to present to a searcher assigned to the keyword "NCAA Basketball". It should be noted that such an indication may be stored in a separate field, for example, a suitable category/keyword field, in at least one embodiment of the disclosed system and method. Regardless, such an indication can assist a master searcher, for example, in selecting a search query from the query database 8680.

The possible advertisements for query field 8920 may include advertisements that could be related to the particular query from which a searcher being trained can select as part of the training. The advertisements for query in "correct" answer field 8925 includes an advertisement that was actually sent with the query results and considered to be the "correct" advertisement, as described in the text corresponding to FIG. 27.

Figure 31:
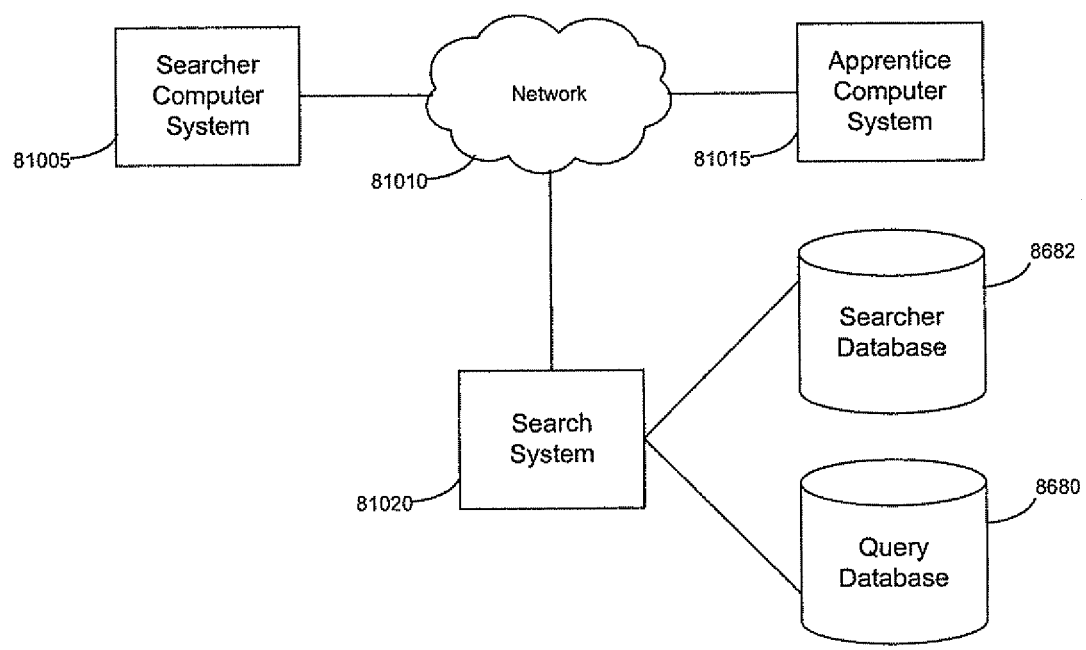
FIG. 31 is a system diagram for human-assisted search training of guides.

As shown, for example, in FIG. 31, one embodiment of system 81000 includes searcher computer system 81005, a network 81010 such as the Internet, an apprentice computer system 81015, a search system 81020 and databases such as searcher database 8682 and query database 8680.

The searcher computer system 81005 can be operated by a master searcher, for example, to provide training to a less skilled searcher. In particular, the master searcher may employ the searcher computer system 81005 to select or transmit search queries via the network 81010 to the search system 81020 to allow the apprentice computer system 81015 to receive the training queries for which the apprentice searcher will provide search results.

The apprentice computer system 81015 can be operated by an apprentice searcher, for example, to participate in training. In particular, an apprentice searcher may employ the apprentice computer system 81015 to perform a search and transmit results for the received search queries via the network 81010 to the search system 81020.

The search system 81020 allows interaction to occur between the searcher computer system 81005 and the apprentice computer system 81015, as transmissions from the searcher computer system 81005 and transmissions from the apprentice computer system 81015 both arrive at the search system 81020, where both systems can retrieve desired results, as discussed in the related application previously identified herein.

For example, the training search queries are transmitted from the searcher computer system 81005 to the search system 81020, where the queries are accessed by the apprentice computer system 81015. Similarly, the search results produced using the apprentice computer system 81015 in response to the search queries produced by the searcher computer system 81005 are transmitted to the search system 81020, where they can be accessed by the searcher computer system 81005.

After being presented with the disclosure herein, one of ordinary skill in the art will readily appreciate that the computer systems can be any type of viable computer systems known in the art, for example, a Dell® computer system.

At least one embodiment of system 81000 includes searcher database 8682 and query database 8680, which include information for executing the disclosed systems and methods in accordance with the description provided herein above and as claimed hereinafter.

Referring to FIG. 32, priority configuration 5200 depicts a priority configuration table for managing secondary activity (ies) (2120 (FIG. 12)) included within the system according to at least one embodiment of the disclosed systems and methods.

The priority configuration table 5200 includes secondary activity ID field(s) 5205, secondary activity priority field(s) 5210, secondary activity percentage field(s) 5215 and secondary activity target field(s) 5220.

A secondary activity ID field 5205 may contain information which identifies a secondary activity. The content of the secondary activity ID field may include a name for a secondary activity, a unique identifier of the secondary activity and other information.

A secondary activity priority field 5210 may contain information which identifies a priority for a secondary activity. The content of the secondary activity priority field may include a number to indicate the priority of the secondary activity, a name of a priority level for a secondary activity, etc. The content of the secondary activity priority field may be used to determine whether a secondary activity will be presented to a guide.

A secondary activity percentage field 5215 may contain information which records a percentage of time logged by a guide performing a secondary activity, a time period spent in a secondary activity by a guide, a count of a number of secondary activity sessions by a guide, and/or a total number of secondary activities by a guide, etc. The content of a secondary activity percentage field may be used to track the amount of a secondary activity that has been performed by a guide.

A secondary activity target field 5220 may contain information which identifies the target percentage of time to be logged by a guide performing a secondary activity, a target time period spent in any secondary activity by a guide, a target count of the number of secondary activity sessions by a guide, and/or a target total number of secondary activities by a guide, etc. The content of a secondary activity target field may be used to record the target amount of a secondary activity to be performed by a guide.

Secondary activities are activities which may be performed by guides who are not performing primary activities, (i.e., information seeker search queries).

Secondary activities may include but are not limited to receiving audio/video training, receiving query based training, polling, review of search result(s), translation, transcription, etc.

As illustrated in FIG. 32, more than one secondary activity may have the same priority level. For example, secondary activity A 5225 could be interactive query training and secondary activity B 5230 could be video training. In a system where a primary activity is search, video training and interactive query training as secondary activities may teach searching strategies to guides. In such a configuration, although secondary activity A 5225 (e.g., video training activity) and secondary activity B 5230 (e.g., the interactive query training) may initially have the same secondary activity priority 5210 (e.g., "first") secondary activity B (e.g., video training) might only occur when secondary activity A (e.g., interactive query training) is not possible due to a lack of experienced guides.

As a result, the percentage of time spent by a guide in secondary activity A 5225 as recorded in secondary activity percentage field 5215 associated with secondary activity A 5225 might exceed the secondary activity target recorded in secondary activity target field 5220 associated with secondary activity A 5225 (e.g., "35"). In this instance, the priority level field 5210 associated with secondary activity A 5225 may be changed to a lower priority level (e.g., "second") in order that the percentage of secondary activity associated with secondary activity B will increase. For example, a guide might preferentially be offered video training before being offered instead of interactive query training if the query training percentage is 50% and the video training is 25%. By adjusting the priority level, the activity level can be balanced to a target value over time.

As described above, secondary activity A 5225 and secondary activity B 5230 may be unavailable for any reason, even though the priority level associated with the secondary activity is higher than that associated with secondary activity C 5235. In order to prevent boredom, enhance guide satisfaction, provide alternative income, etc. secondary activity C 5235 may be offered to a guide even if the secondary activity percentage field 5215 associated with secondary activity C 5235 is above the secondary activity target field 5220 associated with secondary activity C 5235. As a consequence, the secondary activity priority field 5210 associated with secondary activity C 5235 may be reduced (e.g., from "second" to "third") to reduce the priority for selecting secondary activity C 5235 for a guide. The priority of secondary activity D 5240 may be increased (e.g., from "third" to "second") if the secondary activity percentage field 5215 associated with secondary activity D 5240 is below the secondary activity target field 5220 associated with secondary activity D 5240.

Figure 33:
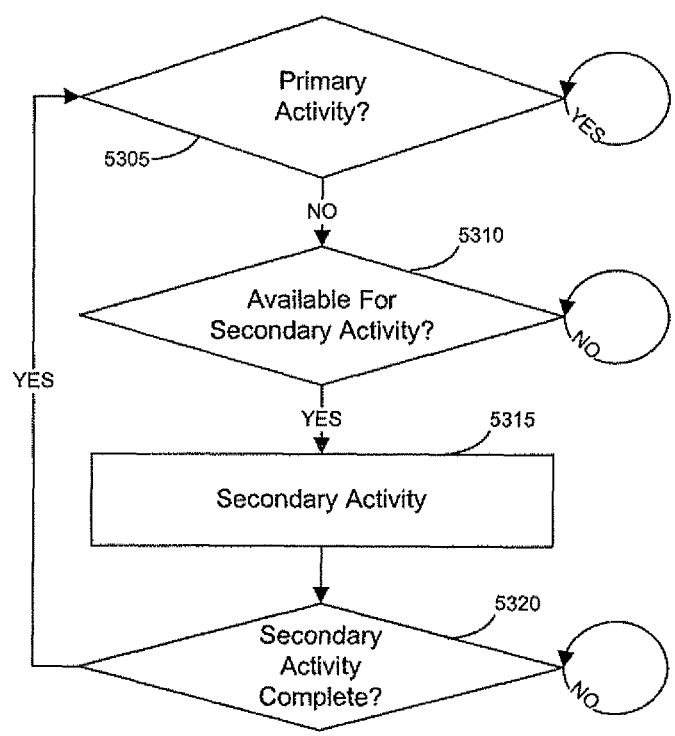
FIG. 33 is a flow diagram of a method of operation for managing secondary activities.

If a guide becomes available for secondary activities, as described further with respect to FIG. 33, the system 1100 (FIG. 11) may offer secondary activities to a guide based on a secondary activity priority level field 5210 associated with the secondary activity. Secondary activities may have the same priority level (e.g., "first" might be associated with secondary activity A 5220 and secondary activity B 5225. If both activities are available to a guide, they may be equally likely to be presented to a guide who is available for secondary activities.

Because secondary activities may not be available to a guide for any reason, such as unavailability of a guide(s) eligible for training, unavailability of a guide eligible to provide training, unavailability of a suitable video training, unavailability of search result(s) for review, unavailability of polling request(s), etc. The method and system described herein may allow the system 1100 (FIG. 11) to progressively balance the percentage time spent in secondary activities to achieve a target.

Over time, the system may preferentially offer secondary activities to guides based on the priority levels and target percentages of secondary activity time established by the priority configuration 5200 (FIG. 32). Because a record of time and/or numbers of secondary activities performed by guides is maintained in the searcher database 8682, it is possible for the system to balance secondary activities by varying the priority level associated with a secondary activity.

A secondary task priority configuration 5200 has been described with respect to managing the secondary activities of a single guide. But the method is not limited to this simple case. A secondary task priority configuration may be associated with a single guide, a group of guides with a rank, a group of guides associated with a category, etc. Any secondary activity available in the system may be associated with a secondary task priority configuration, as may an associated secondary task target.

For example, a master level guide with a high trainer rating may be associated with the secondary activity "provide query training" with a target of 80% of secondary activity time, and to the secondary activity "review search results" with a target of 20% of secondary activity time. By contrast, an apprentice level guide with a high training rating may be associated with the secondary activity "receive query training" with a target of 50% of secondary activity and the secondary activity "audio/video training" with a target of 20%, and the secondary activity "polling" with a target of 30%. In this way, the secondary activity levels of a guide(s), group of guide(s), etc. may be modified and adjusted in order to for example, optimize usage of guides based on skill level, minimize expense associated with training, meet a sudden increase in demand for transcription services, etc.

For example, if a search system is providing interactive query training for guides, transcription services, and polling services as secondary activities for guides, administrators of the system might initially set the priority level for interactive query training to "first" and the priority level for transcription services and polling services to "second" and "third" respectively. This would cause the system to train guides as a first priority in order to for example, increase the number of skilled guides available on a topic. The system might set the secondary activity target field 5220 in priority configuration 5200 for the activity "interactive training" to the target "less than revenue total from transcription and polling plus 100 dollars". If no revenue is generated from secondary activities and expense for "interactive training" exceeded "100 dollars" the priority level associated with interactive training could be reduced to "third" and the priority associated with revenue generating activities (i.e., transcription and polling activities) could increase until guides participated in activities which produce revenue(s). In this way, a target (e.g., expense to revenue differential) may be regulated by system administrators in an automated way to meet a target identified in the target field(s) which may be based on a value which is determined by information from the database 156 (FIG. 2). System administrators are thus not required to adjust the priority of a secondary task, but may adjust the target in order to produce the desired result.

As another example, the search system might provide video based training and language translation as secondary activities for a guide. In this case, video based training might require a per-use royalty expense, and the language training might be a revenue generating activity. If the expense associated with video based training exceeded a value stored in secondary activity target field 5220 in priority configuration 5200 (e.g., $100) the video training activity might be removed from the priority configuration by the system administrators until a measurement, such as backlog of transcription tasks with a customer met a target stored in a secondary activity field associated with the language translation secondary activity.

Other combinations of conditions and associations of priority levels will readily occur to one of ordinary skill in the relevant art.

While the secondary activity priority profile, method and system have been illustrated using percentages of time spent by a guide performing secondary activities, it will readily occur to one of ordinary skill in the relevant art that other targets may be used, such as a number of secondary activity sessions, a percentage of secondary activity sessions, etc.

As illustrated in FIG. 33, method 5300 is provided to manage secondary activities of a provider(s). In operation 5305 a determination is made as to whether a provider is performing a primary activity. If a provider is performing a primary activity control remains at operation 5305 and method 5300 continues to wait for a provider to finish performing a primary activity, such as responding to information search queries from information seekers.

If it is determined in operation 5305 that a provider is not performing a primary activity, control is transferred to operation 5310 and method 5300 continues.

In operation 5310 a determination is made as to if a provider is available for secondary activities. The determination may be made based on a condition(s) for all providers, or a condition(s) may be different based on information (e.g., keyword(s), level(s), rating(s), etc.) associated with a provider. If a primary activity is human searchers responding to queries, the system may, for example, determine the percentage of guides idle for a specified time period. For example, if fifty percent of the guides in the system are not fielding search queries for at least ten minutes, it may be determined in operation 5310 that the providers are available for secondary activities. If in operation 5310 it is determined that a provider is not available for secondary activity, control remains at process 5310 and method 5300 continues to determine if a provider is available for secondary activities.

If in operation 5310 it is determined that a provider is available for secondary activity, control is transferred to operation 5315 and method 5300 continues.

In operation 5315, a secondary activity is performed by an available provider. A secondary activity is selected for a provider based on a priority configuration table associated with a provider, as described above. Control is transferred to operation 5320 and method 5300 continues.

In operation 5320 a determination is made as to whether a provider has completed a secondary activity. If a provider has not completed a secondary activity, control remains at operation 5320 and method 5300 continues to determine if a provider has completed a secondary activity.

If in operation 5320 (FIG. 33) it is determined that a provider has completed a secondary activity, control is transferred to operation 5305 and method 5300 continues.

The determination in operation 5320 may be based on any information associated with a searcher and/or an activity. In at least one embodiment, the system 1100 (FIG. 11) may determine that a searcher/guide is required to respond to a search query (or request) from an information seeker (or user), (i.e., a primary activity). In this case, a secondary activity may be determined to be completed without considering other criteria (e.g., completion of viewing of a video, completion of a training search, etc). Likewise, a completion criteria for a secondary activity may be determined based upon any information (e.g., level, category, rating, QKW, tag, etc.) associated with a provider.

The method 5300 may be used in various ways. For example, a master level guide for the category "Sports" providing "interactive query-based training" may end a secondary activity (i.e., participation in a training session as a trainer) based on the "done indicator" completion criterion. A completion criterion for a secondary activity may include a combination of one or more criteria. For example, a training session may be completed by a "trainer logged-off" condition and/or a "rating by trainee complete" condition.

Figure 34:
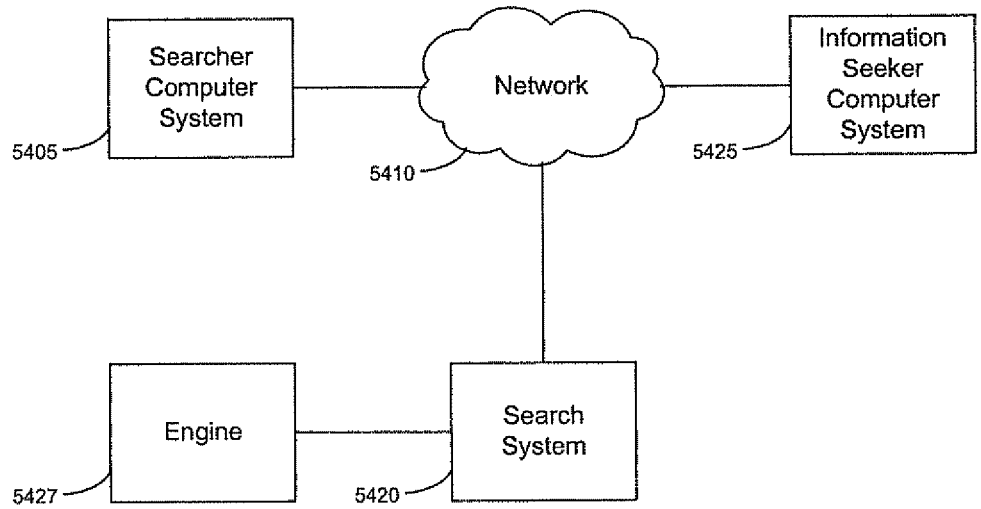
FIG. 34 is a system diagram for managing secondary activities of guides.

As illustrated in FIG. 34, in at least one embodiment of the disclosed systems, system 5400 is provided. System 5400 includes searcher computer system 5405, a network 5410 such as the Internet, a search system 5420, an information seeker computer system 5425, and an engine 5427 for managing secondary activity.

The information seeker computer system 5425 can be operated by an information seeker to submit an information search query(ies) to the search system 5420 to allow search result(s) by a searcher operating the searcher computer system 5405, for example to be returned.

The searcher computer system 5405 can be operated by a searcher, for example, to respond to information search queries submitted by an information seeker(s). In particular, the searcher may employ the searcher computer system 5405 to transmit search result(s) in response to search queries via the network 5410 to the search system 5420 to allow the information seeker computer system 5425 to receive a search result(s).

As described herein, a database may be used to associate the various types of items (e.g., keyword(s), category(ies), identifier(s) of a user, a guide, an advertisement, a file, etc.) to form a group. For example, one or more keywords may be associated to form a category one or more identifier(s) of one or more guide(s) may be associated to form a class of guides (e.g., "apprentices", "pros", "voice", etc.). Members of a group may be identified based on the association. The group may then be associated with other information, such as a state table, a secondary activity list, etc. which may be used to take an action for each member of a group.

The search system 5420 (FIG. 34) may be provided by a provider of the present invention and serves as the "brain" of the system 5400. The search system 5420 also may serve as an interface for the information seeker computer system 5425 and the searcher computer system 5405 to allow information searching to be conducted by human searchers, as described elsewhere herein. The search system 5420 may control an engine 5427 for managing secondary activity. The engine for managing secondary activity 5427 determines if secondary activities should occur and the order and priority in which secondary activities should occur using methods described herein It should be noted that although the present invention has been described in the context of a paid searcher environment, the invention can also be implemented in an environment in which searchers are unpaid, that is, an environment in which searchers volunteer their services.

After being presented with the disclosure herein, one of ordinary skill in the art will realize that the present disclosure can be implemented in software, firmware, and/or a combination thereof. Program code according to the present disclosure can be implemented in any viable programming languages such as C, C++, or any other viable high-level programming language, or a combination of such a high-level programming language and a low-level programming language such as Assembler, for example, or a combination of any of the foregoing or the equivalents thereof. Certain aspects of the embodiments of the present disclosure can be implemented using an embedded scripting language such as Perl®, Python®, JavaScript®, with a preferred implementation in Ruby.

The present disclosure can also be in the form of a computer readable medium encoded with processing instructions for controlling a computer to implement the methods described herein according to embodiments of the present disclosure.

The present disclosure should not be limited to the embodiments described herein. After being presented with the disclosure herein, those of ordinary skill in the art would appreciate that changes may be made to the disclosed embodiments without departing from the spirit and scope of the present disclosure.

What is claimed is:

1. A computer readable storage medium having a program embodied therein for controlling a computer to execute operations, comprising:
   consulting a searcher database to monitor a busy status of a searcher;
   determining whether the searcher is a pro searcher when the searcher status indicates that the searcher is idle;
   determining whether an apprentice searcher is logged-in;
   receiving a training request from a master searcher;
   alerting said apprentice searcher, a pro searcher, or a master searcher to which training is to be provided with a message to participate in query training said alerting emulating processing of a user request;
   obtaining a training query from a query database at a searcher ranking and matching keywords to which said apprentice searcher, said pro searcher, or said master searcher is assigned;
   receiving from said apprentice searcher, said pro searcher, or said master searcher, an acceptance of the training query as the user request;
   determining whether the training query has been previously provided to said apprentice searcher, said pro searcher, or said master searcher;
   transmitting the training query to emulate a request from a user to said apprentice searcher, said pro searcher, or said master searcher when the searcher is selected to participate in query training when determining that the training query has not been previously provided to said apprentice searcher, said pro searcher, or said master searcher;
   comparing search results produced by said apprentice searcher, said pro searcher, or said master searcher to previously provided search results;
   assigning a grade to said apprentice searcher, said pro searcher, or said master searcher;
   sending feedback to said apprentice searcher, said pro searcher, or said master searcher regarding performance when determining that a user provides feedback for the user request;
   marking the training query as completed for said apprentice searcher, said pro searcher, or said master searcher;
   determining whether ranking of said apprentice searcher, said pro searcher, or said master searcher requires adjustment; and
   adjusting rank of said apprentice searcher, said pro searcher, or said master searcher based on said determining.

2. A system, comprising:
   a searcher computer system for transmitting simulated search queries;
   a trainee computer system that receives the simulated search queries and provides search results to the simulated search queries; and
   a search system for conducting an interaction between the trainee computer system, the searcher computer system, and said search system:
   consulting a searcher database to monitor a busy status of a searcher;
   determining whether the searcher is a pro searcher when the searcher status indicates that the searcher is idle;
   determining whether an apprentice searcher is logged-in;
   receiving a request to provide training by a first master searcher;
   alerting said apprentice searcher, a pro searcher, or a second master searcher to which training is to be provided with a message to participate in query training said alerting emulating processing of a user request;
   obtaining a training query from a query database matching a ranking and matching keywords to which said apprentice searcher, said pro searcher, or said second master searcher is assigned;
   receiving from said apprentice searcher, said pro searcher, or said second master searcher, an acceptance of the training query as the user request;
   transmitting a simulated search query to said apprentice searcher, said pro searcher, or said second master searcher when the searcher is selected to participate in query training, the simulated search query being selected by the first master searcher based on whether the acceptance is received from said apprentice searcher, said pro searcher, or said second master searcher;
   comparing search results produced by said apprentice searcher, said pro searcher, or said second master searcher to previously provided search results;
   assigning a grade to said apprentice searcher, said pro searcher, or said second master searcher;
   sending feedback to said apprentice searcher, said pro searcher, or said second master searcher regarding performance when determining that a user provides feedback for the user request;
   determining whether ranking of said apprentice searcher, said pro searcher, or said second master searcher requires adjustment; and adjusting rank of said apprentice searcher, said pro searcher, or said second master searcher when required, and wherein said trainee computer system, searcher computer system, and search system are communicatively coupled via a network.

3. A computer-implemented method for training a human searcher for use with a computer, comprising:

consulting a searcher database to monitor a busy status of a searcher;

determining whether the searcher is a pro searcher when the searcher status indicates that the searcher is idle;

determining whether an apprentice searcher is logged-in;

receiving a training request from a master searcher;

alerting said apprentice searcher, a pro searcher, or a master searcher to which training is to be provided with a message to participate in query training said alerting emulating processing of a user request;

obtaining a training query from a query database at a searcher ranking and matching keywords to which said apprentice searcher, said pro searcher, or said master searcher is assigned;

receiving from said apprentice searcher, said pro searcher, or said master searcher, an acceptance of the training query as the user request;

determining whether the training query has been previously provided to said apprentice searcher, said pro searcher, or said master searcher;

transmitting the training query to emulate a request from a user to said apprentice searcher, said pro searcher, or said master searcher when the searcher is selected to participate in query training when determining that the training query has not been previously provided to said apprentice searcher, said pro searcher, or said master searcher;

comparing search results produced by said apprentice searcher, said pro searcher, or said master searcher to previously provided search results;

assigning a grade to said apprentice searcher, said pro searcher, or said master searcher;

sending feedback to said apprentice searcher, said pro searcher, or said master searcher regarding performance when determining that a user provides feedback for the user request;

marking the training query as completed for said apprentice searcher, said pro searcher, or said master searcher;

determining whether ranking of said apprentice searcher, said pro searcher, or said master searcher requires adjustment; and adjusting rank of said apprentice searcher, said pro searcher, or said master searcher based on said determining.

4. The computer-implemented method of claim 3, further comprising, before said determining, dividing human searchers into groups based on skills of the human searchers, and conducting training based on the groups.

5. The computer-implemented method of claim 4, wherein said human searchers are divided into the groups based on search skills of the human searchers subsequent to determining whether the searcher is available for training, and conducting said training based on the groups.

6. The computer-implemented method of claim 4, wherein said dividing includes dividing the human searchers into the groups based on training skills of the human searchers, and conducting said training based on the groups.

7. The computer-implemented method of claim 5, wherein said dividing includes dividing the human searchers into apprentices, pros, and masters, and conducting said training based on the dividing.

8. The computer-implemented method of claim 7, wherein said apprentices are human searchers who only receive the training.

9. The computer-implemented method of claim 7, wherein said pros are human searchers who receive the training and user requests.

10. The computer-implemented method of claim 7, wherein said masters are human searchers who provide the training.

11. The computer-implemented method of claim 7, further comprising subdividing at least one of the apprentices, pros, and masters into classes, and conducting said training based on the subdividing.

12. The computer-implemented method of claim 3, further comprising, prior to said consulting, accepting an election by said searcher to respond to user queries associated with a keyword of a generated query.

13. The computer-implemented method of claim 3, further comprising, after said alerting, presenting said searcher with a notification to initiate a search for a response to the query.

14. The computer-implemented method of claim 13, wherein said notification occurs via a pop-up window.

15. The computer-implemented method of claim 3, wherein a search result includes selection of an advertisement from a plurality of advertisements.

16. The computer-implemented method of claim 3, wherein the query is selected for the searcher by the master searcher providing the training request based on training skills of the master searcher associated with a keyword of the query.

17. The computer-implemented method of claim 3, further comprising: selecting the query according to a skill set of the searcher.

18. The computer-implemented method of claim 3, wherein the training comprises responding with one of a search result, an advertisement, and a keyword.

19. The computer-implemented method of claim 17, wherein said selecting comprises:

identifying searcher keywords or searcher categories to which the searcher has been assigned; and matching the searcher keywords or searcher categories with query keywords or query categories pertaining to the query.

20. The computer-implemented method of claim 3, further comprising: receiving a search result from the searcher responsive to the query.

21. The computer-implemented method of claim 20, wherein said search result is compared to a stored search result of a master searcher.

22. The computer-implemented method of claim 15, further comprising comparing the advertisement to a stored advertisement designated for the query.

23. The computer-implemented method of claim 20, further comprising comparing the search result to a stored search result designated for the query.

24. The computer-implemented method of claim 20, wherein said search results are provided as a response via a graphical user interface through which an information seeker interacts with a system to request assistance with a query.

25. The computer-implemented method of claim 24, wherein said receiving includes receiving the response via the graphical user interface, said graphical user interface including a preliminary results section, an advertisement section, and a results section.

\* \* \* \* \*